(12) United States Patent
Willis

(10) Patent No.: US 7,370,276 B2
(45) Date of Patent: May 6, 2008

(54) INTERFACE FOR COLLECTING USER PREFERENCES

(75) Inventor: Brian Willis, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 851 days.

(21) Appl. No.: 10/354,144

(22) Filed: Jan. 30, 2003

(65) Prior Publication Data

US 2004/0003096 A1    Jan. 1, 2004

Related U.S. Application Data

(63) Continuation-in-part of application No. 10/231,440, filed on Aug. 30, 2002, and a continuation-in-part of application No. 10/231,459, filed on Aug. 30, 2002.

(60) Provisional application No. 60/380,864, filed on May 17, 2002, provisional application No. 60/380,834, filed on May 17, 2002.

(51) Int. Cl.
*G06F 3/00* (2006.01)
*G06F 3/01* (2006.01)

(52) U.S. Cl. .................. 715/747; 715/517; 715/744

(58) Field of Classification Search ............ 715/747, 715/744
See application file for complete search history.

(56) References Cited

U.S. PATENT DOCUMENTS

| | | | |
|---|---|---|---|
| 5,442,740 A | | 8/1995 | Parikh |
| 5,583,994 A | * | 12/1996 | Rangan ............... 709/219 |
| 5,760,771 A | * | 6/1998 | Blonder et al. ......... 715/854 |
| 5,761,662 A | * | 6/1998 | Dasan ................ 707/10 |
| 5,848,424 A | | 12/1998 | Scheinkman et al. |
| 5,893,110 A | * | 4/1999 | Weber et al. .......... 707/104.1 |
| 5,995,943 A | | 11/1999 | Bull et al. |

(Continued)

FOREIGN PATENT DOCUMENTS

EP    1 143 679 A2    10/2001

(Continued)

OTHER PUBLICATIONS

Bhatia, S. K., "Selection of Search Terms Based on User Profile," Proceedings of the 1992 ACM/SIGAPP Symposium on Applied Computing: Technological Challenges of the 1990's, Kansas City, MO, 1992, pp. 224-233.

(Continued)

*Primary Examiner*—Weilun Lo
*Assistant Examiner*—Steven B. Theriault
(74) *Attorney, Agent, or Firm*—Fish & Richardson P.C.

(57) ABSTRACT

Various techniques are disclosed for accepting preference information from a user, where the preference information is specific to content elements within a media asset, and the preference information is collected while the user is viewing a display of the media asset. These techniques allow a user to change his or her preference information quickly, easily, and efficiently, and to improve the use of, for example, a search engine, a portal page, a reverse-query portal page, or a video (for example, television) display. For example, the user may update/modify a search being performed by a search engine while viewing one of the media assets discovered during the search, without having to return to a search engine home page or a search results summary page.

40 Claims, 35 Drawing Sheets

U.S. PATENT DOCUMENTS

| | | | |
|---|---|---|---|
| 6,041,331 A | 3/2000 | Weiner et al. | |
| 6,049,821 A | 4/2000 | Theriault et al. | |
| 6,058,277 A | 5/2000 | Streefkerk et al. | |
| 6,064,980 A | 5/2000 | Jacobi et al. | |
| 6,076,166 A | 6/2000 | Moshfeghi et al. | |
| 6,081,263 A * | 6/2000 | LeGall et al. | 715/760 |
| 6,085,229 A | 7/2000 | Newman et al. | |
| 6,094,648 A | 7/2000 | Aalbersberg | |
| 6,154,764 A | 11/2000 | Nitta et al. | |
| 6,161,112 A * | 12/2000 | Cragun et al. | 715/501.1 |
| 6,181,342 B1 | 1/2001 | Niblack | |
| 6,209,100 B1 | 3/2001 | Robertson et al. | |
| 6,236,395 B1 | 5/2001 | Sezan et al. | |
| 6,266,649 B1 | 7/2001 | Linden et al. | |
| 6,271,840 B1 | 8/2001 | Finseth et al. | |
| 6,300,947 B1 | 10/2001 | Kanevsky | |
| 6,311,194 B1 * | 10/2001 | Sheth et al. | 715/505 |
| 6,317,722 B1 | 11/2001 | Jacobi et al. | |
| 6,327,628 B1 * | 12/2001 | Anuff et al. | 719/311 |
| 6,338,059 B1 | 1/2002 | Fields et al. | |
| 6,338,096 B1 | 1/2002 | Ukelson | |
| 6,347,332 B1 | 2/2002 | Malet et al. | |
| 6,356,899 B1 * | 3/2002 | Chakrabarti et al. | 707/5 |
| 6,356,922 B1 | 3/2002 | Schilit et al. | |
| 6,400,381 B1 | 6/2002 | Barrett et al. | |
| 6,421,706 B1 | 7/2002 | McNeill et al. | |
| 6,438,580 B1 | 8/2002 | Mears et al. | |
| 6,438,632 B1 | 8/2002 | Kikugawa | |
| 6,452,609 B1 * | 9/2002 | Katinsky et al. | 715/716 |
| 6,457,026 B1 | 9/2002 | Graham et al. | |
| 6,460,036 B1 | 10/2002 | Herz | |
| 6,470,338 B1 | 10/2002 | Rizzo et al. | |
| 6,480,885 B1 | 11/2002 | Olivier | |
| 6,549,935 B1 | 4/2003 | Lapstun et al. | |
| 6,553,412 B1 * | 4/2003 | Kloba et al. | 709/219 |
| 6,556,997 B1 * | 4/2003 | Levy | 707/10 |
| 6,594,682 B2 * | 7/2003 | Peterson et al. | 718/102 |
| 6,646,549 B2 | 11/2003 | Dawson | |
| 6,675,350 B1 * | 1/2004 | Abrams et al. | 715/501.1 |
| 6,697,824 B1 | 2/2004 | Bowman-Amuah | |
| 6,725,227 B1 * | 4/2004 | Li | 707/102 |
| 6,738,804 B1 * | 5/2004 | Lo | 709/219 |
| 6,741,853 B1 * | 5/2004 | Jiang et al. | 455/418 |
| 6,741,980 B1 * | 5/2004 | Langseth et al. | 707/2 |
| 6,766,362 B1 * | 7/2004 | Miyasaka et al. | 709/219 |
| 6,850,252 B1 * | 2/2005 | Hoffberg | 715/716 |
| 6,877,134 B1 * | 4/2005 | Fuller et al. | 715/500.1 |
| 6,904,463 B1 | 6/2005 | Fadel | |
| 6,918,090 B2 * | 7/2005 | Hesmer et al. | 715/760 |
| 6,947,959 B1 * | 9/2005 | Gill | 715/501.1 |
| 6,959,319 B1 * | 10/2005 | Huang et al. | 709/203 |
| 6,972,861 B1 * | 12/2005 | van Zee et al. | 358/1.15 |
| 6,973,665 B2 * | 12/2005 | Dudkiewicz et al. | 725/46 |
| 6,978,316 B2 | 12/2005 | Ghaffar et al. | |
| 6,990,633 B1 * | 1/2006 | Miyasaka et al. | 715/517 |
| 6,993,529 B1 * | 1/2006 | Basko et al. | 707/100 |
| 7,003,528 B2 * | 2/2006 | Dan et al. | 707/102 |
| 7,017,183 B1 | 3/2006 | Frey et al. | |
| 7,039,684 B2 * | 5/2006 | Blockton et al. | 709/213 |
| 7,072,983 B1 | 7/2006 | Kanai et al. | |
| 7,136,178 B1 * | 11/2006 | Gupta et al. | 358/1.15 |
| 7,165,098 B1 * | 1/2007 | Boyer et al. | 709/219 |
| 2001/0003828 A1 * | 6/2001 | Peterson et al. | 709/219 |
| 2001/0017707 A1 * | 8/2001 | Lee | 358/1.12 |
| 2002/0018078 A1 | 2/2002 | Khan et al. | |
| 2002/0029296 A1 | 3/2002 | Anuff et al. | |
| 2002/0049727 A1 * | 4/2002 | Rothkopf | 707/1 |
| 2002/0049833 A1 | 4/2002 | Kikinis | |
| 2002/0053078 A1 | 5/2002 | Holtz et al. | |
| 2002/0059584 A1 | 5/2002 | Ferman et al. | |
| 2002/0087679 A1 * | 7/2002 | Pulley et al. | 709/224 |
| 2002/0112240 A1 * | 8/2002 | Bacso et al. | 725/47 |
| 2002/0122063 A1 * | 9/2002 | Weinberg et al. | 345/764 |
| 2002/0124182 A1 * | 9/2002 | Bacso et al. | 713/200 |
| 2002/0133821 A1 * | 9/2002 | Shteyn | 725/46 |
| 2002/0138844 A1 | 9/2002 | Otenasek et al. | |
| 2002/0143659 A1 * | 10/2002 | Keezer et al. | 705/27 |
| 2002/0174230 A1 | 11/2002 | Gudorf et al. | |
| 2002/0174319 A1 | 11/2002 | Rivers et al. | |
| 2002/0178007 A1 | 11/2002 | Slotznick et al. | |
| 2002/0184319 A1 | 12/2002 | Willner et al. | |
| 2002/0194267 A1 * | 12/2002 | Flesner et al. | 709/203 |
| 2002/0198859 A1 | 12/2002 | Singer et al. | |
| 2002/0198973 A1 | 12/2002 | Besaw | |
| 2003/0018815 A1 | 1/2003 | Spicer et al. | |
| 2003/0028871 A1 * | 2/2003 | Wang et al. | 725/9 |
| 2003/0028896 A1 * | 2/2003 | Swart et al. | 725/127 |
| 2003/0033161 A1 | 2/2003 | Walker et al. | |
| 2003/0084059 A1 * | 5/2003 | Kelley et al. | 707/102 |
| 2003/0093790 A1 | 5/2003 | Logan et al. | |
| 2003/0101412 A1 * | 5/2003 | Eid | 715/513 |
| 2003/0126136 A1 * | 7/2003 | Omoigui | 707/10 |
| 2003/0217061 A1 | 11/2003 | Agassi et al. | |
| 2003/0229900 A1 * | 12/2003 | Reisman | 725/87 |
| 2004/0059705 A1 * | 3/2004 | Wittke et al. | 707/1 |
| 2004/0088355 A1 * | 5/2004 | Hagan et al. | 709/203 |
| 2004/0205473 A1 * | 10/2004 | Fisher et al. | 715/500 |
| 2004/0220926 A1 * | 11/2004 | Lamkin et al. | 707/3 |
| 2004/0230572 A1 * | 11/2004 | Omoigui | 707/3 |
| 2005/0027676 A1 * | 2/2005 | Eichstaedt et al. | 707/1 |
| 2005/0149880 A1 * | 7/2005 | Postrel | 715/808 |
| 2005/0193335 A1 * | 9/2005 | Dorai et al. | 715/530 |
| 2005/0204276 A1 * | 9/2005 | Hosea et al. | 715/501.1 |
| 2006/0031114 A1 * | 2/2006 | Zommers | 705/10 |
| 2006/0271552 A1 * | 11/2006 | McChesney et al. | 707/10 |

FOREIGN PATENT DOCUMENTS

| | | |
|---|---|---|
| EP | 1 176 520 A2 | 1/2002 |
| EP | 1 367 513 A2 | 12/2003 |
| GB | 2 367 158 | 3/2002 |
| WO | WO 99/62011 | 12/1999 |
| WO | WO 00/65773 | 11/2000 |
| WO | WO 00/77689 | 12/2000 |
| WO | WO 01/06398 | 1/2001 |
| WO | WO 01/09737 A1 | 2/2001 |
| WO | WO 01/13287 A | 2/2001 |
| WO | WO 01/18688 A2 | 3/2001 |
| WO | WO 01/77903 A1 | 10/2001 |
| WO | WO 01/81829 A1 | 11/2001 |

OTHER PUBLICATIONS

Kamba, T. et al., "The Krakatoa Chronicle—An Interactive, Personalized, Newspaper on the Web," Proceedings of the International Conference on World Wide Web, Dec. 11, 1995, pp. 1-12.

Salembier, P. et al., "Description Schemes for Video Programs, Users and Devices," Signal Processing: Image Communication, Sep. 2000, vol. 16, pp. 211-234.

Seo, Y. W. et al., "Learning User's Preferences by Analyzing Web-Browsing Behaviors," Proceedings of the Fourth International Conference on Autonomous Agents, Barcelona, Spain, Jun. 3-7, 2000, pp. 381-387.

Sugiura, A. et al., "Internet Scrapbook: Automating Web Browsing Tasks by Demonstration," UIST '98, ACM Symposium on User Interface Software and Technology, San Francisco, CA, Nov. 1-4, 1998, pp. 9-18.

Amazon.com, "Recommendations," http://www.amazon.com/exec/obidos/tg/browse/-/508506/ref=br_bx_c_2_1/002-7851280-4410446, (undated and Applicant believes it was available before Jan. 30, 2003), printed from the Internet Feb. 27, 2004, 2 pgs.

Amazon.com. "Why Was I Recommended This?" http://www.amazon.com/exec/obidos/tg/browse/-/764534/ref%3Dbr%5Fbx%5Fc%5F2%5F2/002-/002-7851280-4410446, (undated and Applicant believes it was available before Jan. 30, 2003), printed from the Internet Feb. 27, 2004, 2 pgs.

Amazon.com, "Your Favorites," http://www.amazon.com/exec/obidos/tg/browse/-/560726/ref=br_bx_c_2_0/002-7851280-4410446, (undated and Applicant believes it was available before Jan. 30, 2003), printed from the Internet Feb. 27, 2004, 2 pgs.

Netflix, "About Netflix," http://www.netflix.com/PressRoom?id=1005, (undated and Applicant believes it was available before Jan. 30, 2003), printed from the Internet Jan. 5, 2004, 1 pg.

Netflix. "Fact Sheet," http://www.netflix.com/PressRoom?id=5206, (undated and Applicant believes it was available before Jan. 30, 2003), printed from the Internet Jan. 5, 2004, 3 pgs.

SAP Aktiengesellschaft, "mySAP Technology: Portal Infrastructure: People-Centric Collaboration," undated materials, copyright 2001, 28 pgs.

"What is My Yahoo!?," http://wizards.yahoo.com/members/tools/publishing/wizards/server/bottom-right/1, (undated and Applicant believes it was available before Jan. 30, 2003), printed from the Internet Feb. 27, 2004, 7 pgs.

Bulterman, D. C. A., et al., "GriNS: A Graphical Interface for Creating and Playing SMIL Documents," Computer Networks and ISDN Systems, North Holland Publishing, Amsterdam, NL, vol. 30, Nos. 1-7, pp. 519-529, XP004121396.

Google News (BETA), "Top Stories," http://news.google.com, printed from the Internet Oct. 1, 2002, 5 pgs.

Google News (BETA), "A Novel Approach to News," http://news.google.com/help/about_news_search.html, printed from the Internet Oct. 1, 2002, 3 pgs.

IBM, "IBM Websphere Portal Server Product Architecture V2.1," Nov. 19, 2001, pp. 1-31, XP002268018.

Li, Chung-Sheng, et al., "Multimedia Content Description in the Infopyramid," Acoustics, Speech and Signal Processing, Proceedings of the 1998 IEEE International Conference, May 12, 1998, pp. 3789-3792, XP010279595.

Boguraev, Branimir et al., "Dynamic Presentation of Document Content for Rapid On-Line Skimming" AAAI Symposium on Intelligent Text Summarization, Mar. 23, 1998, 10 pages.

Graham, Jamey, "The Reader's Helper: A Personalized Document Reading Environment," CHI '99 Conference Proceedings Human Factors in Computing Systems, Pittsburgh, PA, May 15, 1999, 9 pages.

* cited by examiner

```
<Article>
    <Time>2002 -04- 24 15:02</Time>  /705
    <Importance>Normal</Importance>
    <Author>agent@food4all.com</Author>  /710
    <Content Type=" text/narrative " >
<Headline>
Four of our top customers in the Eastern Region have pending complaints.  /715
</Headline>
    <Details>
                /720
Wacky Foods, with an annual sales volume of $10M have 8 pending complaints;
My Muffin Ltd with $4M of annual sales have 1; Breads R Us with $1M of annual sales
have 3; and Have Your Cake, Inc with $850K of annual sales have 2. The complaints
KPI is at 88.7M </Details>
</Content>
<Content Type= " text/html ">  /725
<Headline>
Pending Support Complaints for Top Customers in Eastern Region  /730
</Headline>
<Html>
```

| Top Customers of Eastern Region - Pending Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

/735

```
</Html>
</Content>
<   DiscussionObjects   >
    <Object Class= " BizPartner" Key= " Wacky Foods " />
    <Object Class= " BizPartner" Key= " My Muffins Ltd " />  /740
    <Object Class= " BizPartner" Key= " Breads R Us " />
    <Object Class= " BizPartner" Key= " Have Your Cake Inc " />
    <Object Class= " Region" Key= " Eastern" />
    <Object Class= "SecurityRealm" Key= " Sales Numbers" />
    </DiscussionObjects>
    </Article>
```

FIG. 7

```
<Article>
<Time>2002 -04- 24 15:02</Time>   /‾1405         /‾1400
    <Importance>Normal</Importance>
    <Author>agent@food4all.com</Author>
<Content Type=" text/narrative ">
<Headline>                                        1410              /‾1415
    Four of our top customers in the Eastern Region have pending complaints.
</Headline>
<Details>                                                           /‾1420
  Wacky Foods, with an annual sales volume of $10M have 8 pending complaints;
  My Muffin Ltd with $4M of annual sales have 1; Breads R Us with $1M of
  annual sales have 3; and Have Your Cake, Inc with $850K of annual sales
  have 2. The complaints KPI is at 88.7M
</Details>
</Content>
<Content Type=" text/html  " >  /‾1425
<Headline>
    Pending Support Complaints for Top Customers in Eastern Region  /‾1430
</Headline>
<Html>                                                                /‾1435
```

| Top Customers of Eastern Region - Pending Support Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

```
</Html>
</Content>
<Content Type=" image/gif ">
<Headline>                                    1440
    Pending Support Complaints for Top Customers in Eastern Region
</Headline>                                                     1445
<Image>                                                        /‾1450
```

```
</Image>
</Content>
<Content Type=" music/midi  ">  /‾1455
<Midi>
```

```
                /‾1460
</Midi>
</Content>
</Article>
```

FIG. 14

FIG. 19 microsoft+     [Search]

☐ Amid global job cuts, Intel's India hiring on track (33%)
BANGALORE, July 17 (Reuters) - Chipmaker Intel Corp's (NasdaqNM: INTC) Indian unit said on Wednesday it was sticking to its plan to hire 200 more engineers for its Indian software centre this year despite 4,000 job cuts announced by its parent. "We haven't got any...[more]

☐ CORRECTED-UPDATE 1-Microsoft fourth quarter seen up on new licensing plan (33%)
In July 10 SEATTLE item "Microsoft fourth quarter seen up on new licensing plan" please read in third to last paragraph...to be $28.1 billion to $28.2 billion... Instead of ...to be $28.8 billion to $29.1 billion... Corrects forecast. A corrected repetition follows... [more]

☐ Remember the Bears' Retreat of '98 (33%)
In the waning moments of the 1998 bear market, they couldn't get a lot of stocks open. That's right, there were so many people who wanted out and the dislocations were so great -- Microsoft (NasdaqNM: MSFT) down ten, Dell (NasdaqNM: DELL) down twelve, intrady--...[more]

☐ Oracle warns demand is weakening in Europe (33%)
Jeff Henley, chief financial officer of Oracle, the world's second largest software company, warned late on Wednesday that although demand in the US was no longer getting worse, it was continuing to weaken in some European markets. "Nowhere is demand getting better,"...[more]

☐ Oracle CEO takes shots at, compliments Microsoft (33%)
(Recasts with details of speech) REDWOOD SHORES, Calif. July/10 (Reuters) - Larry Ellison, chief executive at No. 2 software maker Oracle Corp.(NasdaqNM: ORCL), on Wednesday took shots at, and paid rare compliments to, long-time rival Microsoft Corp.(NasdaqNM: MSFT)...[more]

☐ Microsoft 4th Quarter Seen Up on New Licensing Plan (33%)
SEATTLE (Reuters) - At a time when other software and computer hardware companies are being hit hard by the slump in corporate spending, Microsoft Corp. (NasdaqNM: MSFT) appears on track to post a fourth-quarter profit at the high end of its own guidance, analysts...[more]

☐ SAP cuts forecast, shares plunge (33%)
(adds closing stock price, details) FRANKFURT/NEW YORK July 11 (Reuters) - Europe's biggest software group, SAP, shocked markets on Thursday when it warned its 2002 revenue would fall short of previous estimates after customers canceled orders at the last minute. SAP's ...[more]

FIG. 22

☐ Amid global job cuts, Intel's India hiring on track microsoft+, Oracle-    [Search]

Type: news

BANGALORE, July 17 (Reuters) - Chipmaker Intel Corp's (NasdaqNM:intc&d=t">
INTC- intc.html" >News) Indian unit ☒ ⊙⊙⊙⊙ ⊙ ▼ cking to its plan to hire 200 more engineers
for its Indian software centre this year despite 4,000 job cuts announced by its parent.

ADVERTISEMENT

**When you open and fund
a Power
brokerage account**

"We haven't got any geographical break-up of
the job cuts. As as of now, we are continuing with
our earlier expansion plan announced for India,"
a spokeswoman for Intel's Indian subsidiary told
Reuters.

Intel's three-year-old software centre in Bangalore,
its largest non-manufacturing site outside the
United States, doubled its staff size in 2001 to
about 800.

The World's biggest chipmaker on Tuesday said it
would cut nearly five percent of its global workforce, primarily through attrition and a buyout packages
for workers.

microsoft+, Oracle-, Intel* [Search]

☐ Remember the Bears' Retreat of '98 (33%)
In the waning moments of the 1998 bear market, they couldn't get a lot of stocks open. That's right, there were so many people who wanted out and the dislocations were so great -- Microsoft (NasdaqNM: MSFT) down ten, Dell (NasdaqNM: DELL) down twelve, intraday--...[more]

☐ Sun, IBM Battle for Web Services Developers (33%)
*Teri Robinson, www.Ecommerce Times.com* With a flurry of product announcements, IBM (NYSE: IBM) and Sun Microsystems (Nasdaq: SUNW) have intensified their heated battle to dominate the Web services market. Sun Gives Away Application Server In this round,...[more]

☐ HP Shifts Software Strategy (33%)
As the post-merger decision-making process shifts into high gear, Hewlett-Packard (NYSE: HPQ) (HP) on Monday announced a new software strategy designed to leverage its core assets. The technology titan will focus future development on extending three software suites:...[more]

☐ Microsoft's lead laywer to return to Seattle firm (33%)
SEATTLE, July 17 (Reuters) - William Neukom, Microsoft Corp.'s (NasdaqNM: MSFT) lead lawyer who led the software giant's defense against federal antitrust charges, on Wednesday said he will rejoin his former law firm as a partner. Neukom, 60, had announced his...[more]

☐ Donahue debuts at No.2 in cable news talk wars (33%)
LOS ANGELES, July 16 (Reuters) - Talk show veteran Phil Donahue drew 1.1 million viewers in his return to television on MSNBC, edging out CNN rival Connie Chung but drawing less than half of Bill O'Reilly's Fox News Channel audience, ratings showed on Tuesday. The...[more]

☐ SAP cuts forecast, shares plunge (28%)
(adds closing stock price, details) FRANKFURT/NEW YORK July 11 (Reuters) - Europe's biggest software group, SAP, shocked markets on Thursday when it warned its 2002 revenue would fall short of previous estimates after customers canceled orders at the last minute. SAP's ...[more]

☐ SAP Canada Inc. Announces New President (25%)
Canadian native Michel Brisson to assume leadership position MONTREAL, QC, July 16 /CNW/ - SAP Canada Inc., a subsidiary of SAP AG (NYSE: SAP), today announced that it has appointed Michel Brisson to assume the role of president of SAP Canada Inc., effective...[more]

☐ SAP Continues Market Leadership for Supply Chain

Search

*1903* *1914* *1904* *2102* *2302* *1902* *2308* *1910* microsoft+, Oracle-, Intel*

☐ HP Shifts Software Strategy

Type: news

*Jennifer LeClaire*

As the post-merger decision-making process shifts into high gear, Hewlett-Packard (NYSE: HPQ - news) (HP) on Monday announced a new software strategy designed to leverage its core assets. The technology titan will focus future development on extending three software suites: HP OpenView, HP Utility Data Center and HP OpenCall.

"TECHNOLOGY'S HOME PAGE"

- HP Jumps on Mobile Flash Wagon
- HP Unifies Clustered Database Technologies
- HP Unveils Servers Based on New Chip

Company executives said the decision was based on HP's intellectual property and customer acceptance of those three products.

"HP has come full circle on its software strategy," Forrester Research (Nasdaq: FORR - news) analyst Joshua Walker told the E-Commerce Times, noting that the company has returned to its 1998 strategy, which spawned a middleware agreement with BEA Systems (Nasdaq: BEAS - news)

"It is a Pratical approach to sticking to what they are good at -- application and systems management," Walker said.

Web Services Focus

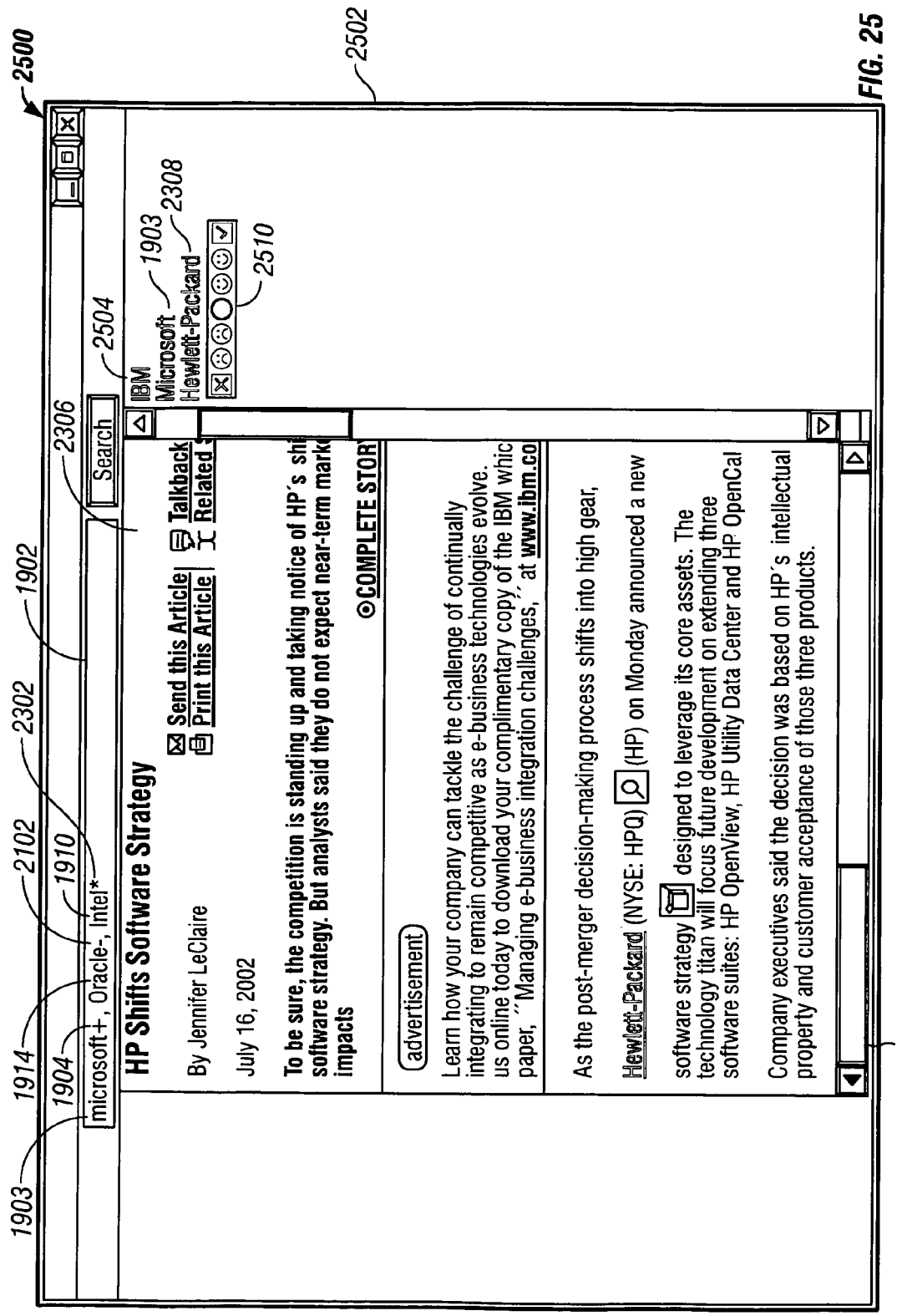

2600

2602

| Never Tell me about SAP |
| Tell me Everything about SAP |

| SAP is Important to me |
| SAP is not Important to me |

| Postpone Articles about SAP |

| Advanced... |

2604

| Tomorrow |
| Tue |
| Wed |
| Thu |
| Fri |

| 1 Week |
| 2 Weeks |
| 1 Month |
| 1 Quarter |

*FIG. 26*

INTERFACE FOR COLLECTING USER PREFERENCES

CROSS-REFERENCE TO RELATED APPLICATIONS

This application claims priority from (i) U.S. Provisional Application No. 60/380,834, filed May 17, 2002, and titled Personalizing Portal Content Dynamically, and from (ii) U.S. Provisional Application No. 60/380,864, filed May 17, 2002, and titled Rich Media Information Portals. This application claims priority and is a Continuation-in-Part of (iii) U.S. application Ser. No. 10/231,440, filed Aug. 30, 2002, and titled Dynamic Presentation of Personalized Content, and (iv) U.S. application Ser. No. 10/231,459, filed Aug. 30, 2002, and titled Rich Media Information Portals. All four of the above applications are hereby incorporated by reference in their entirety for all purposes.

TECHNICAL FIELD

This description relates to techniques for collecting user preferences.

BACKGROUND

Technologies exist which allow users to designate categories of information in which desired content may be presented. For example, web sites may allow users to select categories from a variety of different sources and content providers. Such sites are generally known as "portals," and provide a central gateway through which users can be presented with options and links to various information sources. In this way, users can check, for example, their stocks, mail, local weather, sports scores, and movie listings.

Other techniques exist that attempt to provide users with content that will be of particular interest to each user. For example, web sites may track items such as books and Digital Video Disks ("DVDs") based on attributes of such items, such as title, author, performer, and genre. By tracking previously-purchased books and DVDs, registered users may be presented with a web page offering items with similar attributes.

Video recording systems may allow users to voice opinions about specific television shows. Coupled with a programming guide, these video recording systems can later record concurrent episodes of the show or shows starring the same actor or shows of similar interest. Such systems may include personal video recorders ("PVRs"), which typically require a set-top box located at the viewer's location, along with a subscription service, to implement PVR services.

In another example, portals are capable of providing categorized content in disparate pieces (sometimes referred to as "iViews"), where each iView and its associated content can be aggregated into a single delivery package (for example, a web page). Users may select a category of content to be included within each iView, and may generally choose which iView(s) to see and exercise some control over how it is positioned inside the aggregated result.

In practical implementations of portals utilizing iViews, however, most users set up their portal once, if at all, and will thereafter simply keep these initial preferences. As a result, such users may miss out on viewing new content and categories of content that may be more interesting than the iViews originally selected. Similarly, content which is most interesting to the user at a particular time will not be properly emphasized within the aggregated result, such that the user does not give it the attention it is due.

Even if users update their iView configuration very frequently, each configuration is still static. That is, the set of iViews shown, and the order in which they are shown, is constant. Moreover, although the content of each iView may change over time (for example actual news headlines), its overall subject is static (for example, company news).

Conventional portals often concentrate on the computer screen as the main output device thru which the user will receive the delivered content. The scope may be further limited if the portal is rendered in Hypertext Mark-up Language ("HTML") and runs in a web browser. Even when mobile devices like personal digital assistants ("PDAs") and smart cellular phones are used to access conventional portals, the portals are often still rendered in a type of browser.

Such a browser-limited approach may have emerged from an impression that browsers are ubiquitous on many client machines and that portals leave no-footprint on those clients by rendering to them. However, by heading in that direction the portal vendors have limited the capabilities of the portal and the distribution of the content. Moreover, to the extent that delivered content is typically text or image-based in a browser, users may have come to expect only those formats.

The browser-centric approach is usually used for the average business user who comes in to the office in the morning, and logs-in to his computer. However, there are many scenarios that prohibit access to computers. For example, many blue-collar employees do not have computers at their place of work. Also, many people are simply not computer savvy, and/or find computers intimidating. Even the savvy computer user has situations where using a laptop is difficult or impossible (the drive to the office, for example).

Other systems for providing information to users also offer the feature of personalizing information for a particular user or group of users. Examples of such systems include Internet search engines, which allow users to input terms about which the users would like more information, and return documents (or links to documents) containing these terms. Such personalizable information systems have various techniques for allowing users to input their preference information.

SUMMARY

In contrast with the above, one implementation of a content presentation system described below enables dynamic selection of the shown set of iViews, based on an individual relevance of each iView to the user at any given time. That is, this implementation allows the user to personalize content based not only on its expected result (that is, the type of iView), but also on its actual result (that is, actual content of the iView).

In another implementation, a system incrementally learns the user's preferences regarding previously-shown items and categories, and uses that information to decide what content should be shown to the user in the future. Time also may be of significance, for example, by playing a part in deciding a level of relevance for each iView with respect to a specific user.

In another implementation, a system combines the concepts of the portal and personalized content with other delivery channels, such as, for example, telephone, radio, and television. The synergy opens up many new opportunities, such as "Enterprise TV," wherein a television is placed in a lobby of a company, the company cafeteria, or other high-traffic areas, or "Enterprise radio," wherein news (particularly company news) is broadcast to all employees over the airwaves. Yet another example is voice mail, wherein messages are left on the employee's voice mail. In this last example, participants of a meeting can easily be notified when a meeting is postponed.

In another implementation, user preferences for the various functionalities just listed, and for other functionalities, may be input by a user by way of a pop-up window with which the user may express a level of interest, or disinterest, with respect to a particular term. More specifically, the pop-up window may be provided to the user proximate to the term about which the user is to express preference information, upon selection of that term by the user.

By inputting preference information in this way, a user may take a more convenient and streamlined approach to various applications. For example, a user can implement an Internet search in a streamlined, progressive manner, or can modify a personal portal page, or can express an opinion about a particular element of an audio and/or video presentation. By expressing his or her opinion about an element of content, while accessing the content, a number of screens/processes that the user must access is minimized.

According to one general aspect, a media asset is output for presentation to a user on a presentation device, based on preference information, where the media asset includes content. An element is identified from within the content on the presentation device, and a preference indication regarding the element is accepted. The preference information is updated based on the preference indication.

Implementations may have one or more of the following features. For example, the preference indication may be accepted while the content is being accessed by the user. In identifying the element, the element may be highlighted within the content and on the presentation device, or may be reproduced apart from the content and within a designated area of the presentation device. In the latter case, the designated area may be a designated frame within a browser.

In identifying the element, the element may be determined to be contextually important to the content, or may be determined to appear frequently within the content. Also in identifying the element, a correlation may be determined between the element and the preference information, or a metadata enhancer may be applied to the content, or the element may be recognized as being previously selected by a metadata enhancer.

In accepting the preference indication, a preference range may be provided for accepting an extent of a like or dislike of the element, and a point within the preference range may be accepted as the preference indication. Also in accepting the preference information, a pop-up window may be provided within the presentation device and proximate to the element, where the pop-up window is operable to accept the preference information.

Outputting the media asset, identifying the element, accepting the preference indication, and updating preference information may be performed during a session with a user. In this case, the preference information may be stored for a duration of the session, or may be stored after a termination of the session.

In outputting the media asset, a portal page may be output, where the portal page includes a section operable to display the content and the element to the user, based on the preference information. In this case, the section may be operable to search data and to select the content from the searched data, based on a query specification associated with the preference information, thereby generating a portal-based media asset. Further, the portal-based media asset may be included in an iView. Additionally or alternatively, the query specification may be modified, based on the accepted preference indication.

In outputting the media asset, a reverse-query portal page may be output, and the media asset may be selected from a pre-compiled pool of media assets.

Also in outputting the media asset, a plurality of links may be output to the presentation device, where each of the links provides a connection to one of a plurality of media assets. Further, a selection of a first link may be accepted, where the first link corresponds to the media asset, and the media asset may be transmitted for presenting on the presentation device, in response to the selection. In this case, the plurality of links may be output as a search results page for displaying the links based on a relevance of the media assets to search terms selected by the user.

Further, in accepting the preference indication, the preference indication may be accepted while the media asset is being presented, while, in updating the preference information, the search terms may be modified based on the preference information. Then, the search results page may be updated, based on the modified search terms. Also, the search terms may be modified, based on the preference information, to obtain modified search terms, and a modified search results page may be output based on the modified search terms.

The media asset may include an audio-video media asset, and the presentation device may include a video display, and the element may be identified by reproducing on the video display, as text, a spoken portion of the audio-video media asset. In this case, in identifying the element, data associated with a sub-channel associated with a broadcast of the audio-video media asset may be analyzed.

The media asset may include an audio media asset, the presentation device may include an audio presentation device, and the element may be identified by reproducing the element aurally.

The media asset may include an email.

According to another general aspect, a user interface includes a first portion for displaying a media asset, based on preference information, where the media asset comprising content. The user interface also includes a second portion for distinguishing an element of the content, and a third portion for accepting preference information related to the element.

Implementations may include one or more of the following features. For example, The preference information may be accepted while the media asset is being displayed. The second portion may include a highlighted portion identifying the element within the content of the media asset and on the user interface. The second portion may include a designated area of the user interface, the designated area displaying the element separately from the content of the media asset. In this case, the designated area may be a designated frame within a browser.

The third portion may include a preference range for accepting an extent of a like or dislike of the element. The third portion may include a pop-up window within the user interface and proximate to the element.

The user interface may display a personalized portal page, where the portal page includes a section operable to display the content and the element to the user, based on the preference information. In this case, The section may be operable to search data and to select the content from the searched data, based on a query specification associated with the preference information, to thereby generate a portal-based media asset. The portal-based media asset may be included in an iView. The query specification may be modified, based on the accepted preference indication.

The user interface may display a reverse-query portal page, and the media asset may be selected from a pre-compiled pool of media assets.

The user interface may display a search results page containing a plurality of media asset subsets pertaining to search terms selected by a user. In this case, the media asset subsets may each contain a content subset and provide a connection to a corresponding media asset. Further in this case, the content subset may contain the element. The media asset may be associated with a first one of the media asset subsets, in which case the preference information may be used to modify the search terms.

The media asset may include an audio-video media asset, and the first portion may include a video display, and the second portion may include the element displayed on the video display, as text. In this case, the text may be reproduced from a spoken portion of the audio-video media asset, or the text may be determined from analyzing data associated with a sub-channel associated with a broadcast of the audio-video media asset.

According to another general aspect, an apparatus may include a storage medium having instructions stored thereon, and the instructions may include a first code segment for presenting a media asset, a second code segment for locating content elements of the media asset, a third code segment for identifying the content elements within the media asset, and a fourth code segment for accepting preference information related to a first content element from among the content elements.

Implementations may include one or more of the following features. For example, the fourth code segment may accept the preference information while the media asset is being presented. The second code segment may include a fifth code segment for applying a metadata enhancer to the content.

The second code segment may include a fifth code segment for recognizing the content elements as being previously located. The third code segment may include a fifth code segment for visually highlighting the content elements within the content, or may include a fifth code segment for reproducing the content elements apart from the content and within a designated area of a presentation device.

The designated area may be a designated frame within a browser.

The second code segment may include a fifth code segment for determining that the content elements are contextually important to the content, or a fifth code segment for determining that the content elements appear frequently within the content, relative to non-selected content elements, or a fifth code segment for determining a correlation between the content elements and the preference information.

The fourth code segment may include a fifth code segment for providing a preference range for accepting an extent of a like or dislike of the element, and a sixth code segment for accepting a point within the preference range as the preference indication. In this case, the fifth code segment also may include a seventh code segment for providing a pop-up window within a presentation device and proximate to the element, the pop-up window providing the preference range.

The fourth code segment may include a fifth code segment for storing the preference information between multiple sessions of a user who is associated with the preference information.

A fifth code segment for outputting a portal page may be included, where the portal page includes a section operable to display the media asset to the user, based on the preference information. In this case, the section may be operable to search data and to select the media asset from the searched data, based on a query specification associated with the preference information, thereby generating a portal-based media asset.

A fifth code segment for determining a search result set based on the preference information may be included, where the preference information includes search terms, and a sixth code segment may be included for outputting a search results page based on the search result set.

The media asset may include an audio-video media asset, the second code segment may be for displaying the audio-video media asset on a video display, and the third segment may visually identify the content element by reproducing on the video display, as text, a portion of the audio-video media asset. In this case, the apparatus may include a television receiver connected to the video display, or the third code segment may include a fifth code segment for analyzing data associated with a sub-channel associated with a broadcast of the audio-video media asset.

According to another general aspect, a system includes a preference database operable to store preference information associated with a user, a media asset database operable to store media asset information, and a server operable to interact with the preference database, the media asset database, and a display viewed by the user, to thereby display a media asset, based on preference information, for viewing by the user. The server includes instructions for providing a metadata presentation system operable to distinguish content elements within the media asset on the display, and a preference input system operable to input a user modification to the preference information with respect to a selected one of the content elements, while the media asset is being displayed on the display.

Implementations may have one or more of the following features. For example, a metadata enhancer may be included for locating the content elements.

The metadata presentation system may be further operable to locate the content elements based on an operation of a metadata enhancer that is external to the system.

The preference input system may be operable to provide a pop-up window on the display in the vicinity of a selected one of the content elements. In this case, the pop-up window may display a preference range for accepting an extent of like or dislike of the selected one of the content elements.

The metadata presentation system may be further operable to visually highlight the content elements on the display, or to reproduce the content elements within a designated area of the display, apart from the media asset. The media asset information may include links to media assets stored externally to the system, or may include stored media assets.

The system may be a personalized portal system, and the preference information may be used to generate a plurality of media assets. Alternatively, the system may be a search system, and the preference information may be used to determine search terms used by the search system to generate a set of search results.

The details of one or more implementations are set forth in the accompanying drawings and the description below.

Other features will be apparent from the description and drawings, and from the claims.

DESCRIPTION OF DRAWINGS

FIG. 7 is an example of an article.

FIG. 14 is an example of an article used in one implementation of the system of FIG. 13.

FIG. 19 is a first screen shot illustrating an operation of the search engine of FIG. 17.

FIG. 22 is a fourth screen shot illustrating an operation of the search engine of FIG. 17.

FIG. 23 is a fifth screen shot illustrating an operation of the search engine of FIG. 17.

FIG. 24 is a sixth screen shot illustrating an operation of the search engine of FIG. 17.

FIG. 25 is a seventh screenshot illustrating an operation of the search engine of FIG. 17.

FIG. 26 is a screen shot illustrating a technique for entering preference information.

DETAILED DESCRIPTION

Figure 1:
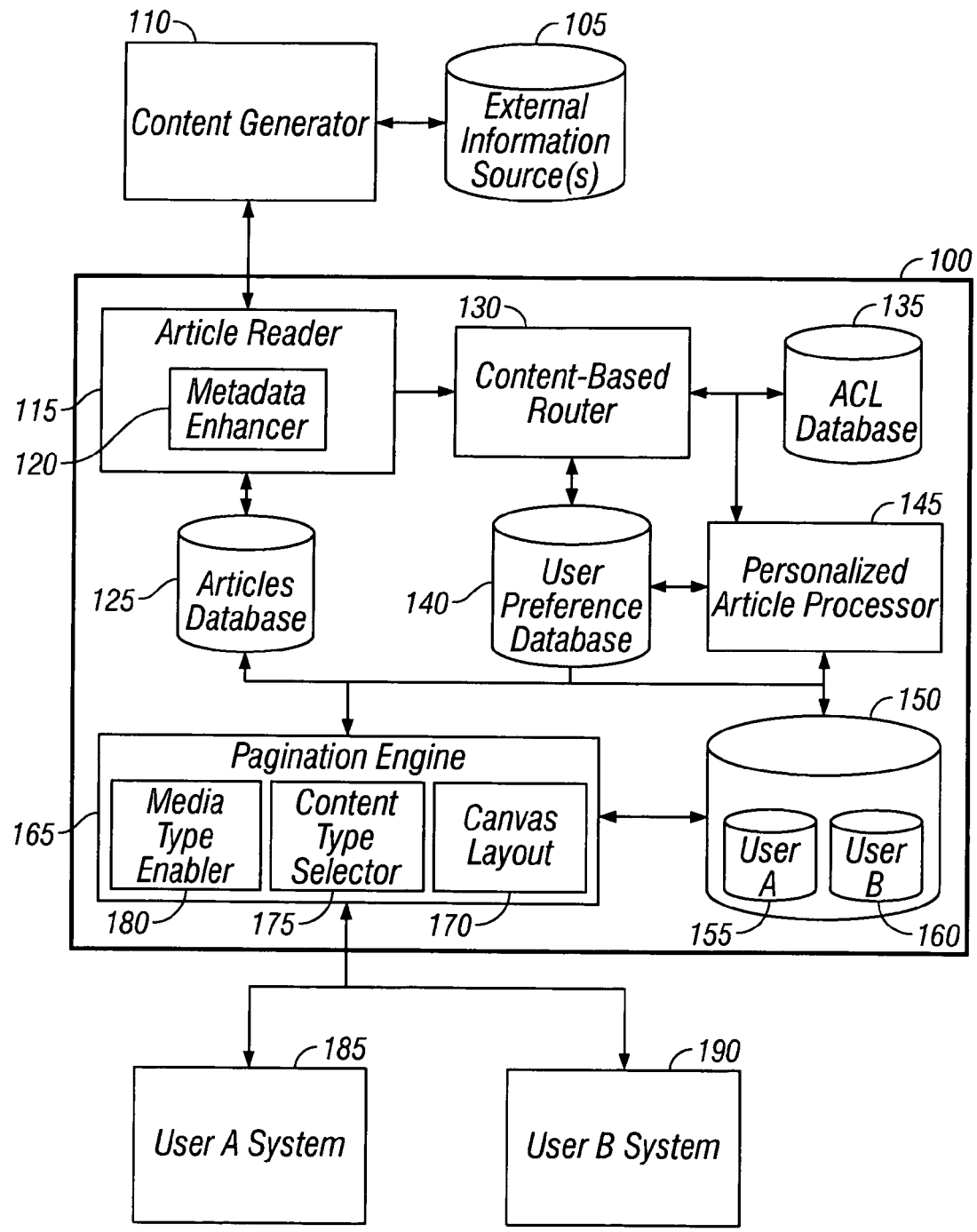
FIG. 1 is an architectural block diagram of one implementation of a content presentation system.

FIG. 1 is an example of a content presentation system including a system 100. In FIG. 1, external information from an external information source 105 is received by a content generator 110, which generates a corresponding article. Many types of external information sources 105 may be used, as will be discussed in more detail with respect to FIG. 2. Also, content generator 110 may utilize various techniques for gathering and publishing the information as discrete articles. For example, content generator 110 may utilize software agents to gather appropriate information (agents are generally defined as automatons running on a scheduled basis and querying a data source for information and either producing or not producing content based in part on the result of that query). Moreover, in other implementations, content generator 110 may be included within system 100.

The use of the term "article" in this context, as is discussed in more detail below, generally refers to a discrete collection of information that may include content and information about the content. Information about the content may include high-level attributes of the article, such as its author or general subject heading (for example, sports or weather). The information about the article also may include portions of the actual content itself used to articulate content metadata, perhaps in the form of "discussion objects."

In general, discussion objects are considered to be conceptual or tangible objects that are mentioned (discussed) as part of an article. Similarly, "discussion classes" are the types, or categories, of discussion objects. For example, an article about a discussion class of "computer manufacturers" may mention discussion objects "International Business Machines" ("IBM") many times, while only mentioning "Dell" infrequently. By determining at least some information directly from such specific discussion objects within the content of the article, this implementation is capable of accurately sorting articles against a user's interests.

Articles may be, for example, text, video, audio, HTML, or another available rendering medium, or a combination of two or more of these media. Articles may contain the same piece of content in multiple forms, and may permit generation of one type of content from another, as discussed below. Therefore, articles also may be referred to as "media assets," or other similar terminology describing such information to be passed on to a user. Content of an article may be a publicly-available web page (or portion thereof), an internal electronic mail, an individual's personal contact information, weather information, or a set of stock quotes. Content also may be obtained from specific applications, such as a profit and loss report of a company, an online analytical processing ("OLAP") report, a "print-out" of a sales order, or many other examples of discrete pieces of content to be made available to the user(s).

In FIG. 1, then, an article reader 115 accesses articles from content generator 110. Some articles may already include attribute and content metadata information. If a particular article has no associated metadata, a metadata enhancer 120 may be used to examine the content of the article and generate metadata accordingly. Even if some information, such as attribute information, is included with an article, metadata enhancer 120 may be used to further enhance the article.

In one implementation, system 100 may be provided to an enterprise as a resource for its employees and/or customers. The enterprise may have its own object model (that is, definition of permissible discussion objects) describing how the content metadata should be generated, characterized, and interpreted. These object models may differ from one enterprise to the next; for example, IBM might be a "customer" to one enterprise and a "supplier" to another. Individual enterprise object models can therefore be implemented instead of, or in conjunction with, a standardized, centralized object model.

In particular, articles generated within an enterprise may require very little metadata enhancement, whereas articles obtained from publicly-available web pages may require a substantial amount of metadata enhancement.

Accessed articles are stored in a database 125, and information referencing the articles is passed on to a content-based router 130. Although entire articles could be passed through the system 100, other techniques may be used. For example, only links to corresponding articles need be circulated through system 100, with the articles themselves remaining stored in database 125. As another example, such links may be circulated with the associated attribute and/or content metadata, but without the content itself; in this way, the article may processed (as discussed below), without actually having to circulate the article in its entirety.

Content-based router 130 examines each article with respect to its content and associated attributes and content metadata, for example, discussion objects, and compares this information to information stored for individual users. For example, an Access Control List ("ACL") database 135 contains a security clearance for each user with respect to various subjects, so that a user who is not cleared to receive certain information within an article will not receive that article. A user preference database 140 contains information about each user, for example, the extent to which a user likes or dislikes a particular subject, or the type of device(s) the user may be receiving the articles on.

Any type of router capable of routing articles based on content as described herein may be built and/or utilized to implement system 100. One type of router that is capable of performing the functionality of content-based router 130 is known as Elvin and is produced by the Distributed Systems Technology Centre (DSTC). Other types of content-based services include Gryphon, produced by International Business Machines (IBM), and Keryx, a Java-notification service by Hewlett Packard.

User preferences for populating user preference database 140 can be obtained by a number of techniques. For example, the preferences could be gained by asking users to fill out a preference form before gaining access to system 100. As another example, the preferences can be modified over time by obtaining feedback from the users, examples of which are discussed in more detail below.

By accessing databases 135 and 140, content-based router 130 is able to filter articles which are restricted or are of no interest with respect to a particular user. The action of content-based router 130 thus eases the burden on a personalized article processor ("PAP") 145, which has the job of individually prioritizing the remaining articles, based on a comparison of contents of the user preference database 140 to the content and to the content metadata/attributes of each article. Accordingly, individually-sorted articles may be stored in a sorted articles database 150, where articles for a User A and a User B are stored with their corresponding priority information for each user in database portions 155 and 160, respectively.

A pagination engine 165 thus gains access to a set of articles associated with, and prioritized with respect to, individual users. Pagination engine 165 will typically have access to characteristics of the client system being used by each user. This information may be stored in user preference database 140, or (as explained in more detail below) it may be determined from the user request at the time of the request.

In either case, pagination engine 165 determines a layout of the canvas being used by each user, using a canvas layout subsystem 170. In this context, the term "canvas" includes any rendering media in which articles may be presented. Canvas examples include web pages (on desktop computers, laptops, Personal Digital Assistants ("PDAs"), web-enabled cell phones, etc.), audio (for example, cell phone or radio), video (for example, television or Motion Picture Expert Group ("MPEG") player), or another type of device capable of receiving content within an article and presenting it to the user.

Since, as a practical matter, a canvas will typically have capacity limitations, one of the services of the canvas layout subsystem 170 within pagination engine 165 is to determine how much "space" is available to the user for displaying articles. For example, a web browser on a PDA will be able to display a smaller number of articles than a browser on a desktop computer. As another example, a user who receives audio articles via cell phone or radio may only have twenty minutes during a car ride during which to listen to articles. In short, canvas layout subsystem 170 determines any user-specific capacity constraints when deciding which articles to provide to a given user.

A content-type selector 175 determines which rendering media are available to the user for the selected canvas, and which articles are consistent, or can be made to be consistent, with that media. For example, content-type selector 175 may determine that a canvas has video and HTML capabilities, but not audio.

Finally within pagination engine 165, a media-type enabler 180 is available to enable a rendering media that would not ordinarily be available to the user (based on the content type(s) of the articles), when feasible and desired. One example of this feature is the capability of reading aloud to the user an email that is included as an article. Another example is the generation of an animation of a newscaster, complete with moving lips, to read aloud a print story to the user. These and other examples are discussed in more detail below.

During a final portion of the pagination process, pagination engine 165 aggregates the selected articles, in their selected formats, and delivers a personalized "page" of information to each user, so that each user receives articles for rendering that are of the most interest to him or her at a given point in time (or that the system determines the user should/must see, even if the user has expressed non-interest in such an article, such as a direction from the user's boss, or an article about a "hot" topic of the day). User systems 185 and 190 thus receive information suitable for rendering a page of information consistently with their respective system capabilities and requirements.

System 100 also may receive feedback from the users to be recorded in user preference database 140, so that the pages increasingly become better-personalized to each user as time goes by. The use of user preference feedback, as well as various formats in which pages may be rendered, are discussed below.

System 100 may be implemented in an enterprise environment, as discussed above, for the convenience of employees and/or customers of the enterprise. Implementations may be utilized via various other private networks, such as a university or other school network. On the other hand, implementations may be provided to members of the public at large, via the Internet.

Figure 2:
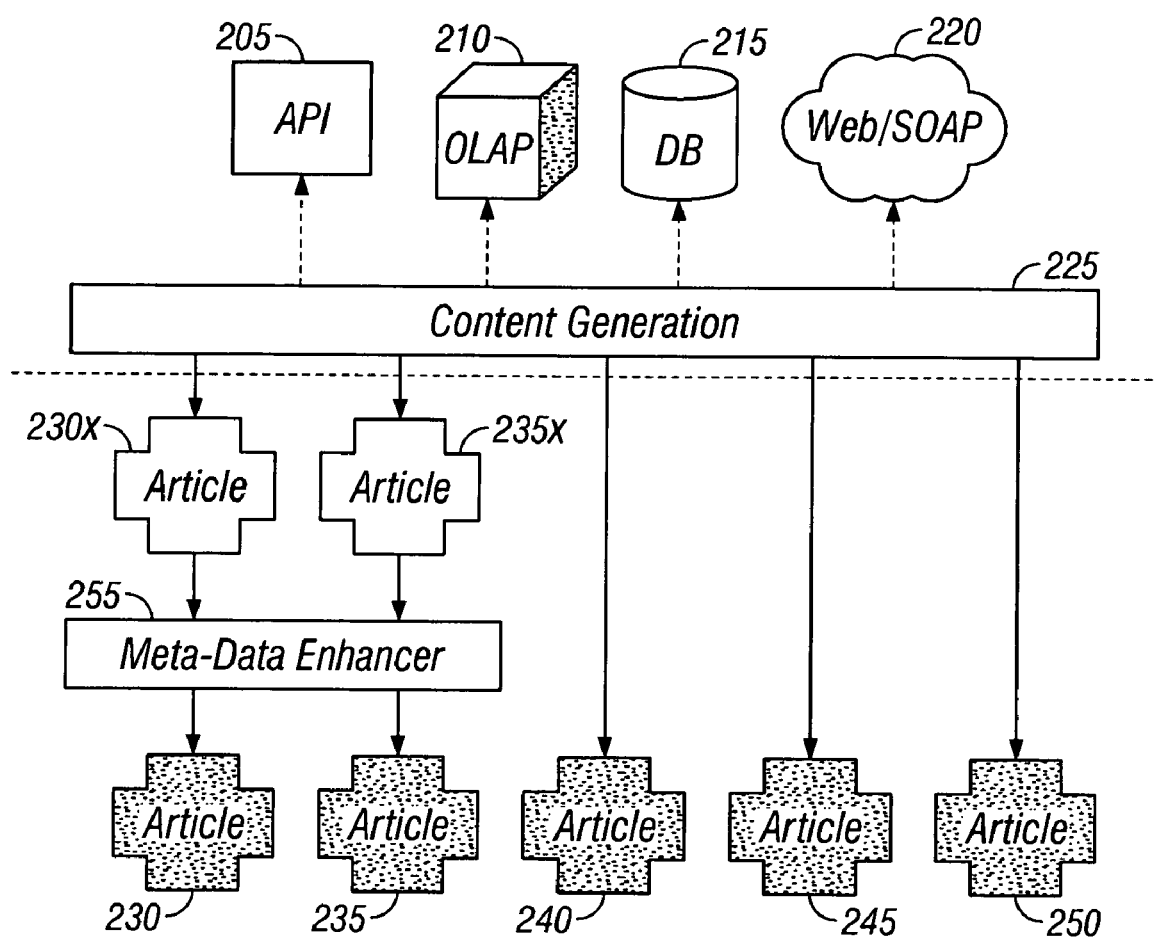
FIG. 2 is an example of a first portion of a process flow used by the system of FIG. 1.
Figure 3:
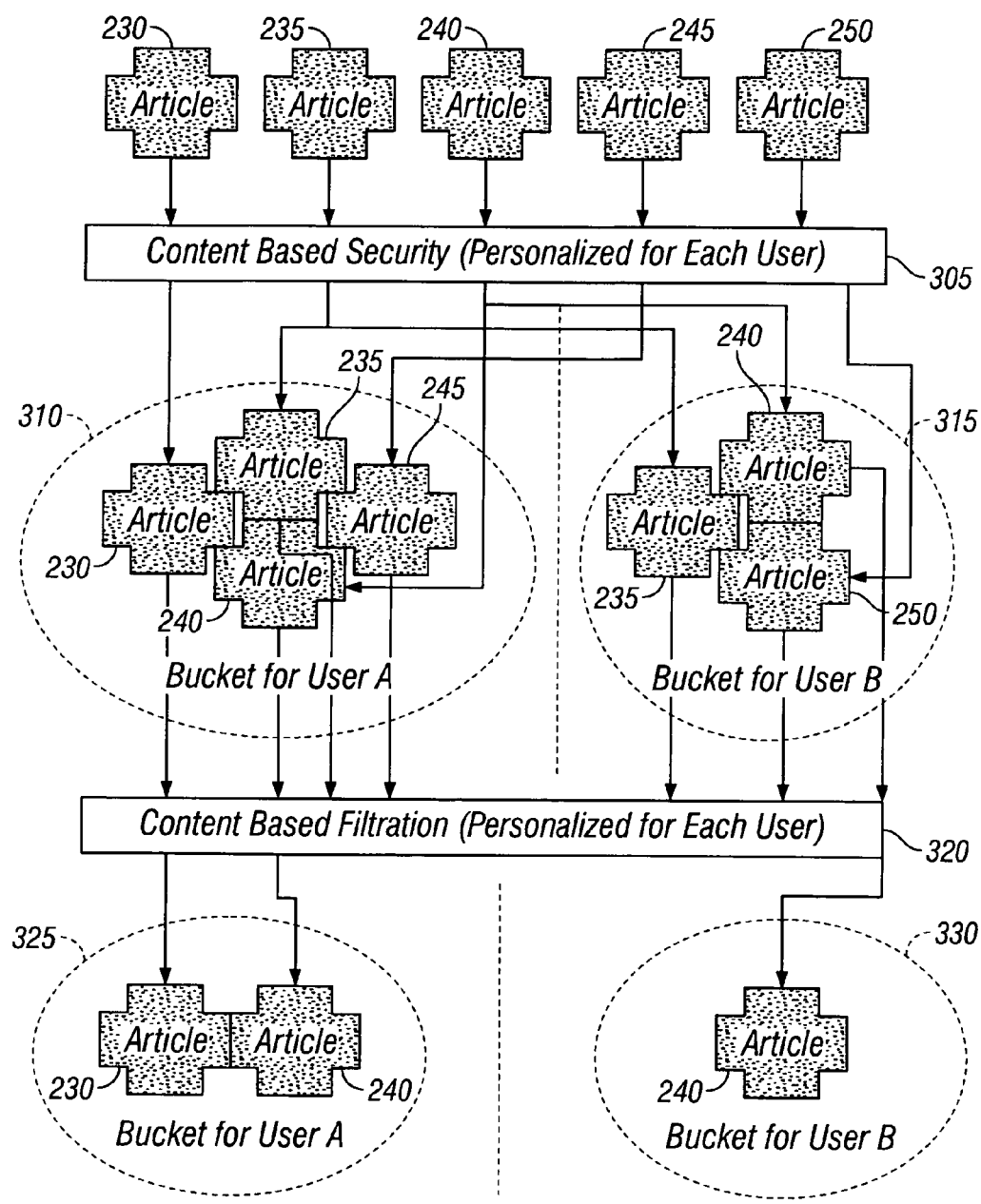
FIG. 3 is an example of a second portion of a process flow used by the system of FIG. 1.
Figure 4:
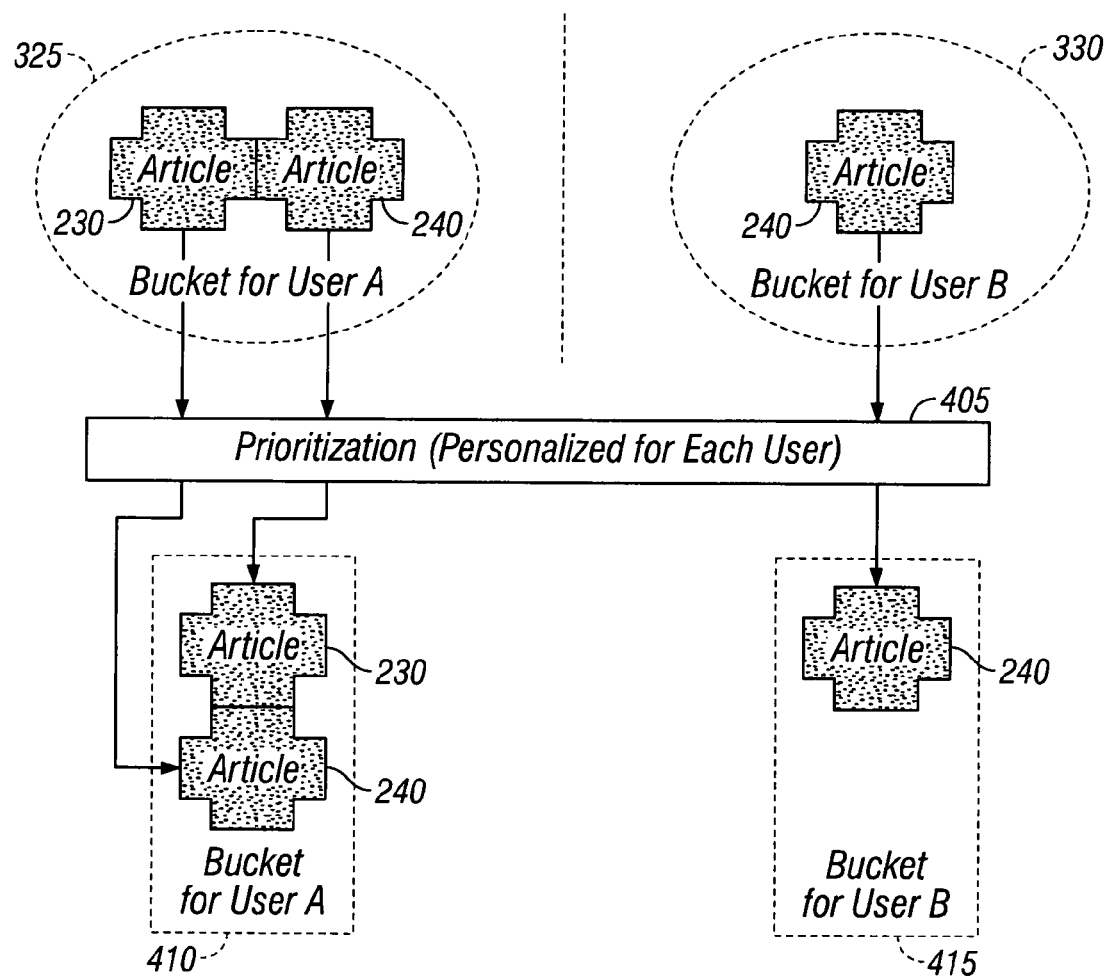
FIG. 4 is an example of a third portion of a process flow used by the system of FIG. 1.

FIGS. 2-4 demonstrate a process flow that might be used by the system of FIG. 1. FIG. 2 demonstrates a technique for gathering a pool of articles to be later filtered, sorted, and rendered to a user. In FIG. 2, sources of information for articles might include an application's application program interface ("API") 205, an on-line analytical processing ("OLAP") server 210, a database 215, and the world-wide web 220 (perhaps queried through the hypertext transfer protocol ("HTTP"), simple object access protocol ("SOAP") or other common protocols of the Internet).

Content generation occurs in a process 225, during which articles are generated. Some articles, such as articles 230$x$ and 235$x$, might be generated without attribute information or content metadata. In this case, meta-data enhancer 255 may be used to examine such articles and generate content metadata to thereby produce articles 230 and 235. Other articles, such as articles 240, 245, and 250, may already be generated with attribute data (describing general features of the articles such as author and date of publication) and content metadata (characterizing actual content of the articles). It should be noted that, in FIGS. 2-4, articles including content metadata are illustrated with a dotted background, whereas articles having no content metadata (such as articles 230$x$ and 235$x$) are shown with a plain background.

It should be understood that various techniques may be used for gathering article content. For example, software agents may operate in an agent execution environment which may serve as a host for the runtime execution of agents and administer execution of the agents (for example, scheduling of the agents). The agents may be used to query various databases, such as those shown in FIG. 2. On the other hand, the content could also be generated within system 100, as referred to above with respect to FIG. 1, or could be obtained by a variety of other means.

Examples of content that might be obtained according to FIG. 2 include a querying of the OLAP database 210 for a list of the top twenty customers in a particular region of an enterprise implementing system 100. For each one of these customers, an agent may access the API 205 of a customer relationship management ("CRM") application, and then report the list of top customers that have pending complaints with customer service. This list may be used as an article, as discussed below.

Another example of content for articles might be current levels of the financial markets, gleaned from the web 220. Many other types of content, whether internal to an enterprise or simply drawn from the public domain, may form the basis for an article.

In FIG. 2 and continuing into FIG. 3, articles 230, 235, 240, 245, and 250 thus represent a pool of articles, from which a subset for each user will be drawn. Once a pool of articles is established at a given point in time, a content-based security analysis 305 may be performed, the analysis being personalized for each user. Analysis 305 may be performed within content-based router 130 by accessing ACL database 135, both of FIG. 1. In this way, articles which a particular user does not have security rights to access will be removed prior to actual content-based sorting, in order to make the sorting process more efficient.

After security analysis 305 is complete, a "bucket" 310 of articles exists for a user A, and a separate bucket 315 of articles exists for user B. At this point, content-based filtration analysis 320 occurs, wherein the content-based router 130 interacts with user-preference database 140 in FIG. 1 to determine which of the articles in buckets 310 and 315 match the interests of users A and B, respectively. This process results in refined buckets 325 and 330, as shown in FIG. 3 and continuing into FIG. 4.

FIG. 4 demonstrates a prioritization process 405 that occurs within PAP 145, using data from within user preference database 140 in FIG. 1. As a result of process 405, articles within buckets 325 and 330 are prioritized and stored in final buckets 410 and 415, in accordance with the preferences of users A and B, respectively. Although FIG. 4 shows only a few articles in buckets 410 and 415 for the sake of clarity, the number of articles that can be assigned to a given user as a result of the operations of FIGS. 1-4 can be significantly higher and is limited only by system performance considerations.

Figure 5:
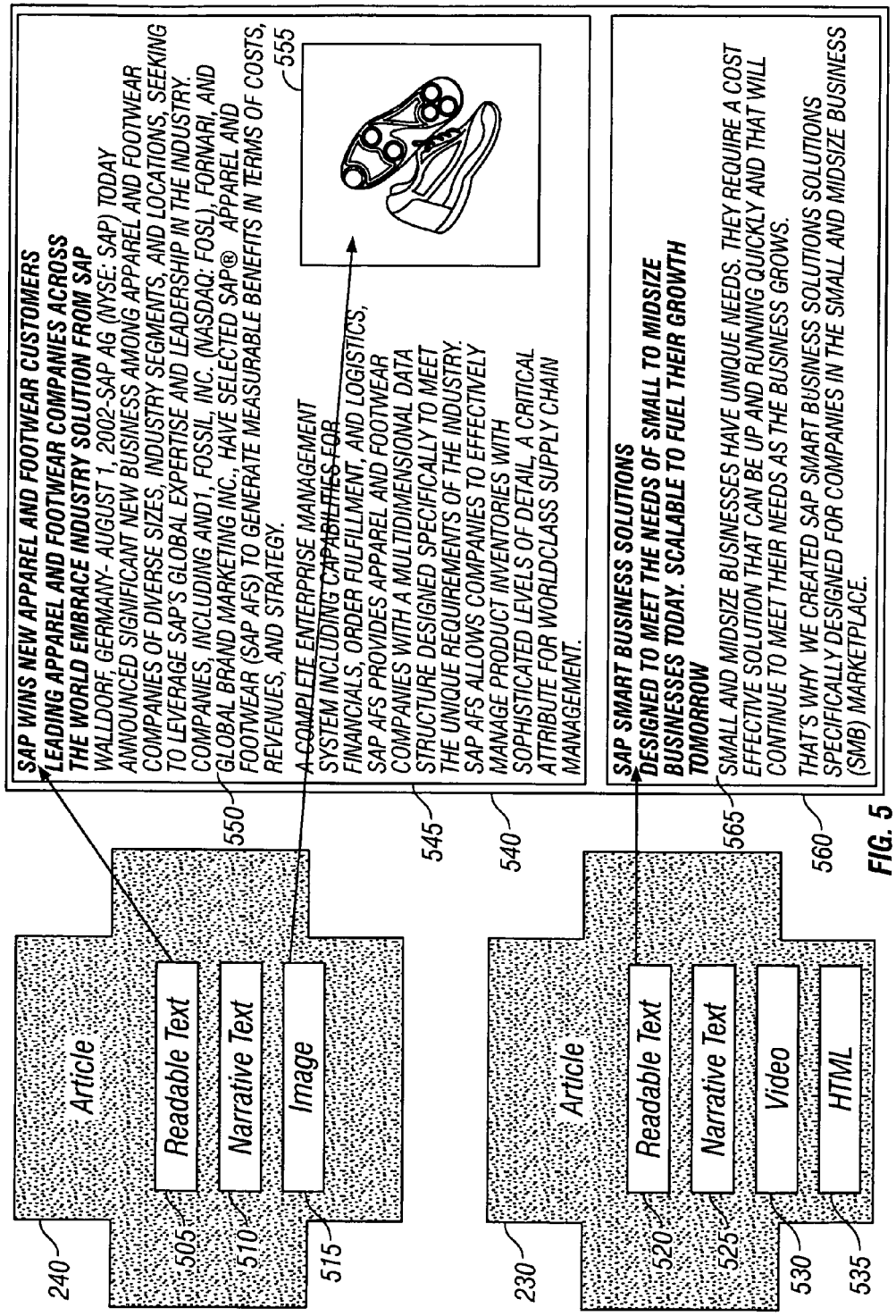
FIG. 5 demonstrates a first example of page generation.

Once the articles have been filtered, sorted, and prioritized, system 100 may begin the pagination process. FIG. 5 demonstrates a first example of page generation. In FIG. 5, articles 240 and 230, which were stored in bucket 410, are shown to contain content in various formats suitable for rendering in various media. For example, article 240 contains content blocks in the form of a readable text block 505, a narrative text block 510 (that is, text to be read as audio), and an image block 515. Similarly, article 230 contains content blocks in the form of a readable text block 520, a narrative text block 525, a video block 530, and an HTML block 535.

Based on knowledge of a user system onto which the page will be rendered, a page 540 is then created by pagination engine 165. In the example of FIG. 5, the user system capabilities and/or user preferences indicate that the article should be rendered as HTML and therefore only readable text and associated images are to be utilized.

Accordingly, page 540 includes article 240 rendered as a section 545, as well as article 230 rendered as a section 560. Section 545 includes readable text content block 505 rendered as a portion 550 in HTML form, as well as image information content block 515 rendered as an image 555 as part of the HTML. Article 230 includes only readable text content block 520 rendered as a portion 565, again in HTML form.

It should be understood from FIGS. 4 and 5 that article 240 was given a higher priority for display than article 230, and was therefore shown on page 540 prior to article 230. In general, relatively more important articles might be shown in a more prominent location on the page, while the less important ones, space permitting, might only be shown as headlines with reference (for example, hyperlinks) to the full article.

Figure 6:
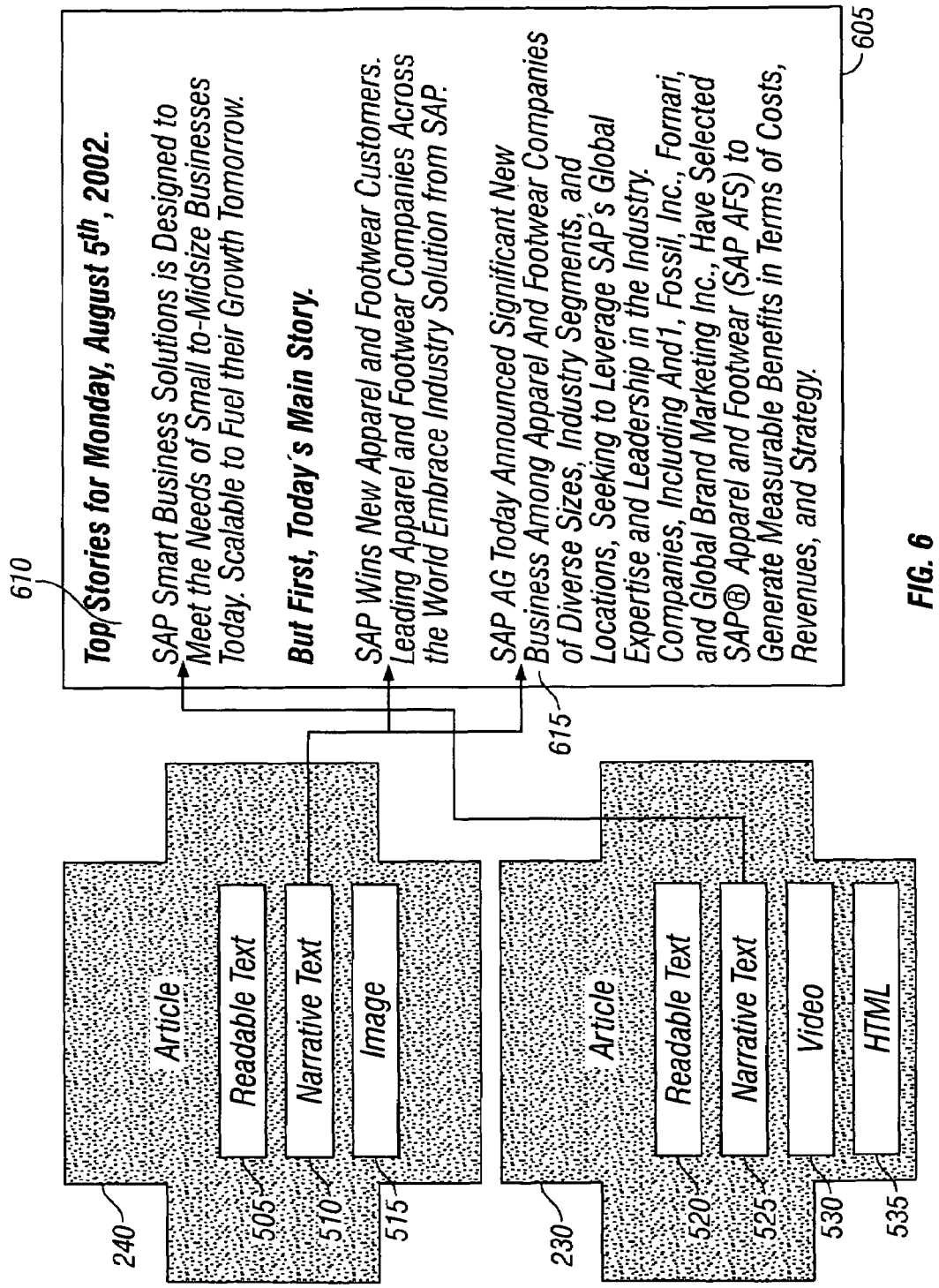
FIG. 6 demonstrates a second example of page generation.

FIG. 6 shows an alternate pagination process for rendering articles 240 and 230 within bucket 410. In FIG. 6, pagination engine 165 determines that user A should receive the content of articles 230 and 240 as audio. This might be the case for a user wishing to receive articles 240 and 230 via radio and/or cell phone. Accordingly, a page 605 includes a portion of narrative text content block 525 rendered as audio portion 610, as well as narrative text content block 510 rendered as an audio portion 615. In page 605, article 230 is still prioritized lower than article 240, and might therefore be generally be rendered subsequent to article 240. However, in page 605, a slightly different format is shown, in which a portion of lower priority article is shown as a "top story" to be discussed later in the page 605, whereas the higher priority article 240 is provided in its entirety as the day's "main story." Alternatively, a "teaser" for the main story could be given first, and then returned to after the less-important articles were read. Such alternate formats mirror popular formats of conventional news programs, and may be preferred by some users.

It should be understood from FIGS. 5 and 6 that an article may contain several content blocks or content segments, which might each represent a subset of the total amount of content within the article (or might include all of the content). Together, these portions represent the entirety of the article content, however, the content need not be shown in its entirety. For example, image 515 is not included in page 605, because the articles were to be rendered only as audio. Thus, the provision of at least a portion of an article's content, in a format most suitable for a particular user, allows maximum flexibility in providing the user with information in a personalized, convenient format.

FIG. 7 shows an example of an article used in one implementation. In FIG. 7, the article is expressed in one possible extensible markup language ("XML") form, however, other implementations of an article may take other forms. In a section 705, the article contains some general attributes like the time it was created, the importance of the story, and the author who created it.

Article 700 also contains several content blocks for one or more possible rendering scenarios. For example, a section 710 includes a "text/narrative" content block for cases where an audio description of the content is necessary (for example, if the content is to be broadcast on radio or read by a TV spokesman). This content block is analogous to narrative text content blocks 510 and 525, and includes a headline section 715, as well as a detailed content section 720.

A "text/html" content block is shown in a section 725, which is useful for cases where the content will be shown in a web browser. Section 725 also contains a headline in a section 730, as well as a body of information (in this case, a table) in section a 735.

Finally, article 700 includes a list of discussion objects in a section 740. As discussed above, these discussion objects can be included when the article is first generated, and/or can be added with metadata enhancer 120 after generation is otherwise complete. Section 740 includes relevant discussion objects that were part of the article content. In this example, four business partners were discussed in the content; therefore, the discussion objects block contains four objects of class "BizPartner." The article also relates to, and mentions in the content, the Eastern region and thus an additional object block is included to represent that object.

The discussion objects also include information about what is shown for the purpose of enforcing a security policy. In this example, article 700 shows sales numbers of customers and therefore a security realm is defined for that article stating that fact. Thus, in a filtering process such as process 305 in FIG. 3, users who are not allowed to see articles of this security realm will be denied access to the article.

Defining classes and determining what classes are available may be done in many ways. For example, classes could be rigidly defined and coupled to the system 100, or classes could be defined in a distributed manner based on the incoming messages. In the latter case, system 100 assumes that an object and class exist if and when such object or class are read in an incoming article. It does not try to enforce validity based on a pre-defined object model; in this case, the full list of discussion classes is the object model referred to above with respect to metadata enhancer 120.

Figure 8:
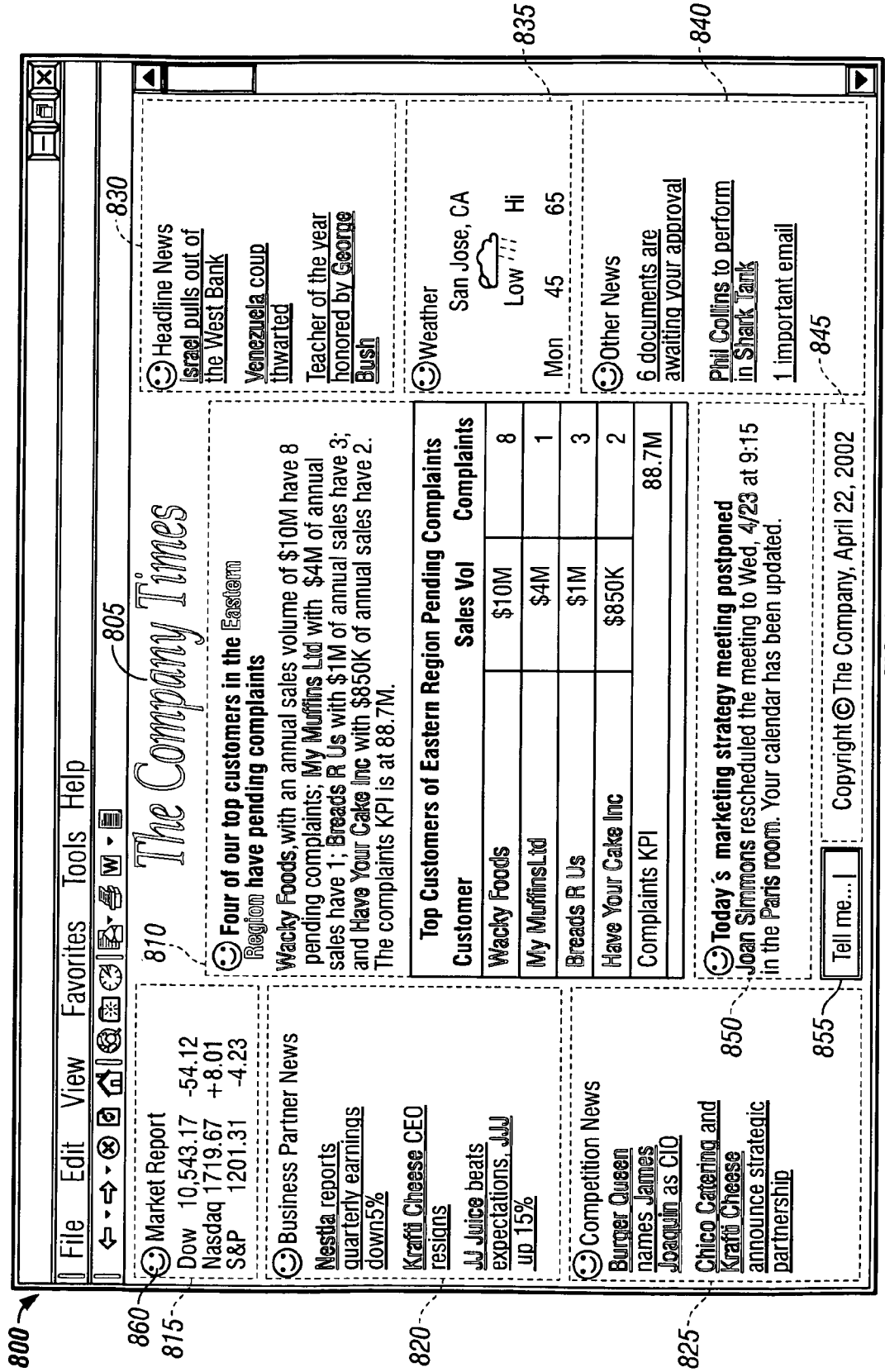
FIG. 8 is an example of a hypertext markup language ("HTML") result page.

FIG. 8 demonstrates an example of an HTML result page 800 that includes article 700. Page 800 is generally organized like a newspaper front page, having a headline 805 (which in this case indicates the enterprise sponsoring the page). A main story 810, corresponding to article 700, is shown in the upper middle portion of the page. A section 815 shows current levels of the Dow Jones, NASDAQ, and S&P 500. The rest of page 800 includes additional hypothetical articles not previously described.

The filtering, sorting, prioritizing, and paginating processes already described determine whether an article is displayed in full size (for example, article 700 in section 810), simply as a link (for example, links within sections 820, 825, 830, 835, 840, and 850, which are shown grouped together with similar articles), with a "more" link (not shown) that does not include any details but allows access to additional articles, or not at all (in case there is no room on the screen). The rules under which the articles are rendered generally take into account both subjective (that is, according to user preferences) and objective (that is, according to the author) levels of importance assigned to each article and its content.

In FIG. 8, the highest-ranking article occupies a central location. If two or more articles are categorized as highest ranking, then a number of options are available for deciding how and whether to display them. Examples include: (i) one article could be selected, at random or otherwise, (ii) all, or some, of the articles could be rotated in and out of the page (which uses time slicing as well as real estate allocation), (iii) if there is enough space, then all of the articles could be displayed, or at least part of each of them, for example, by giving each article the same amount of space or allocating space based on priority, and (iv) one article could be selected for full, or primary display, and the others could be identified with links indicating the title of the article or with a "more" link.

The concept of using time as a variable (T), as well as space (which can be considered as a single variable of area or as two variables—X and Y), can be applied in many ways to render prioritized data on a page or other format. For example, articles or other data could be displayed at particular locations for specified times, scrolled, formed into a collage, zoomed in and out with a fixed or variable size space, etc.

It should be noted that articles within page 800 may take many various forms besides the form of a general news articles. For example, section 840 includes an email that can be read by, or read to, the user. Section 840 also includes internal documents to be approved by the user. As a final example, section 850 is devoted to a personal scheduling issue of the user.

In any case, page 800 is generally arranged such that more important articles, as determined by system 100, are assigned a more prominent position and/or size, whereas less important articles are assigned a less prominent position and/or size (and/or are shown only partially or in summary form). Such prioritized assignment of "real estate" on page 800 is generally without respect to a given category into which an article of page 800 might fall, but rather, as explained above, is determined based on the actual content of the article(s).

Some implementations may group together articles of similar type or content, and in essence "categorize" the page view. For example, all email articles might be shown together. Such categorization may be done dynamically, based on the available content. In some of these implementations, categories such as "emails" may be used due to the presence of a large number of articles within that category for a particular user; in these cases, a combined priority weighting may be used to determine their (collective) prominence on page 800. In others of these implementations, a location for a specific subset may be determined in advance; such fixed positioning may be used for all or part of page 800.

Page 800 may allow the user to express his preferences regarding what is shown in several different ways. In this implementation of the user interface ("UI"), every identified discussion object in the page is highlighted and also an icon (for example, "smiley face" 860) is located next to some articles or groups of articles. By clicking on any of these icons and/or discussion objects, the user is provided with a dialog that allows him to express his opinion on the object or article associated with the point where he clicked.

For example, user A may have previously indicated that articles about the customer Wacky Foods (the company's most important customer) are to be upgraded. Article 700's importance is shown as Normal within section 705 of FIG. 7, but since it discusses Wacky Foods, its importance level is upgraded to Important for user A. Article 700 may thus be shown in a more prominent location in the result page for user A.

A future article about Wacky Foods may come in as already being designated as Important. In such a case, user A's upgrade will make that article Critical, emphasizing it in the result page 800. This later article will then show more prominently than article 700.

Figure 9:
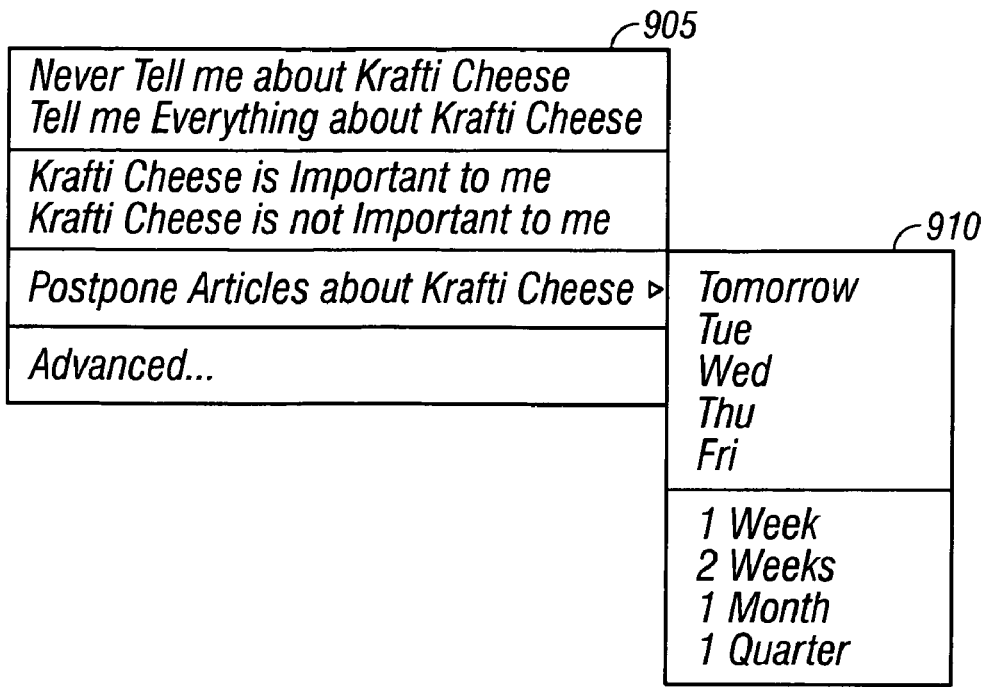
FIG. 9 is a first example of a context menu designed to allow users to input preference information.

Further illustrating techniques by which a user may indicate preferences as to which articles should be shown and how they should be shown, FIG. 9 demonstrates a context menu 905 designed to allow users to input preference information. Context menu 905 may be accessed by a user by clicking on a highlighted discussion object within an article.

For example, a user may click on the words "Krafti Cheese" within one of the links contained in section 820. In context menu 905, the user is then able to indicate one of five possible opinions on Krafti Cheese: never to be shown articles about Krafti Cheese (but note that in cases where articles contain both Krafti Cheese and a discussion object that the user has expressed explicit interest in, the article may still be shown); always to be shown articles dealing with Krafti Cheese; upgrade (or promote) the importance of articles containing Krafti Cheese; downgrade (or demote) the importance of articles containing Krafti Cheese (if the user downgrades a discussion object some predetermined number of times, that discussion object may be thereafter blocked completely); and postpone articles about Krafti Cheese for a specified period of time (this option is useful if the user has more important tasks at the moment but wants to be informed of such articles at a more convenient time). In the last example, context menu 910 illustrates time periods which may be selected to set a length of a postponement.

Finally, context menu 905 includes an advanced opinion dialog, provided for cases where the user wishes to express, for example, complex conditional opinions on the discussion object. One such condition might be to block all articles about Krafti Cheese unless they are marked as important. Another example might be to block Krafti Cheese articles that originated from publicly-available sources. The "Krafti Cheese" article within section 820 referred to above, about a CEO resignation, is an example of such an article. The fact that it is publicly accessible may be indicated as an attribute of the article, for example, as a security realm, as a custom attribute, or by an author of the article.

It is also possible, though not shown in FIG. 9, to allow the user to express an opinion about the class of the discussion object. This option would allow the user to no longer receive articles concerning any business partners, not just Krafti Cheese.

In a similar fashion, the user may express an opinion about an article as a whole. For example, if the user is no longer interested in receiving a stock market update in section 815, the user may click on the "smiley face" icon 860 next to the market article in section 815.

Figure 10:
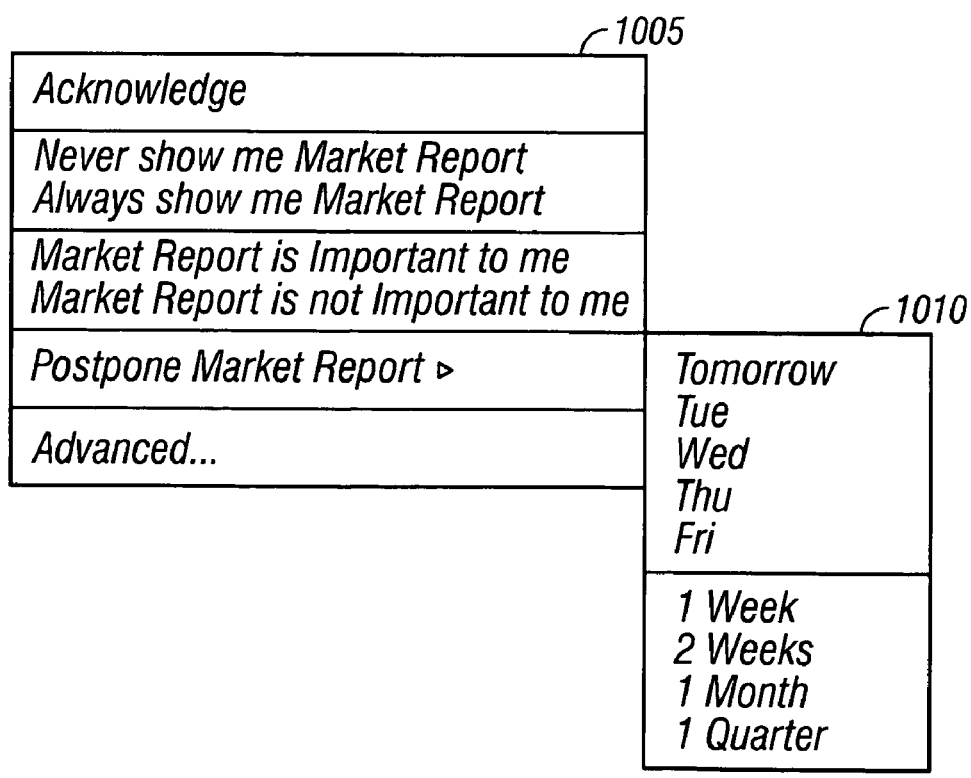
FIG. 10 is a second example of a context menu designed to allow users to input preference information.

FIG. 10 demonstrates an opinion dialog 1005 that enables the user to express his opinion about an article such as the market report article within section 815. Similarly to context menu 905, context menu 1005 allows the user to characterize the article in question. For the postpone operation, a box 1010 is available to provide similar options to those discussed with respect to context menu 910.

An additional option shown in context menu 1005 is the ability to Acknowledge an article, allowing the user to express the fact that he or she does not want to be informed of this particular instance of the article anymore. Future versions of the same article, however, would still be considered interesting to that user.

It is also possible to let the user provide more information. For example, the user may give a reason why he or she is no longer interested in this article, the reason being, for example, one of the discussion objects contained within the article. This feature may be useful in cases where the full article is not fully displayed on screen, and therefore its discussion objects are not visible. For example, the first article in section 840 talks about six documents, but names and authors are not shown as part of the link because of lack of space. The user may specify that he no longer wants to be notified about documents from John Doe (a hypothetical author of one of the documents), for example.

In many cases, the user would like to indicate his preferences regarding objects that are not currently displayed on the screen. Such objects may have been read in a story in a newspaper, or seen on TV, or heard in a rumor. For those cases, the system 100 provides a Tell Me input box or similar UI in section 855 that enables the user to enter the name of what he or she is looking for.

As an example, if the user heard from the sales manager that sales of Pizza Zitti are down 5% this quarter, the user can type in Pizza Zitti in the Tell Me box and press enter. The system 100 will look up the object that matches the text, possibly presenting several options for the user to choose from. In this case, Pizza Zitti is a product, so every article containing a reference to this product will be prioritized based on the user's preferences regarding Pizza Zitti.

Figure 11:
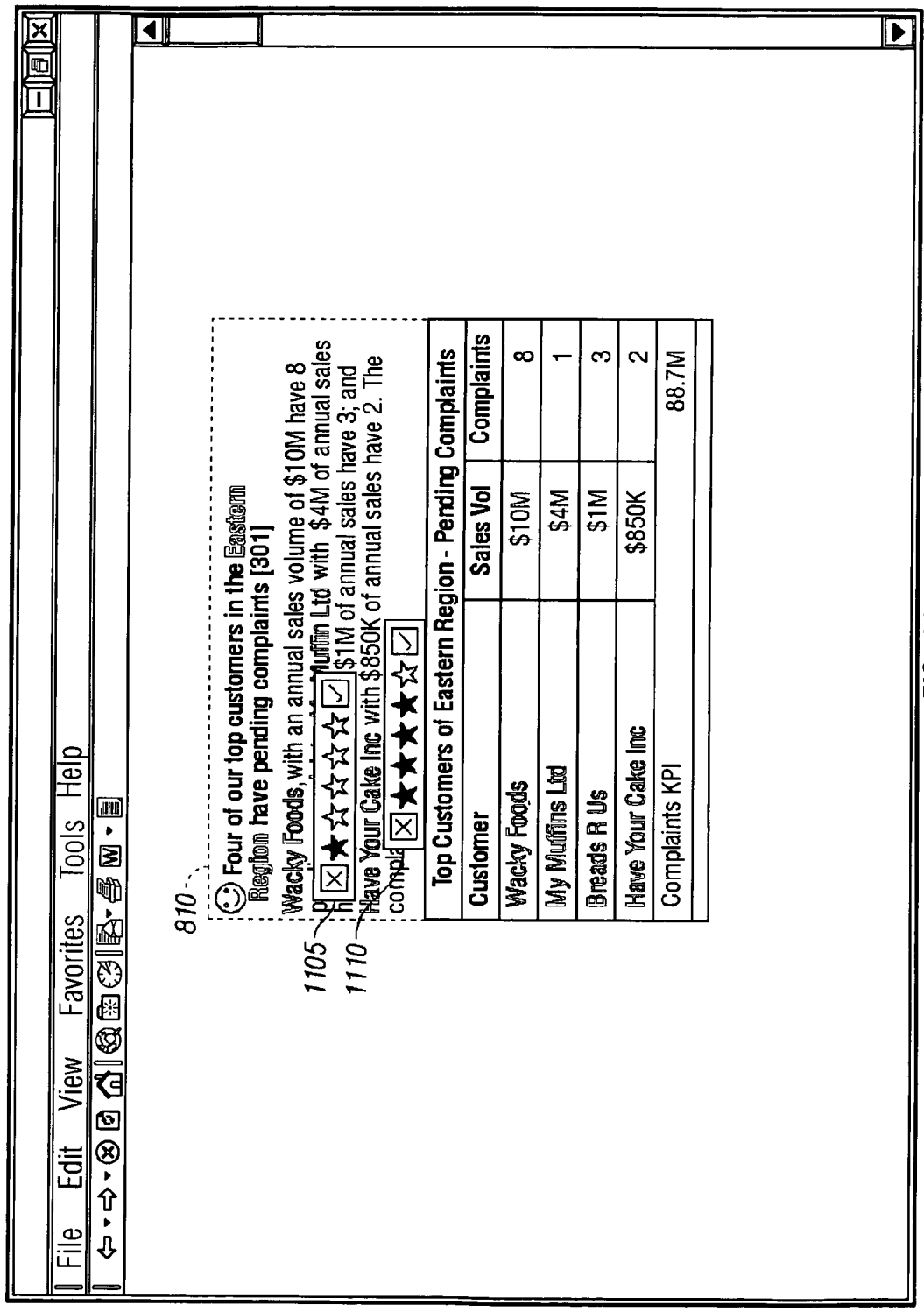
FIG. 11 is an example of a floating toolbar designed to allow users to input preference information.

FIG. 11 demonstrates a different technique by which the user may express his or her opinions about a discussion object. In FIG. 11, clicking on a highlighted discussion object results in a pop-up box that allows the user to rate the discussion object. In FIG. 11, the discussion object "Wacky Foods" has been given one out of a possible five stars in pop-up box 1105, whereas the discussion object "Have Your Cake, Inc." has been given four out of five stars in a pop-up box 1110. Pop-up boxes 1105 and 1110 also include an "x" and a "check" box, by which a user may choose to "block" the given object or select to "always see" it in the future, respectively, as described above. Pop-up boxes like boxes 1105 and 1110 may be used with respect to individual discussion objects, classes of discussion objects, or may be used with respect to articles as a whole.

Figure 12:
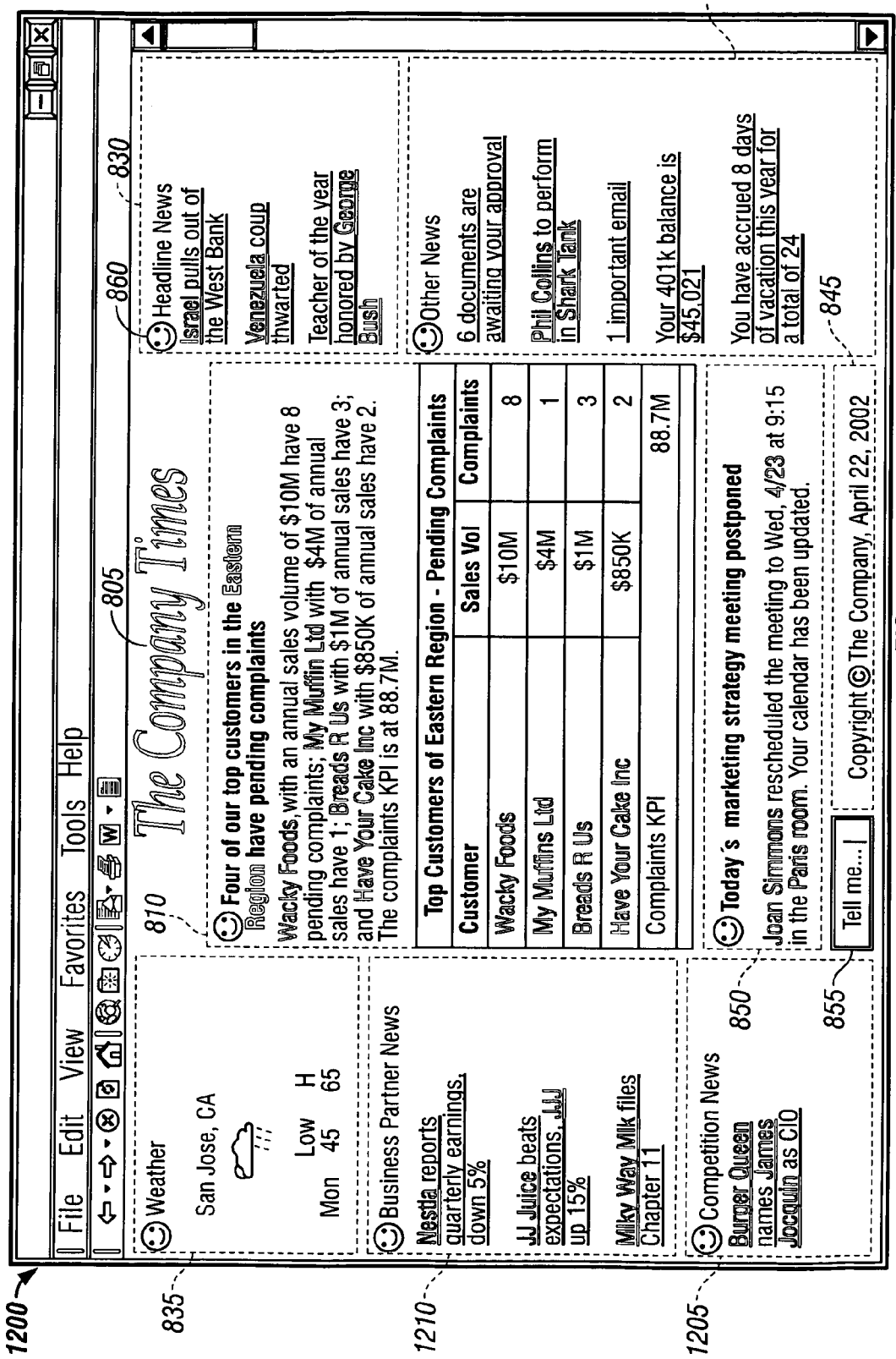
FIG. 12 is a page that reflects user-expressed opinions with respect to the page of FIG. 8.

FIG. 12 demonstrates a page 1200 that reflects user-expressed opinions with respect to page 800 of FIG. 8. Specifically, page 1200 illustrates the situation in which the user (1) clicked on the Market Report 815 opinion icon 860 and indicated "no interest" in Market Reports, and (2) clicked on the words "Krafti Cheese" in section 820 and indicated "no interest" in Krafti Cheese.

Page 1200 reflects the resulting new set of preferences. Specifically, articles about Krafti Cheese in sections 820 and 825 are removed, and a new article entitled "Milky Way Milk files Chapter 11" is included instead. Also, the Market Report in section 815 is gone, and the weather article in section 835 has taken its place. Finally, additional space created by the above changes, particularly movement of the weather article in section 835, permits the addition of two new articles in section 840.

In some implementations, system 100 may learn automatically by observing the user's behavior. For example, if a user clicks on a particular article, the implementation may increment the priority of one or more of the various discussion objects represented by that article. Two possibilities, for example, are that (1) all of the discussion objects or object classes in that article are incremented in priority, or that (2) only a primary discussion object in that article is incremented. A primary discussion object could be determined in a variety of ways, such as, for example, by counting occurrences of search strings in the article. Priority may be a numerical scale or otherwise, allowing easy incrementing and decrementing.

Various operations depicted in FIGS. 2-6 may be combined. For example, operations of agents in gathering information for articles may be combined with the filtering, sorting, prioritizing, and/or pagination operations. In one implementation, each user may have an individual "agent" that performs all of the filtering, sorting, prioritizing, and/or pagination operations when a page is requested by the user.

Also, articles may be pushed straight from a source, rather than being collected by an agent. In one implementation, articles are broadcast and are filtered at the time of broadcast, by the broadcaster, to place them in one or more buckets. In another implementation, a user's system performs the filtering operations on articles as the articles are broadcast. In either of these implementations, the function of the agent has been moved to the broadcaster and the user, respectively, and the agent execution environment has been removed.

One implementation may process articles as they come in, filtering them into the buckets of each user at that time. The articles wait in that bucket until such time as a user requests a page. At that time the prioritization and pagination processes kick in, and the page is created. This may provide improved performance over filtering at the time a user requests a page, particularly in cases where the user logs into the system 100 relatively rarely.

Various implementations allow: (i) filtering articles or other data based on content of the delivered or available data, (ii) adjusting display of data based on content, (iii) filtering articles dynamically, upon viewing, or otherwise, (iv) adjusting display of data dynamically, and/or (v) separating producers of articles or other data from consumers of the data.

Implementations discussed above contemplate the use of audio and video presentations as part of a personalized delivery of content. In some implementations, these and other features can be utilized outside of the context of system 100 and the associated discussions above, and can be implemented similarly to portal-based techniques.

Figure 13:
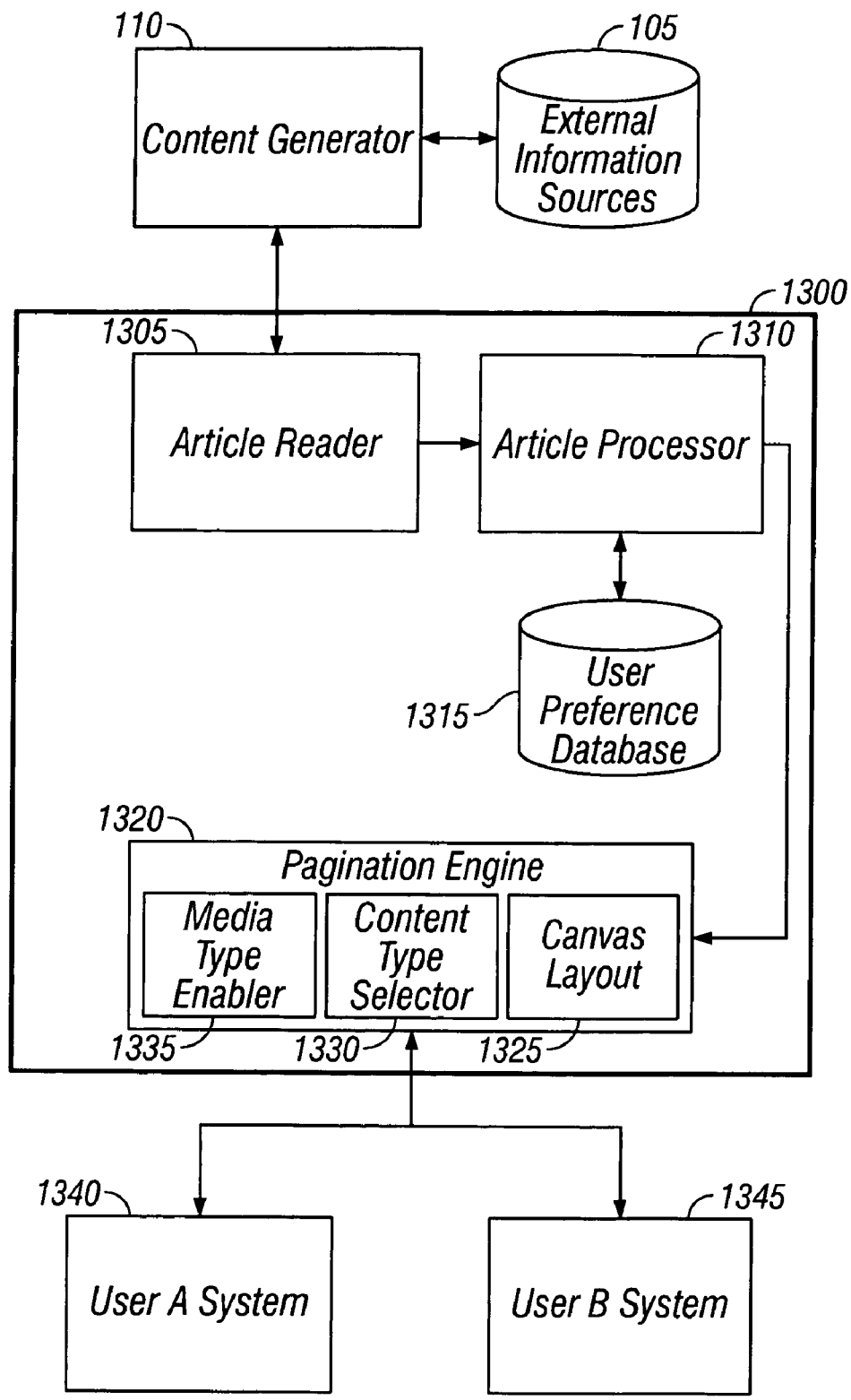
FIG. 13 is an architectural block diagram of an example of a content presentation system designed primarily for generating personalized audio and video.

FIG. 13 demonstrates an implementation of a content personalization system designed primarily for generating personalized audio and video-based information systems.

In FIG. 13, article reader 1305 obtains articles from content generator 110. An article reader 1305 need not include a metadata enhancer, and need not store the articles separately (although the articles could be cached for possible later use, as is known). An article processor may then associate articles with particular users, using a user preference database 1315. This association may occur by virtue of content metadata such as discussion objects contained within the articles, as discussed above, or may occur only by virtue of a comparison of general article attributes to user preferences.

A pagination engine 1320 communicates with both article processor 1310 and user systems 1340 and/or 1345. Pagination engine 1320, as with pagination engine 165 of FIG. 1, will typically have access to characteristics of the client system being used by each user, either from user preference database 1315, or determined from the user request at the time of the request.

In this way, pagination engine 1320 determines a layout of the canvas being used by each user, using a canvas layout subsystem 1325 that is similar to canvas layout subsystem 170 of FIG. 1. As with canvas layout subsystem 170, one of the services of the canvas layout subsystem 1325 is to determine how much "space" is available to the user for displaying articles, as well as any other user-specific capacity constraints relevant to deciding which articles to provide to the user(s).

Content-type selector 1330 may then determine which rendering media are available to the user for the selected canvas, and which articles are consistent, or can be made to be consistent, with that media. Media-type enabler 1335 is available to utilize a type of media that would not normally be available to the user, as discussed above with respect to media-type enabler 180.

As referred to above, in the implementation of FIG. 13, article selection and layout may be determined essentially as is done in the context of traditional portal technology, or may incorporate any or all of the advantageous features of system 100. In any case, as discussed in more detail below, system 1300 serves to provide personalized audio and/or video presentations above and beyond the context of traditional browser-based technologies.

FIG. 14 demonstrates an article 1400 used in one implementation of the system. Article 1400 is similar to article 700 in many respects, and is also written in XML. In article 1400, a section 1405 contains general attributes of the article, such as its author, time of creation, and level of importance. A section 1410 labels a first content portion as being narrative text in proper grammar for reading and having a headline portion 1415 and a details portion 1420. A section 1425 labels a second content portion as being HTML-based, with a headline in section 1430 and a table 1435, as its detailed content.

A section 1440 labels the next content block as containing a viewable image in a standard format such as ".gif." The image has an associated headline in section 1445, and is itself located in section 1450. Finally, a section 1455 labels a last content block as containing music, which may be, for example, background music having no words, in a standard format such as "midi." The actual midi file is in a section 1460.

Although not explicitly shown, it should be understood that video (for example, MPEG) and other formats also may be used. Also, as should be understood from FIG. 6, articles such as article 1400 may include summaries of the articles, or of article portions. Also, content blocks may be labeled as mutually exclusive or not, for example, typically an article summary would not be included in the same page as the article itself, as that would be redundant.

Figure 15:
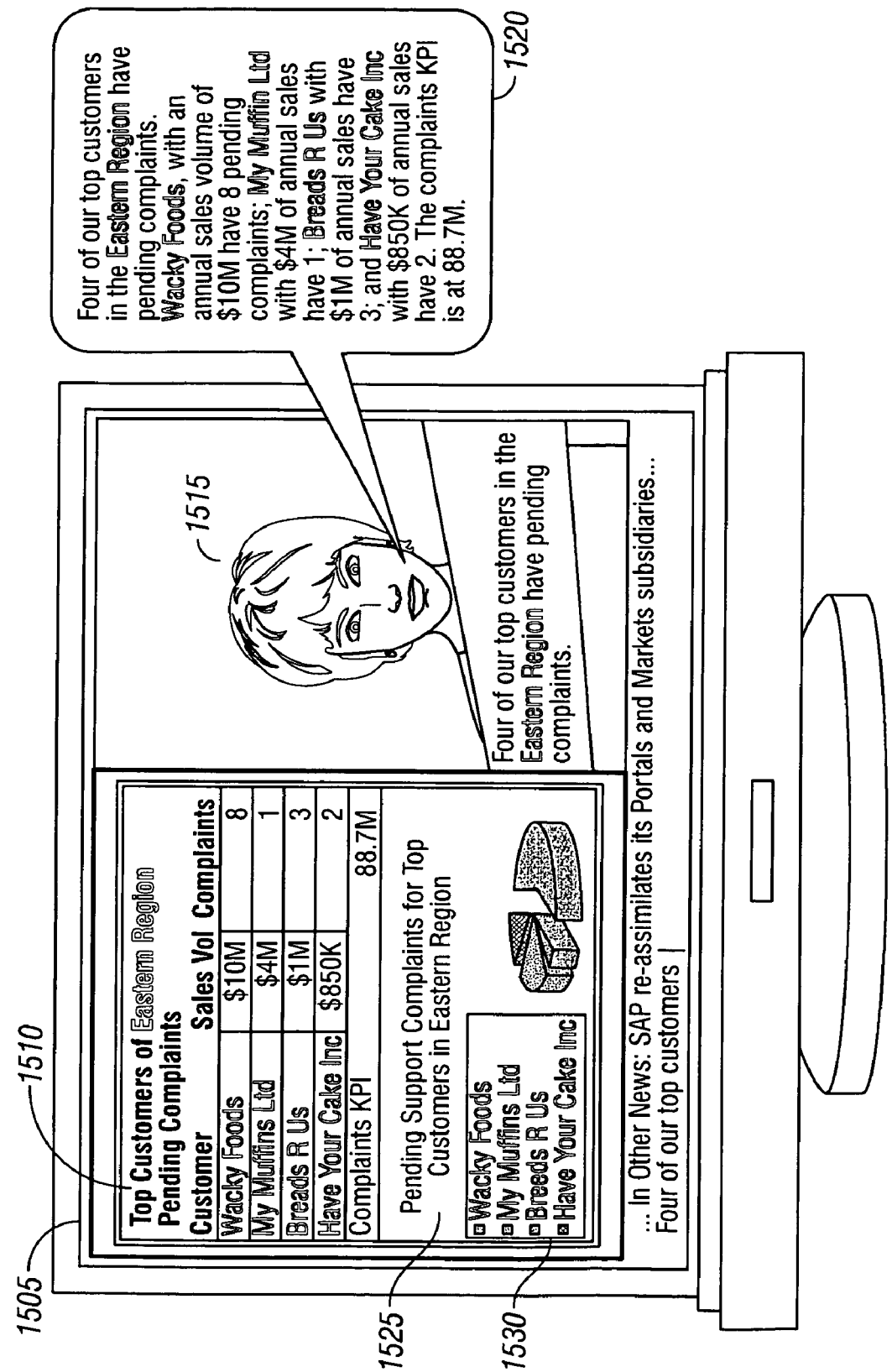
FIG. 15 is an example of a rendering of an article using the system of FIG. 13.

FIG. 15 shows one implementation of a rendering of article 1400. In FIG. 15, a computer 1505 displays in a section 1510 the HTML table from sections 1430/1435 of article 1400. A section 1515 depicts an anchorwoman "reading" the story of section 1415/1420; that is, a computer-generated image of a woman with animated lips and eyes moving to simulate talking, generates audio represented by a section 1520. Headline 1425 may be read by the generated anchorwoman image, and/or may be shown as an image 1535 (note that, since narrative text can be treated as readable text, it does not always have to be read).

A section 1525 displays the gif image from sections 1445/1450 of article 1400, and though not explicitly shown in FIG. 15, the midi music file from section 1460 may be played in the background, or may be ignored. Finally, a section 1530 displays additional headlines from other articles, which may be aggregated for inclusion in the display of computer 1505 by pagination engine 1325. These articles may be, for example, articles designated as "headlines of the day" by article processor 1415 or articles related to the currently-displayed article. These articles may be non-specific to users A and B, or may be specific to a group of users.

In FIG. 15, the layout places the sensory input types into appropriate positions. For example, the anchorwoman cannot "read" an image; she can only read narrative text. The system 1300 has chosen, using canvas layout subsystem 1325, to display the two viewable images contained in the article 1400; two are shown because there is enough real estate on the screen of computer 1505. Other implementations may show one at a time, flicking between them, or not show some of them at all.

The following examples demonstrate various utilizations of content presentation systems. Many people today spend a lot of their time commuting to work. They sit in a car usually listening to the radio without the ability to access corporate data, or perhaps they have a conference call with several colleagues. Content presentation systems as described herein may allow this time to be better used by generating an audio track summarizing the day's news. The track's time length can be set so as to cover the time it takes the employee to commute. Then, the employee can simply call a phone number to access the information needed to start the day. Alternatively, the audio track may be delivered to a capable audio player like an MPEG Layer 3 ("MP3") player or a PDA. Delivery may be made, for example, by downloading from a cellular network.

In a company building, there are several places of high-traffic where people congregate. Those places are often characterized by not having access to computers. Two examples of these places are the lobby and the cafeteria. Implementations of content presentation systems may be used to generate a video track that will run in a loop and be shown on a television screen. People can then watch that video while they wait in the lobby (for example, public company data shown to a guest of the company) or eat lunch (for example, internal company news for its employees).

Another example of a location where people wait, often with little or nothing to do, is an airport. In many airports, next to the boarding gate, there are TV sets tuned to a news station, such as the Cable News Network ("CNN"). In some cases, the channel is even customized for airport use. However, there is only one channel for all airports, so the channel is not personalized to a particular airport or even a gate. Various implementations allow for such personalization. For example, depending on a destination of a flight leaving a near-by gate, as well as connecting flights out of that location, the video may show relevant weather reports, flight delays, security alerts, or terminal maps.

Various implementations allow a content editor to personalize an information system for a group of users, such as by personalizing a TV station for passengers at a particular gate in a specific airport. Various implementations allow an individual user to personalize an information system for himself, such as by personalizing a voicemail recording of particular news items so that the user can listen to it during the morning commute. The acquisition, rendering, and delivery of such personalized information can be automated and no human involvement is necessary. Mediums such as, for example, TV, telephone, computer, and radio can be used.

Moreover, the personalization process itself can be automated. For example, using the example of the airport gate TV, the destination of a flight can be input as "user preferences" in database 1315 (here the "user" is, for example, an airport administrator, and system 1340 is the gate TV) by accessing a flight schedule database.

As already mentioned, acquiring, rendering, and editing data, as well as various other operations, can be performed in whole or in part using elements of system 100. Additional editing may be used to control the content for a specified period of time. For example, a user may personalize the rendering format to provide ten minutes of different content in an audio format. Articles or other data could be prioritized based on content, with entire articles narrated in order of priority. Such narration could be used in an audio format, and also in a video format with additional information being visible.

A number of implementations of methods and systems for presenting personalized content have been described. Nevertheless, it will be understood that various modifications may be made. For example, the system 100 can be used without the personalized security and/or preference-based filtering performed in content-based router 130; that is, all articles in database 125 may be prioritized by PAP 145. Also, prioritization in PAP 145 may occur before security/preference-based filtering. Security-based filtering may occur without preference-based filtering, and vice-versa. Also, content-based router 130 could be implemented in two separate subsystems, one subsystem being responsible for security-based filtering, while the other subsystem is responsible for preference-based filtering.

Figure 16:
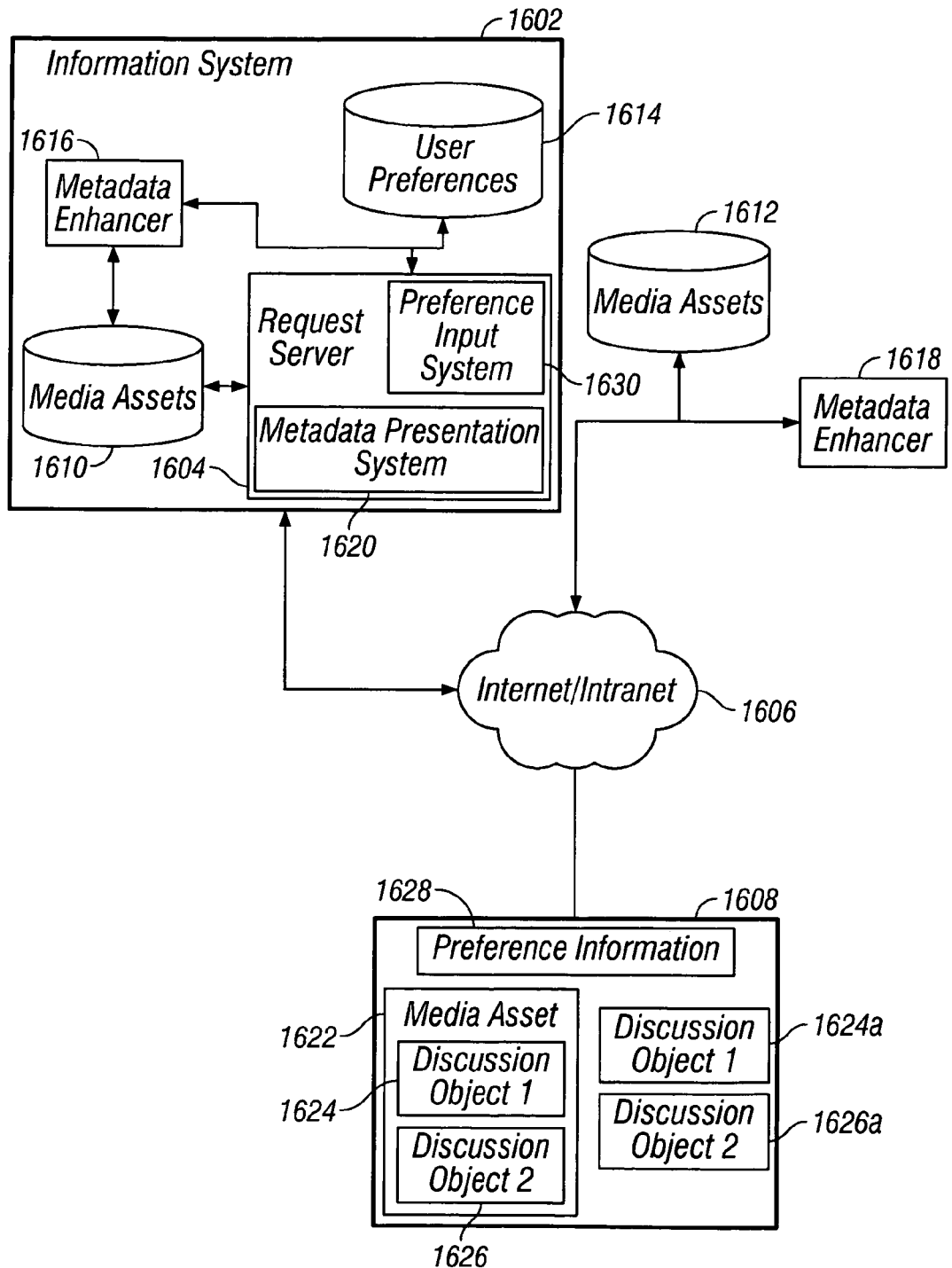
FIG. 16 is a block diagram illustrating a structure and use of a personalized information system.

FIG. 16 is a block diagram illustrating a structure and use of a personalized information system 1602. In FIG. 16, the information system 1602 includes a request server 1604 operable to output media assets, using a network 1606, to a user of a user interface 1608. The network 1606 may be for example, the public Internet, or may be an intranet, such as an enterprise-wide intranet. The user interface may be shown on a presentation device, which may be some type of user display. Such a user display may be, for example, a television or computer screen. Such a presentation device includes presentation of content in any format, including video, audio, text, or any other format, or any combination thereof.

The request server 1604 may obtain media assets from a plurality of sources. For example, a media assets database 1610 is shown as being co-located with the request server 1604 within the information system 1602. Alternatively, the request server 1604 may obtain media assets from external sources, via network 1606, where the external sources are represented in FIG. 16 by an external media assets database 1612.

The request server 1604 selects particular media assets for delivery to the user based on user input and/or information stored in a user preferences database 1614. The request server 1604 is assisted in populating the user preferences database 1614, and in selecting particular media assets for delivery to the user, by the use of metadata associated with each of the media assets. Such metadata may be added to, and/or identified within, each of the media assets by the request server 1604, using a metadata enhancer 1616 that is co-located with the request server 1604 within the information system 1602. Alternatively, media assets obtained from sources external to the information system 1602, that is, from the media assets database 1612, may be similarly, but externally, supplemented by an external metadata enhancer 1618.

The metadata enhancer 1616 may be similar to, or the same as, the metadata enhancer 120, discussed above (for example, see FIG. 1 and associated discussion). Thus, the metadata enhancer may be used to identify and classify discussion objects, as discussed herein, or may be used simply to identify particular words, numbers, or other content characters/elements within a media asset. Such identification may, for example, allow a user to input preference information with respect to the identified content element. The content elements could be identified by, for example, matching elements within the content to a pre-determined list of elements. As another example, the metadata enhancer 1616 may have the ability to analyze content for types of information, such as examining content for numbers in the form xxx-xx-xxxx, and identifying this content element as a social security number. Other techniques could also be used for selecting content elements from within the content of a media asset.

It should be understood that some or all of the functionality of the request server 1604 may be performed on the client side, that is, at a local computer of the user. For example, preference information related to the user may be stored and used locally, and changes to the preference information (which may be updated or modified in the various manners described herein) also may be stored locally. Similarly, metadata enhancement and presentation within (or with respect to) a particular media asset may be performed on the client side, and may be performed on media assets stored locally and/or obtained via the network 1606.

The term "media assets" in this context, as discussed in more detail herein, generally refers to a discrete collection of information that may include content, as well as information about the content. Information about the content may include high-level attributes of the media asset, such as its author or general subject heading (for example, sports or weather). The information about the media asset also may include portions of the actual content itself, used to formulate the content metadata referred to above.

Such content metadata may be referred to herein by a number of terms, such as metadata, elements, content elements, objects, or discussion objects. In general, "discussion objects" are considered to be conceptual objects that are mentioned (discussed) as part of a media asset. Similarly, "discussion classes" are considered to be types, or categories, of discussion objects. For example, a media asset about a discussion class of "computer manufacturers" may mention the discussion object "Hewlett Packard" many times, while only mentioning the discussion object "Dell" infrequently.

It should be understood that a discussion object within a media asset may represent more than the literal representation of a particular word. For example, a discussion object "America" may be associated with various terms determined to have similar meanings, such as "U.S.," or "United States." By analyzing and considering information conveyed by, or with respect to, such content metadata, the implementations discussed herein are able to gather and utilize user preference information in the manner discussed below.

The term "media assets" is used herein to represent, for example, text, video, audio, HTML, or any other available rendering medium, or a combination of two or more of these media. Media assets may contain the same piece of content in multiple forms, and may permit generation of one type of content from another (for example, generation of audio content from textual content). Media assets may be referred to by multiple terms, such as "articles," "documents," or other similar terminology describing information to be passed on to a user.

Content of a media asset may be obtained from, for example, a publicly-available webpage (or portion thereof), an internal electronic mail (e-mail), an individual's personal contact information, weather information, or a set of stock quotes. Content also may be obtained from specific applications such as a profit and loss report of a company, a printout of a sales order, or many other examples of discrete pieces of content to be made available to users. Media assets may include files stored locally on the user's computer, such as, for example, office-productivity documents such as word processing files, spreadsheets, or presentations.

By using content metadata such as the discussion objects mentioned above, the request server 1604 within the information system 1602 is able to gather and utilize very specific information about particular media assets, as well as different users' interest levels in those media assets. For example, the request server 1604 may include a metadata presentation system 1620 which specifically identifies discussion objects or other content metadata for a user within the display 1608.

In FIG. 16, for example, a media asset 1622 is presented to the user on the display 1608 by the request server 1604. The media asset 1622 has a first discussion object 1624 and a second discussion object 1626, which are particularly presented to the user by the metadata presentation system 1620. The presentation of the discussion objects 1624 and 1626 by the metadata presentation system 1620 may include, for example, highlighting, underlining, or bolding the discussion objects 1624 and 1626 within the content of the media asset 1622. As another example, the discussion objects 1624 and 1626 may be presented outside the content of the media asset, and within a separate portion of the display 1608, as a discussion object 1624a and a discussion object 1626a.

Regardless of how the discussion objects 1624 and 1626 are presented, a user of the display 1608 can enter a piece of preference information 1628 particularly regarding one or more of the discussion objects 1624 and 1626. The request server 1604 may thus input the preference information 1628 using a preference input system 1630, and thereby store preference information of the user within the user preferences database 1614.

As described in more detail below in various contexts, the implementation of FIG. 16 provides for fast, easy, and efficient collection of user preference information. Users are allowed to enter very specific preference information, while in the context of a particular media asset and/or user session, and/or while they are viewing the media asset. This preference information may include, for example, not only whether the user likes/dislikes a particular element of the media asset, but also an extent to which the user likes/dislikes that element. In the example of FIG. 16, the user will be able to express his or her opinion about particular elements of the media asset 1622, without ever having to leave the display 1608 currently displaying the media asset 1622.

Moreover, information other than preference information may be entered in a similar manner, for example, with respect to a particular element, as that element appears within a particular media asset. For example, an administrator may want to select the discussion object 1624 to create a record or listing of every media asset containing this discussion object, or to route media assets containing this discussion object to particular destinations/users. Such a rule or macro, for example, for the particular content element may be created with the content element is viewed within a media asset.

The information system 1602 of FIG. 16 may be implemented in various ways and in various settings. As examples, FIGS. 17-25 discuss variations of the information system 1602 in the context of a network search engine, while FIGS. 28-32 discuss variations of the information system 1602 in the context of a network portal page. As further examples, FIG. 33 discusses a variation of the information system 1602 in the context of a reverse-query portal page, while FIGS. 34-36 discuss variations of the information system 1602 in the context of a video presentation, such as a television broadcast.

Figure 17:
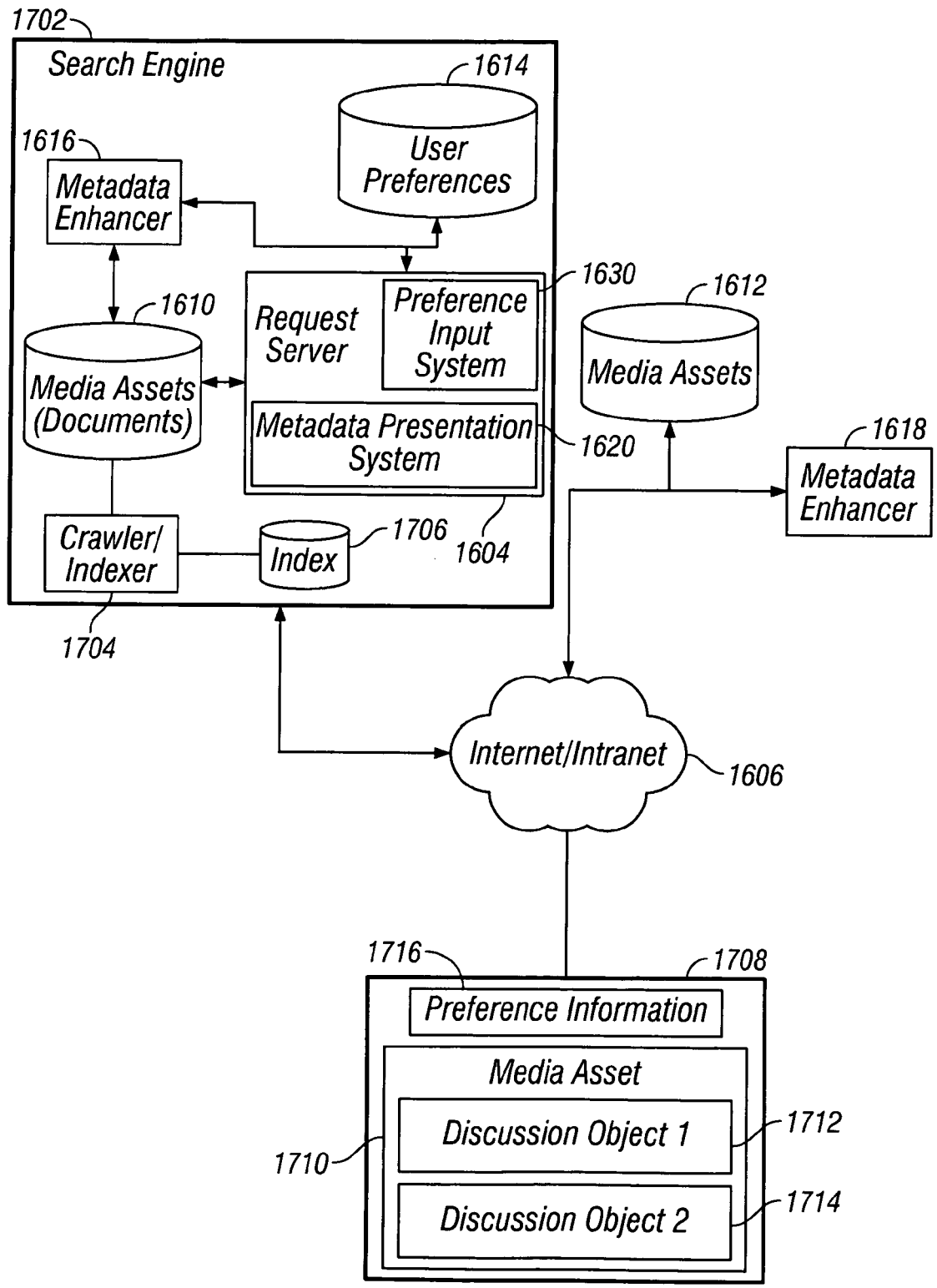
FIG. 17 is a block diagram illustrating a structure and use of an internet search engine.

FIG. 17 is a block diagram illustrating a structure and use of an internet search engine 1702. The search engine 1702 includes various elements in common with the information system 1602 of FIG. 16, and these common elements are not further described. The search engine 1702 utilizes a crawler/indexer 1704 to scan external data sources represented by the media assets database 1612. The crawler/indexer 1704 then analyzes and indexes the media assets obtained in this manner, storing the media assets (or a pointer to their remote location(s)) in the media assets database 1610, while storing the index information in an index database 1706.

In operation, the search engine 1702 typically receives a search request for one or more search terms from the user, examines the media assets database 1610 using the index information from index database 1706, and outputs the media assets to the user on a search engine display 1708. Other techniques for performing such a search also may be used.

In FIG. 17, the search engine 1702 outputs, as a result of the requested search, a media asset 1710 including a first discussion object 1712 and a second discussion object 1714. It should be understood in FIG. 17 that the media asset 1710 may represent a displayed portion of, and/or a link or reference to, a larger media asset, such as, for example, a title of the larger media asset. The title may be displayed along with the first few lines of the larger media asset (with the discussion objects 1712 and 1714 highlighted therein).

Alternatively, the discussion objects 1712 and 1714 need not be located within the first few lines of the larger media asset, but may be selected as particularly important or "primary" discussion objects from within the content of the larger media asset. In this case, the index database 1706 also may be used to store the discussion objects 1712 and 1714 (and any other primary discussion objects), in association with their respective media asset 1710. As a further alternative, the media asset 1710 may represent a media asset in its entirety.

In the context of the search engine 1702, preference information 1716 includes the search terms entered by the user. Conventionally, such search terms may be entered into an initial search engine home page, such that a conventional search engine may return search results, or a summary page of search results, including, for example, a plurality of various media asset portions which correspond to (for example, are hyperlinks to) media assets that include the search terms. In this way, the user may select a particular one of the media asset portions, in order to view the corresponding media asset in its entirety. If a user wishes to alter or refine the performed search, the user typically must return to the original search engine home page (for example, by using a "back" button on a web browser), and enter the new search term(s) into the original search field. Alternatively, some conventional search engines provide the search field within the initial search results summary page.

In contrast, search engine 1702 allows a user to obtain search results (and/or a summary of search results), and to enter preference information regarding those search results directly from the results themselves, that is, while viewing the media asset(s) (or portions thereof). In this way, the user may refine/alter a search quickly and easily, as explained in more detail below.

Figure 18:
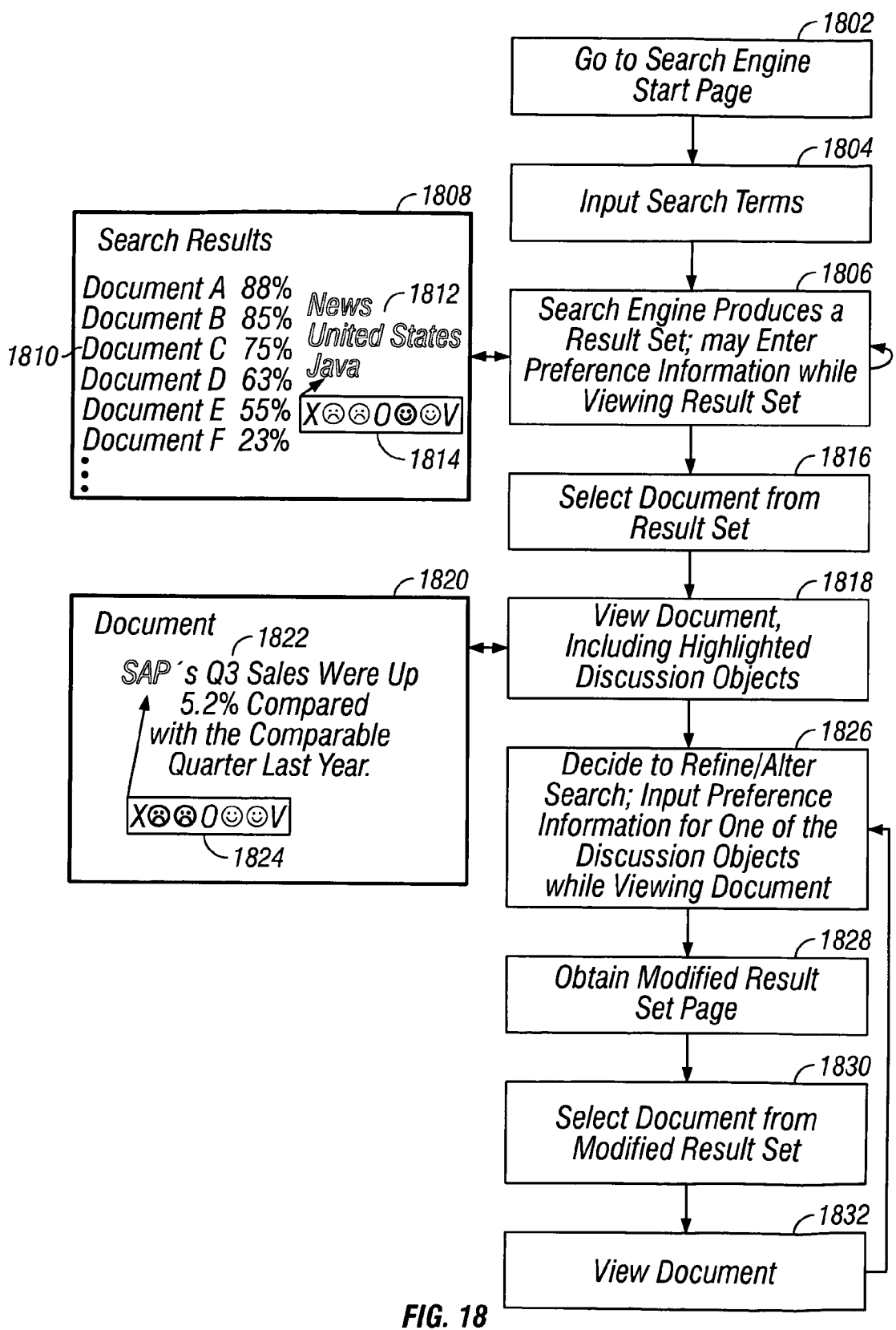
FIG. 18 is a flow chart illustrating an operation of the search engine of FIG. 17.

FIG. 18 is a flow chart illustrating an operation of the search engine 1702 of FIG. 17. In FIG. 18, a user first interacts with the search engine 1702 by going to an associated search engine start page (1802). At the search engine start page, the user inputs desired search terms (1804), whereupon the search engine 1702 produces an initial result set (1806). Alternatively, the initial search term may be obtained from an external location, for example, a web site.

An example of a result set is shown in a sample search result page 1808, in which a plurality of documents 1810 (that is, media assets) are displayed. The plurality of documents 1810 may represent, for example, portions of individual documents, where the user may select and view one of the documents in its entirety by, for example, clicking on a chosen document. As shown in page 1808, each of the documents 1810 includes an associated percentage indicating an extent to which the particular document matches the search terms input by the user. Also on page 1808, a plurality of discussion objects 1812 may be highlighted for the user, so that the user may input preference information about one or more of the discussion objects 1812. In page 1808, the discussion objects 1812 are shown separately from the documents 1810, however, the discussion object 1812 (as illustrated below) also may be included within the content of each of the documents (or document portions) 1810.

In page 1808, and as discussed in more detail below, a technique for indicating a preference about a particular discussion object includes a pop-up window 1814. The pop-up window 1814 may be obtained, for example, by the user clicking on a particular discussion object, or simply by "hovering" a cursor over the desired discussion object, using the user's mouse or other computer input technique. The pop-up window 1814 includes a range of preference information which may be selected by the user, ranging from "never show information about this discussion object," represented by the "x" at the left side of pop-up window 1814, all the way to "always show information about this discussion object," represented by the "v" on the right side of pop-up window 1814. Of course, other preference information could be incorporated within the pop-up window 1814, or elsewhere.

Once the user has received the initial search result set such as page 1808, and has expressed additional preference information about any one of the documents 1810, or the discussion objects 1812 within the page 1808, a new search result page (not shown) may be generated accordingly. The new search result set may be generated automatically upon inputting preference information from the pop-up window 1814, or may be generated upon a "refresh" command from the user. In the latter case, the user may input preference information about a plurality of discussion objects before reloading the page and thereby obtaining a new search result set.

At some point, the user selects a particular document from a result set currently being viewed (1816), so that the user is able to view the selected document (1818). An example of a selected document is a document 1820, which includes an associated discussion object 1822. The user may express preference information about the discussion object in the manner discussed above, using, for example, a pop-up window 1824. This preference information may be used by the search engine 1702 to refine/alter the current search, and is entered while the user is viewing the document 1820 (1826). Thus, the user will obtain a modified result set page (not shown), similar to page 1808 (1828), and may thus continue to select a second document from the modified results set (1830), and thus view the newly selected document (1832).

The above technique for collecting preference information in the context of a search engine is discussed in more detail below with respect to FIGS. 19-27. However, it should be understood from FIG. 18 that the techniques discussed therein may be advantageous over conventional search engine systems. For example, conventional systems often require a user to return from a viewed document to a search engine home page and/or search result page in order to refine or alter a particular search. Moreover, in conventional search engines, the user typically refines or alters a search by entering new search terms into a search field. In contrast, the techniques discussed with respect to FIGS. 17-27 allow a user to enter preference information while actually viewing a particular document (or portion thereof), and do not require the user to explicitly type in the preference information in order to have the preference information reflected in a revised search. Thus, the user may perform searches quickly, easily, and efficiently.

Further, the techniques of FIGS. 17-27 may actually suggest new search terms, by identifying discussion objects within the search results, to aid the user in constructing a desirable search. Moreover, the ability to enter a range of preference information, rather than just "include" or "don't include," allows a user more options in refining a search. For example, by expressing only a slight dis-interest in a particular discussion object, a user may find the discussion object still included within a search result set (as long as there are few or no documents within the result set that contain search terms of greater interest).

FIG. 19 is a first screen shot 1900 illustrating an operation of the search engine 1702 of FIG. 17. Screenshot 1900 is analogous to the page 1808 in FIG. 18, that is, it includes references to a plurality of documents (and portions of each of the referenced documents), where the documents have been obtained by the search engine 1702 in response to a particular search term. In particular, in screenshot 1900, it can be seen that the user has entered the search term "Microsoft," which appears in a search field 1902. It should be noted that a plus sign 1904 after the search term Microsoft indicates that the term must be found in each returned document. A plus sign may be assigned as the default level of approval assigned to the search term, based on the fact that it was used as a search term by the user. As a result of performing a search on the term Microsoft, the search engine 1702 has returned a plurality of documents 1906 within the screenshot 1900, where each document contains the search term "Microsoft."

Within each of the documents 1906, at least one discussion object has been highlighted. For example, in an article 1908, a discussion object 1910 is a stock symbol "INTC" for semiconductor chipmaker Intel Corporation. Similarly, an article 1912 includes a discussion object 1914 showing "ORCL," the stock symbol for the software maker Oracle Corporation.

In one implementation, the user may be provided with a mechanism to take one or more predefined actions with respect to a discussion object. For example, the user may be provided with a set of choices regarding each discussion object (for example, when the user "right clicks," that is, clicks on the discussion object using a right mouse button), where such actions may include performing a search only on this discussion object, or obtaining a stock quote for this discussion object. The set of choices also may be provided as a listing within a reserved portion of the screenshot 1900 (not shown), so that the user may "drag" the discussion object and "drop" it over a particular action from within the listing, to thereby cause that action to be performed. Techniques for performing this function and similar functions are discussed in detail in U.S. Pat. No. 5,848,424, titled DATA NAVIGATOR INTERFACE WITH NAVIGATION AS A FUNCTION OF DRAGGABLE ELEMENTS AND DROP TARGETS, and filed on Nov. 18, 1996, which is hereby incorporated by reference.

Figure 20:
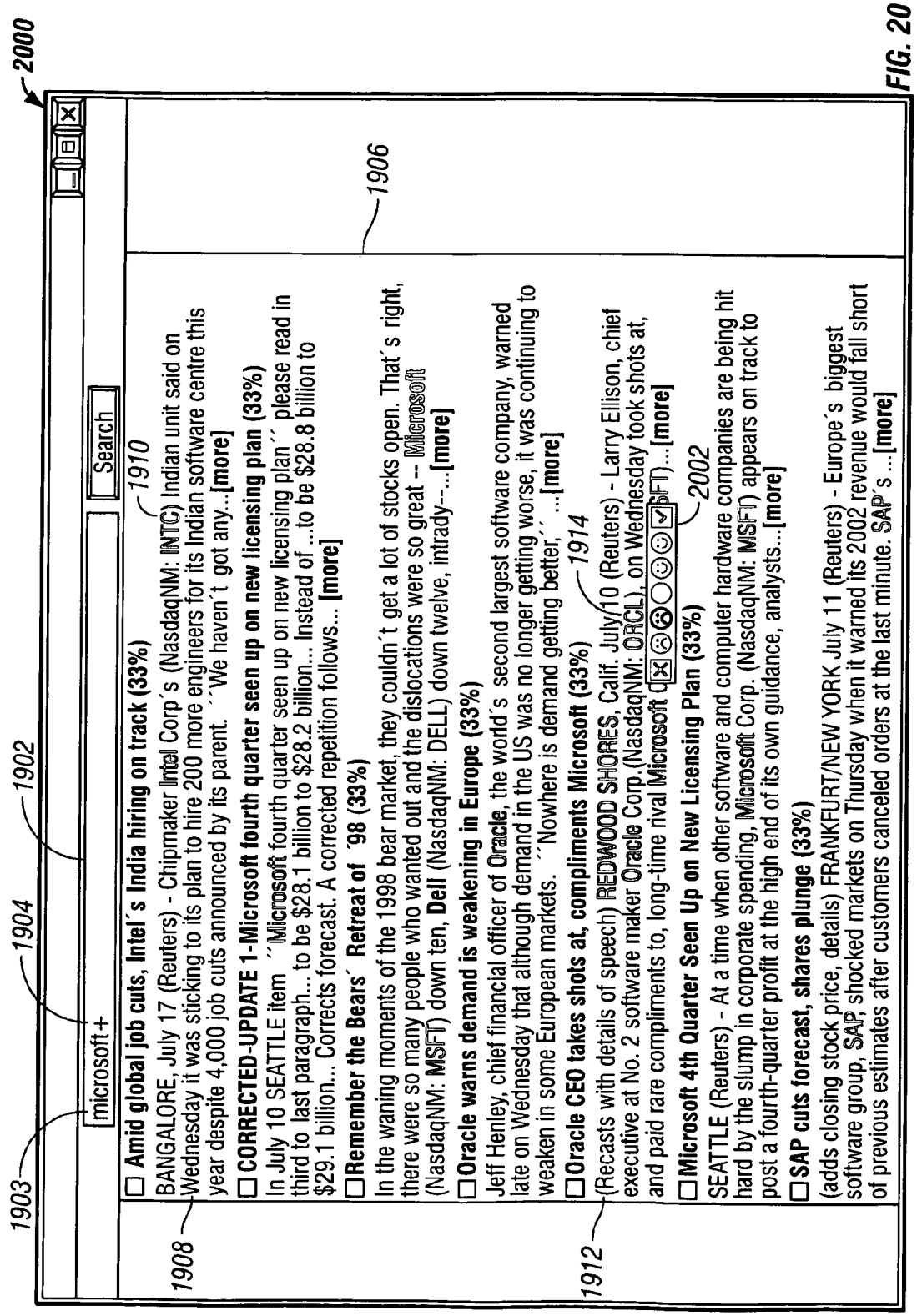
FIG. 20 is a second screen shot illustrating an operation of the search engine of FIG. 17.

FIG. 20 is a second screen shot 2000 illustrating an operation of the search engine 1702 of FIG. 17. In screen shot 2000, the user has selected the discussion object 1914, in order to input preference information about this discussion object. Specifically, the user has obtained a pop-up window 2002 by selecting the discussion object 1914 (that is, by clicking on the discussion object 1914, hovering the mouse over it, or using a similar technique, as discussed above), and the user has selected a slightly negative rating for this particular discussion object, as shown.

Figure 21:
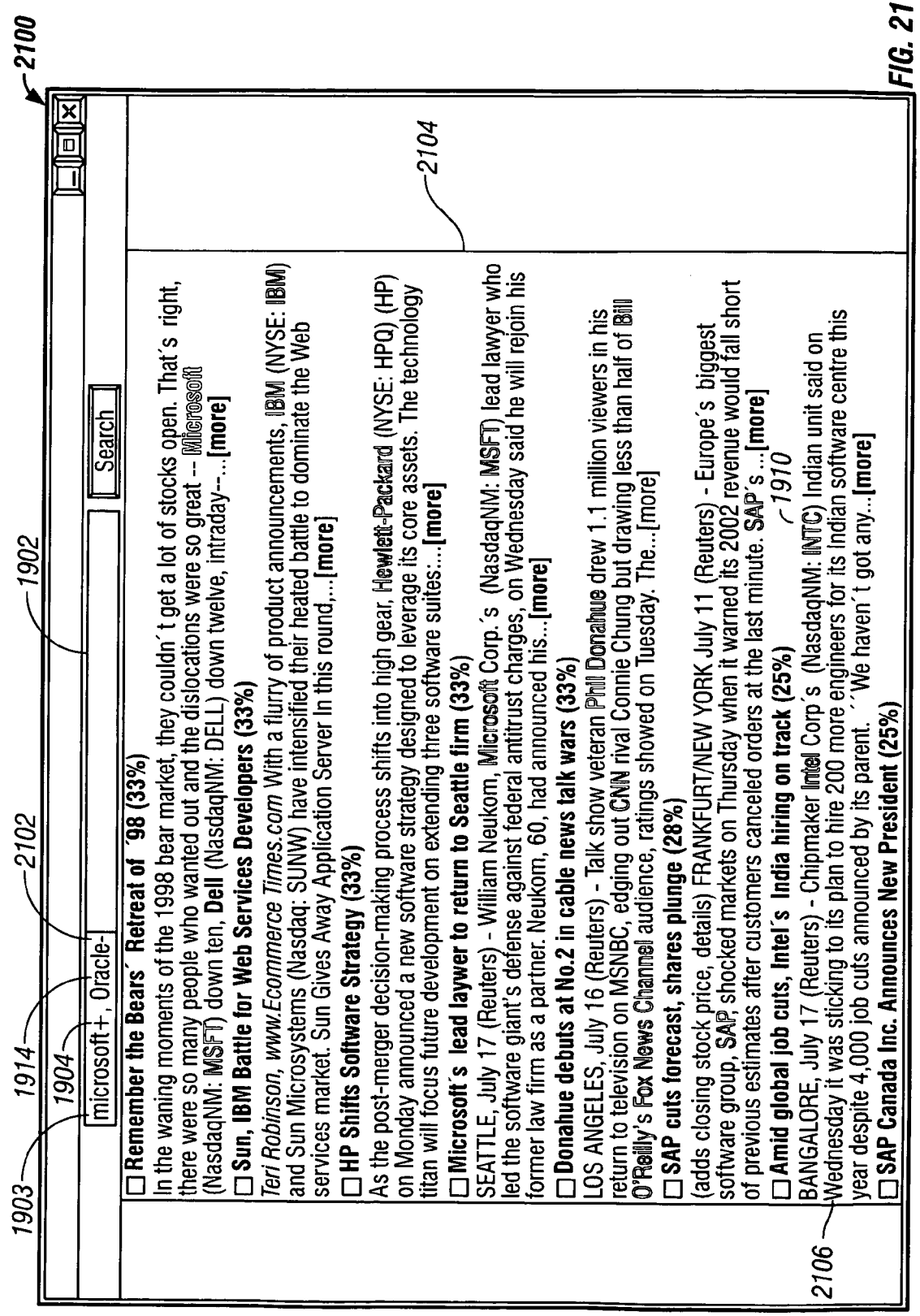
FIG. 21 is a third screen shot illustrating an operation of the search engine of FIG. 17.

FIG. 21 is a third screen shot 2100 illustrating an operation of the search engine 1702 of FIG. 17. Screen shot 2100 reflects a result of the preference information entered by the user with respect to screenshot 2000. Because of the negative preference indicated by the user regarding the discussion object 1914 "Oracle," this discussion object 1914 is now included within field 1902, along with a minus sign 2102 indicating the slight negative preference input with respect to screenshot 2000. That is, a stronger negative preference might be shown as two or three minus signs, or by some other designation. It should be understood that the discussion object 1914, although shown as a stock symbol in screen shot 2000, may include information referencing the software maker Oracle Corporation more generally.

As a result of the preference information entered in screen shot 2000, screenshot 2100 includes a new set of documents 2104 (documents 2104 are actually portions of referenced documents). For example, the documents 2104 include a document (portion) 2106 including the discussion object 1910 "Intel," discussed above with respect to FIG. 19. In screenshot 2100, it should be noted that documents 2104 no longer include documents related to the discussion object 1914 "Oracle," since the negative rating given to that discussion object caused corresponding documents to be listed lower than the eight documents partially or completely listed in screenshot 2100.

FIG. 22 is a fourth screen shot 2200 illustrating an operation of the search engine 1702. In screen shot 2200, the user has selected the document 2106 from screenshot 2100, and search engine 1702 now displays the entirety of the referenced document 2106. While viewing the document 2106, the user is able to input preference information about the discussion object 1910 "Intel," using a pop-up window 2202. Specifically in the example of screen shot 2200, the user has input the preference that information about discussion object 1910 should never be included in future result sets, by selecting a box 2204 marked "X."

FIG. 23 is a fifth screen shot 2300 illustrating an operation of the search engine 1702 of FIG. 17. In screen shot 2300, the discussion object 1910 "Intel" is now included within the field 1902, along with an asterisk (*) 2302, indicating that it is a discussion object not to be included in future search results. Also in screen shot 2300, a plurality of documents 2304 have been returned, reflecting all the preference information input to date, that is, an interest in discussion object 1903 "Microsoft," a slight dis-interest in discussion object 1910 "Oracle," and a total lack of interest in the discussion object 1910 "Intel."

Reflecting this information, the documents 2304 do not include the document 2106 from FIGS. 21 and 22, since this document contains the discussion object 1910 "Intel." Other documents within documents 2304 may have already been included in previous search results, such as, for example, an article or media asset 2306, which includes discussion objects such as a discussion object 2308 "Hewlett-Packard."

FIG. 24 is a sixth screen shot 2400 illustrating an operation of the search engine 1702 of FIG. 17. In screenshot 2400, the user has selected the media asset 2306, which is now displayed for viewing. The media asset 2306 may be shown in its entirety, either within a single screen, or, if necessary, with the benefit of scroll bars or other techniques for viewing a document which requires more than one full screen to view. In screenshot 2400, the media asset 2306 is rendered (by the search engine 1702) so as to highlight the various discussion objects (for example, the discussion object 2308 "Hewlett-Packard") within the body of the media asset 2306.

FIG. 25 is a seventh screenshot 2500 illustrating an operation of the search engine 1702 of FIG. 17. In screenshot 2500, the original media asset 2306 is displayed, that is, the discussion objects associated with media asset 2306 are not displayed within the context of the media asset 2306 itself. Instead, some of the discussion objects are provided to the user within a reserved portion 2502 of the screen shot 2500. Within portion 2502, the discussion object 1903 "Microsoft," the discussion object 2308 "Hewlett-Packard," and a discussion object 2504 "IBM" ("International Business Machines") are displayed.

Although these discussion objects are shown grouped at the top of portion 2502, they also may be dispersed throughout the portion 2502, such that the discussion objects correspond to a location of their appearance(s) within the media asset 2306. In screenshot 2500, the original version of the media asset 2306 is displayed to the user by directing the user to a remote location of the media asset 2306, using a frame 2508. Also, it should be understood that discussion objects included in portion 2502 may be a partial or complete listing of discussion objects within the media asset 2306, and/or may contain discussion objects entered as a search term, even if such discussion objects are not actually contained in the particular media asset being viewed.

In differentiating between screen shots 2400 and 2500, it should be understood that screen shot 2400 represents, for example, a situation in which the search engine 1702 has rendered a media asset (document) 2306. The media asset 2306 may be stored locally, or may be obtained (on-the-fly) from a remote location. Once obtained, the discussion objects within the media asset 2306 are identified (for example, using the metadata enhancer 1616), and the media asset is rendered by being converted to (in this case) HTML, with the discussion objects embedded within the HTML-formatted version of the media asset.

In contrast, screen shot 2500 represents a situation in which the search engine 1702 displays an original version of the media asset 2306. In this case, the media asset is an HTML document, and is displayed within the frame 2508, which may display the media asset 2306 by obtaining it directly from a remote location, as described above, or by obtaining the media asset 2306 from the database 1610. In either case, in screenshot 2500, the search engine 1702 has not altered the original version of the media asset 2306, but rather has determined discussion objects within the media asset 2306 for display within the portion 2502. In screenshot 2500, the discussion objects may be determined using, for example, the metadata enhancer 1616 and/or 1618.

In short, when the media asset 2306 is shown in its original version, its metadata may be better presented externally to the document, rather than within the content of the document itself. Such external presentation of the discussion objects may be in addition to, or instead of, inclusion of discussion objects within the document 2306 itself.

Regardless of where the discussion objects are displayed, all of the above information related to entry of preference information may be equally applicable. For example, a pop-up window 2510 also may be used with respect to the discussion objects within the portion 2502 of screen shot 2500.

In the above examples, preference information was entered using the pop-up windows such as the pop-up window 2510. However, various other techniques may be used for entering preference information.

FIG. 26 is a screenshot 2600 illustrating a technique for entering preference information, similar to the technique shown above with respect to FIG. 11. In screenshot 2600, a pop-up menu 2602 illustrates various examples for entering preference information, such as never/always including a particular discussion topic, or indicating a relative importance of the discussion topic (discussion object). A sub-menu 2604 illustrates the possibility of providing additional information beyond that initially shown in menu 2602. In this case, the sub-menu 2604 is used to postpone media assets which include a particular discussion object for some selected amount of time.

Figure 27:
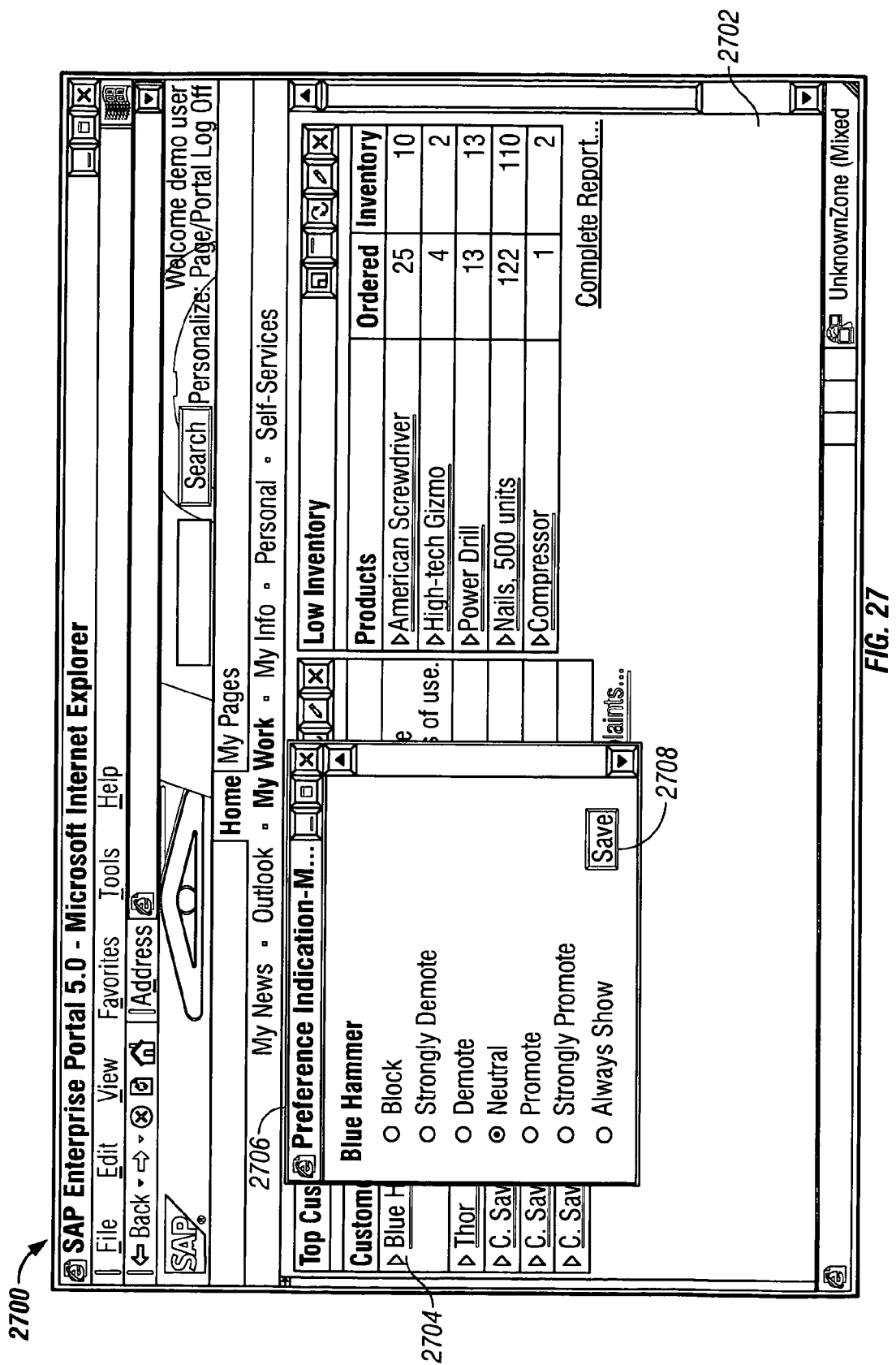
FIG. 27 is a screenshot 2700 illustrating a technique for entering preference information.

FIG. 27 is a screenshot 2700 illustrating a technique for entering preference information. In screenshot 2700, a page 2702 includes a discussion object 2704 "Blue Hammer." The user has selected (for example, by clicking with a mouse) the discussion object 2704 "Blue Hammer," whereupon a pop-up browser window 2706 is shown to the user. The pop-up browser window contains the name of the relevant discussion object, as well as a range of preference options for the user to select. Finally, the user may save the selected option ("Neutral" in this case) by selecting a "save" button 2708.

Figure 28:
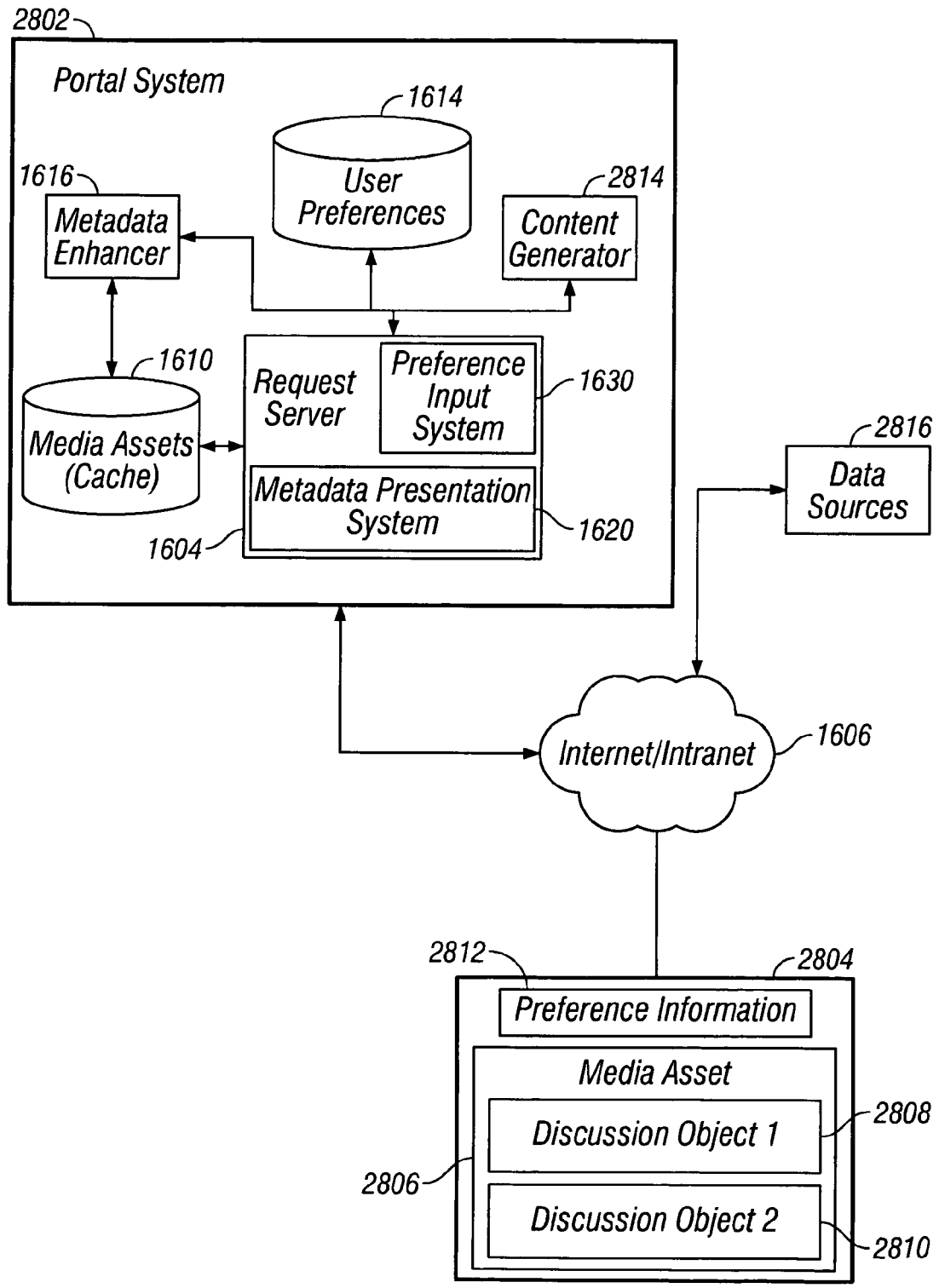
FIG. 28 is a block diagram illustrating a structure and use of a portal system.

FIG. 28 is a block diagram illustrating a structure and use of a portal system 2802. In an example of a conventional portal system, as referred to above, a portal page may include one or more sub-sections or windows, which may exist in various (proprietary) forms, and may be known by a variety of names, such as "iViews" or "portlets."

In particular, iViews have two primary characteristics, specifically, their definition and their visual presentation. The term definition refers to the fact that iViews may be thought of as parameterized topics/queries, where the queries are pre-defined and encapsulated, for example, within Java code, thereby resembling a software module or a Java class. The values of the iViews parameters may then be set by, for example, the user, an administrator, and/or by default. The term visual presentation refers to the techniques for giving form to the iView, and associating the iView with a user and a page. At a time of visual presentation, the iView is typically allocated a location on a page (screen), and its parameters are filled based on the user preferences.

An iView may be associated with a personalization page, in which a user may modify a query associated with that iView by editing the values of the parameters. Thus, an iView designed to query a customer database and produce a list of the top ten customers, by revenue, may be edited to return only the top five customers.

A user may be provided with an initial preference page for associating an iView with a desired location on the user's portal page. Using the preference page, for example, the user might arrange multiple iViews, each associated with a query related to a topic such as "sports," "weather," and/or "stock market."

Then, each time the user logs onto the portal system and views the portal page, the iViews automatically run their respective queries, thereby obtaining relevant information for the user. Thus, iViews may be considered to be media assets themselves, and/or may contain a media asset (including a simple data list), a portion of a media asset, or a link to a media asset (for example, links to other iViews). If the user wishes to revise preference information (for example, a location of an iView on the portal page), typically the user returns to the initial preference page to do so, and then refreshes or reloads the actual portal page (which refreshes all contained iViews) to view the revisions.

As just described, it is not typically until the user logs on and requests a viewing of the (personalized) portal page that the portal system 2802 (that is, each iView) generates the corresponding information using a content generator 2803, which delivers a page 2804 to the user by performing a parameterized query against data sources 2805. However, it should be understood that the portal system 2802 also may perform predictive or preemptive publishing of media assets, in order to speed up an overall operation of the portal system 2802. In some cases, media assets may be temporarily cached after delivery to a user, in case a user requests the same media asset(s) in the near future.

Thus, the portal system 2802 typically generates media assets, and provides these assets to the user according to a plurality of iViews that have been individually associated with queries that are of interest to the user. These iViews and their related information may be stored/implemented in, for example, the user preferences database 1614 and/or the content generator 2803. It should be understood that the media assets database 1610 within the portal system 2802 thus may represent a cache of media assets assembled in response to previous user requests, as described above.

During operation, the portal system 2802 presents the page 2804 to the user, as mentioned above. The page 2804 in FIG. 28 represents, for example, either an initial portal set up page, a portal page requested by the user, or a media asset 2806 selected by the user from the portal page (for example, an iView, or a media asset selected by way of a link contained within an iView, as described above). Page 2804 may thus include the media asset 2806 (or portion thereof), including a first discussion object 2808 and a second discussion object 2810.

As referred to above and discussed in more detail below, the discussion objects 2808 and 2810 may be highlighted within the media asset 2806, or may be provided to the user within a second portion of the page 2804. The user may express preference information 2812 specifically with regard to one or both of the discussion objects 2808 or 2810.

Figure 29:
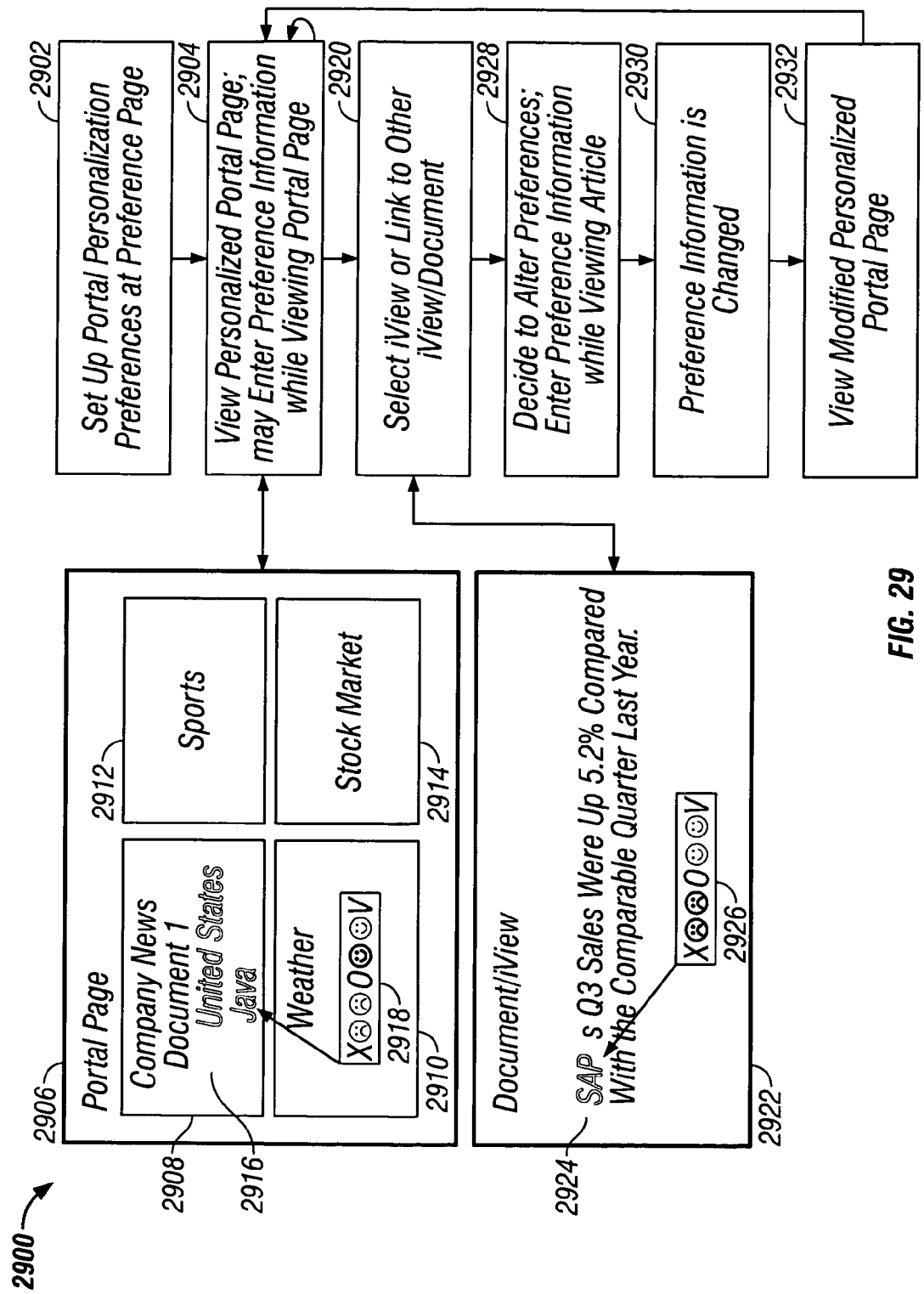
FIG. 29 is a flowchart illustrating an operation of the portal system in FIG. 28.

FIG. 29 is a flowchart 2900 illustrating an operation of the portal system 2802 in FIG. 28. In flowchart 2900, a user begins by setting up portal personalization preferences (for example, selecting a number/size of iViews) at an initial preference page provided by the portal system 2802 (2902). These portal personalization preferences may be stored in the user preferences database 1614. In some cases an administrator will preset the initial set of user preferences according the role of the user. Whatever the case may be, based on the preferences just entered, the user may then view a personalized portal page accordingly (2904). An example of such a personalized portal page is shown in a portal page 2906.

The portal page 2906 includes various iViews. For example, a first iView 2908 may contain information related to "company news," that is, news regarding the user's employer, who may be providing the portal system 2802. A second iView 2910 may be devoted to weather information, a third iView 2912 may be devoted to sports information, and a fourth iView 2914 may be devoted to news about the stock market. Each of the iViews may contain documents or portions thereof (or links to other documents), and the documents may contain discussion objects, such as discussion objects 2916 within the first section 2908. Additionally, or alternatively, the iViews may contain a simple listing of information (including discussion objects within the information), or the iViews may contain links to other iViews (on the page 2906, or on another page).

As with the search engine 1702 discussed above, a user may select one or more of the discussion objects in order to input preference information about that discussion object. In FIG. 29, a pop-up window 2918 similar to pop-up windows discussed above allows the user to enter preference information about a particular discussion object.

Upon entering preference information in this or similar manners, the user receives a revised portal page similar to the page 2906, but reflecting information expressed regarding the discussion objects. For example, the revised portal page may include different information/documents within a particular iView, or could even remove an entire one of the iViews in favor of a new, more preferred iView.

Once the user has obtained a particular portal page such as the page 2906, the user may select one of the iViews for more detailed viewing, or may select (a link to) another iView or document (2920). In selecting one of the iViews, for example, the user may "zoom in" on a selected iView, so that the iView is displayed on the entirety of an available user display. For example, the user may select the sports iView 2912 to occupy an entirety of the user's display; in this case, the iView would, of course, be able to display more sports information than would be possible in the example of the page 2906.

In selecting a particular document or iView (or link thereto) from within one of the iViews 2908, 2910, 2912, or 2914, the user may be shown the corresponding document/iView as a document/iView 2922, which includes a discussion object 2924, about which the user inputs preferences using a pop-up window 2926. If the user decides to alter his/her portal preference information, he/she may do so while viewing the document/iView 2922, using, for example, the pop-up window 2926 (2928). Accordingly, the portal system 2802 inputs the preference information using the preference input system 1630, and changes user preference information stored within the user preference database 1614 (2930). At this point, the user is capable of viewing a modified personalized portal page, for example, a modified version of page 2906 (2932).

It should be understood from the above discussion that the portal system 2802, via its operation as explained above with respect to flowchart 2900, allows a user to directly enter preference information about a specific portion of a media asset, while the user is actually viewing the media asset (or portion thereof). As seen above in the context of the search engine 1702, such techniques provide a fast and efficient way to collect user preference information, and are convenient for the user in that they minimize the different number of screens that a user must access in order to input preference information. Moreover, the user is not taken out of his or her current context to another screen to input preference information; rather, the user still sees the content he was reading. Further, such techniques allow a user to see the effect of a preference change quickly, so that the user can easily fine-tune the preference change.

Figure 30:
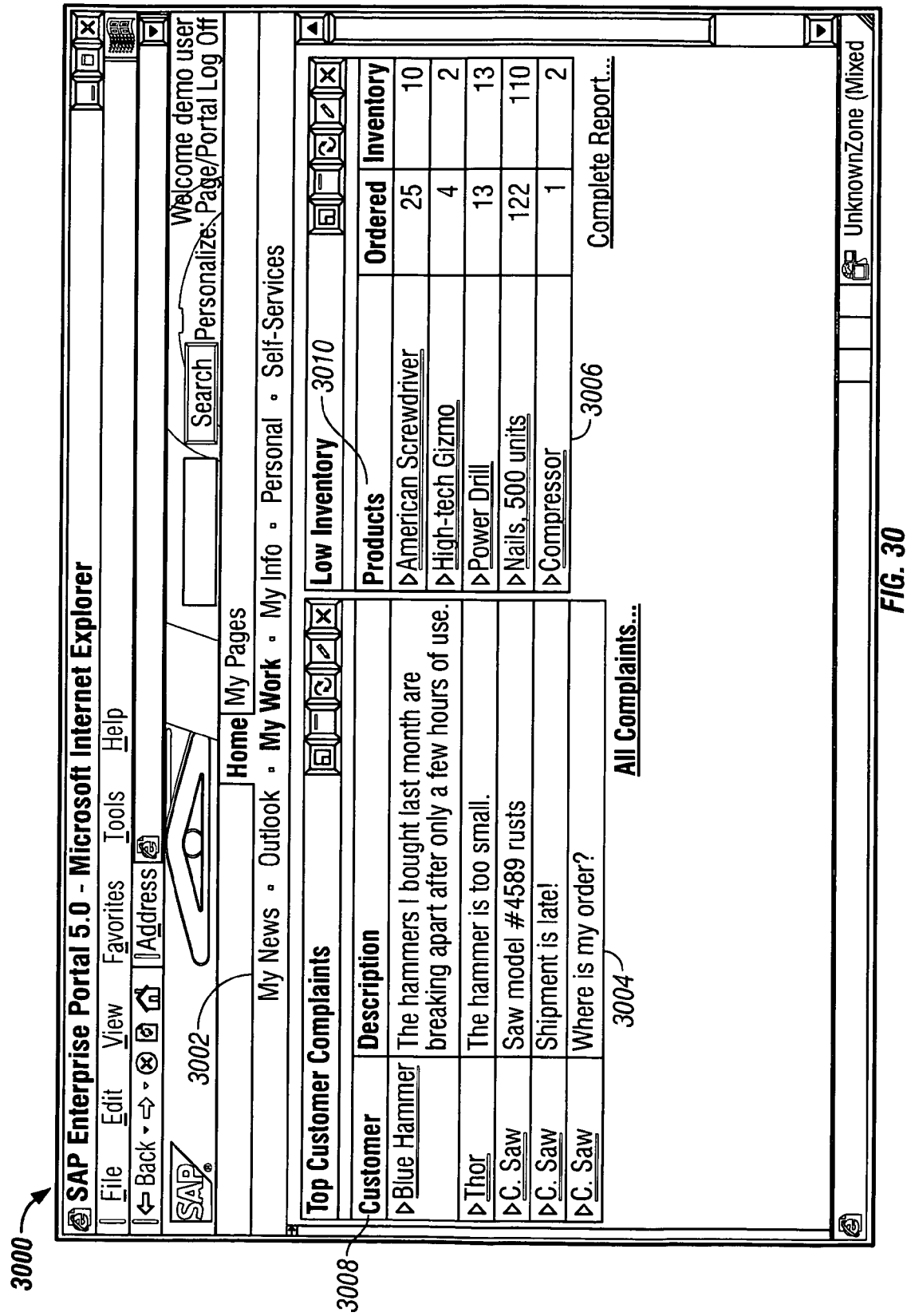
FIG. 30 is a first screen shot illustrating an operation of the portal system of FIG. 28.

FIG. 30 is a first screen shot 3000 illustrating an operation of the portal system 2802 of FIG. 28. In screen shot 3000, the user may select a portal page from among a plurality of portal pages 3002, the portal pages 3002 including, for example, "My News," "My Work," "My Info," and "Personal." In screen shot 3000, the user has selected "My Work," and has therefore received for viewing a portal page that includes a first iView 3004 of "Top Customer Complaints," as well as a second iView 3006 "Low Inventory."

The iView 3004 includes a listing of various customers, and a corresponding description of their respective complaints. The iView 3006 includes an inventory listing of various products, along with a number of the products that have been ordered versus a number that is actually in inventory. The iViews 3004 and 3006 each contain discussion objects. For example, iView 3004 includes each of the customer names within a customer column 3008 as discussion objects, while a column 3010 within the iView 3006 contains each of the product names as discussion objects.

As discussed above, the iViews 3004 and 3006 also may contain links to other media assets and/or iViews. For example, each of the customer names in iView 3004 might represent a link to a general information file (document) about that customer, or to other information, such as a current stock market quote.

Figure 31:
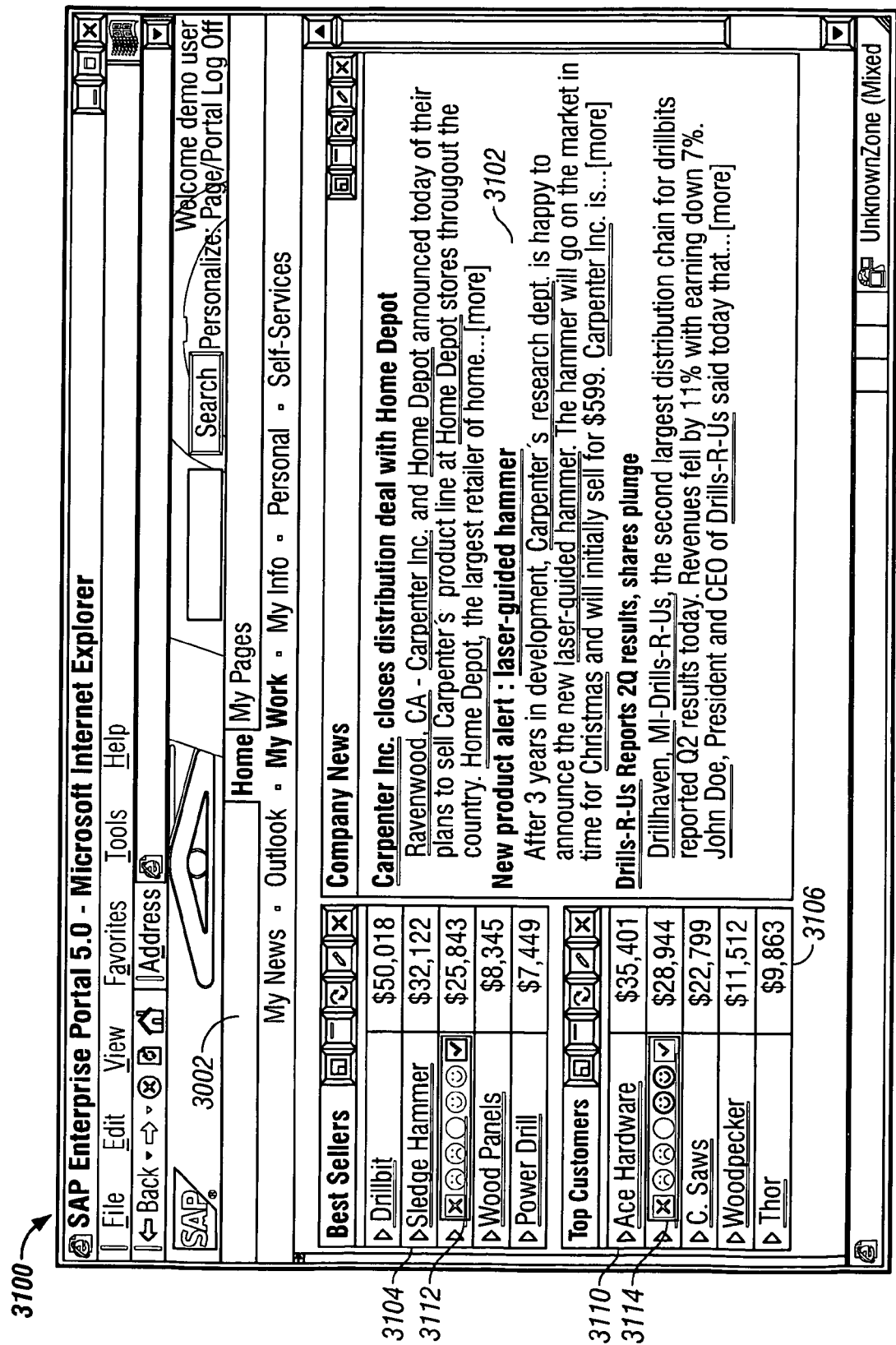
FIG. 31 is a second screen shot illustrating a use of the portal system of FIG. 28.

FIG. 31 is a second screen shot 3100 illustrating a use of the portal system 2802 of FIG. 28. In screen shot 3100, the user has selected a different portal page from within the portal pages 3002. Specifically, the user has selected the "My News" portal page. As a result, the user is shown a first news iView 3102 "Company News," a second iView 3104 "Best Sellers," and a third iView 3106 "Top Customers." As shown in screen shot 3100, and similarly to screenshot 3000, each of the iViews 3102, 3104, and 3106 includes information about their respective query, and the information includes discussion objects, about which the user may express preference information.

For example, iView 3104 includes a discussion object 3108 "Sledge Hammer," and the iView 3106 includes a discussion object 3110 "Ace Hardware." Accordingly, the user may express information about either of these discussion objects using a first pop-up window 3112 or a second pop-up window 3114, respectively. Specifically, in screen shot 3100, the user has provided preference information regarding discussion object 3108 "Sledge Hammer," such that this discussion object should always be included in future media asset listings, by selecting a check box within the pop-up window 3112. Similarly, the user has expressed a strong positive preference for the discussion object 3110 "Ace Hardware," by selecting multiple "smiley faces" within the pop-up window 3114.

In screenshot 3100, the pop-up windows 3112 and 3114 are shown simultaneously, that is, the user may express preference information about a plurality of discussion objects, using such a series of corresponding pop-up windows (which may or may not be shown simultaneously), and then refresh/reload the page 3100. However, as discussed above, the page 3100 also may reload automatically upon an inputting of any preference information via one of the pop-up windows 3112 or 3114.

Figure 32:
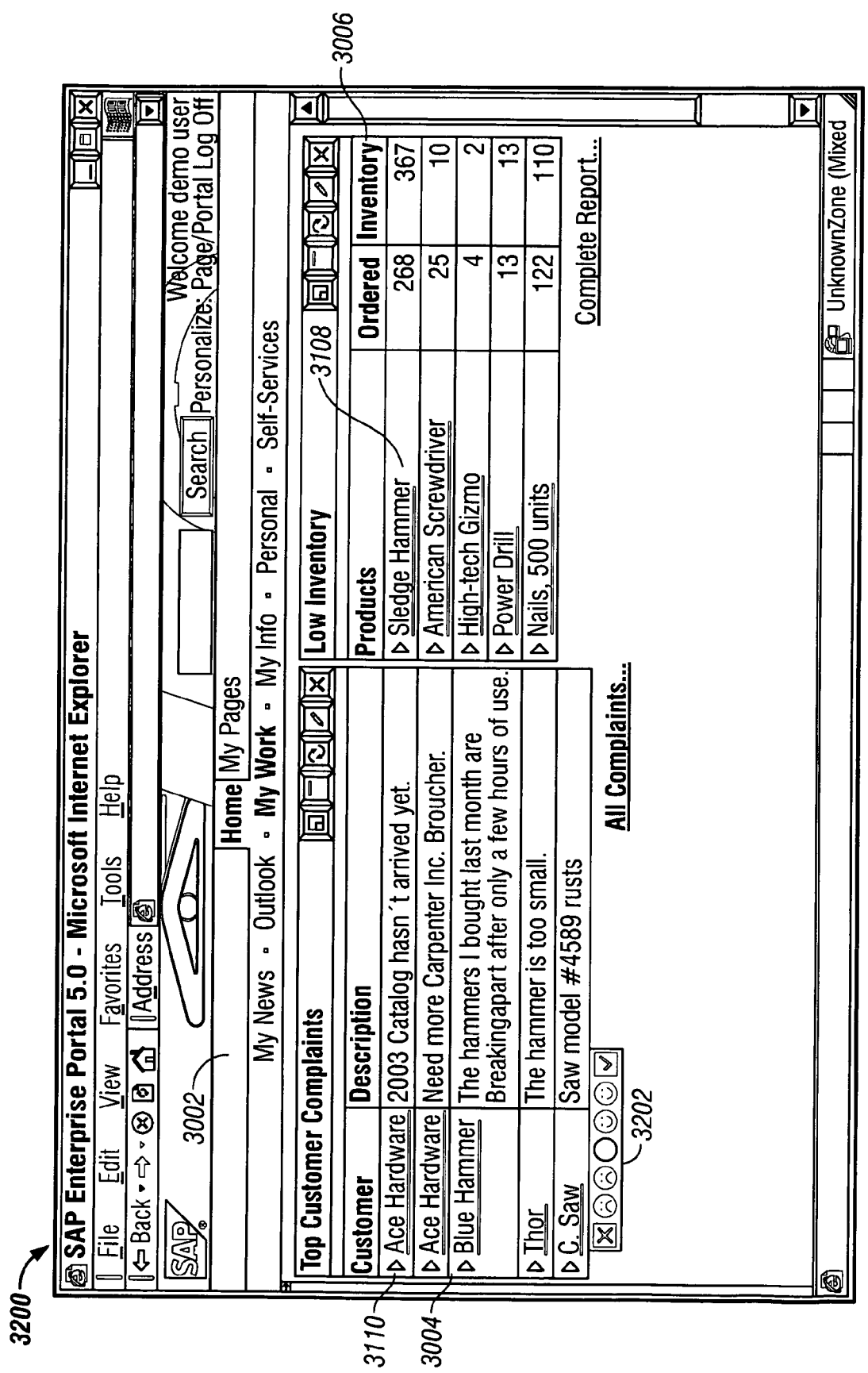
FIG. 32 is a third screen shot illustrating use of the portal system of FIG. 28.

FIG. 32 is a third screen shot 3200 illustrating use of the portal system 2802 of FIG. 28. In screen shot 3200, the user has reselected the portal page "My Work" from the category listing 3002. As a result, the iViews 3004 and 3006 are returned to the screenshot 3200. In this case, however, the discussion objects 3108 "Sledge Hammer," and 3110 "Ace Hardware," are more heavily emphasized and/or prioritized within the iViews 3004 and 3006, reflecting the preference information entered with respect to the screen shot 3100.

It should be noted that this preference for the discussion objects 3108 and 3110 is executed despite the nature of media assets associated with these discussion objects. For example, customer complaints associated with the discussion objects 3110 "Ace Hardware" may be relatively trivial customer complaints. Similarly, there may be no obvious inventory problems associated with the company represented by the discussion object 3108 "Sledge Hammer." Nonetheless, these items are promoted ahead of other customers or products, due to the preference information input with respect to screen shot 3100.

In the portal system 2802 described above with respect to FIGS. 28-32, many of the features discussed above With respect to the search engine 1702 also may be implemented. For example, discussion objects, particularly with respect to information obtained form sources external to the portal system 2802, may be presented to the user in a separate, reserved portion of the user display 2804 of FIG. 28. As another example, a pop-up window for expressing preference information, such as a pop-up window 3202 in FIG. 32, may be obtained by a number of methods, such as clicking on a selected discussion object or hovering over the selected discussion object, using a computer mouse or other input technique.

Figure 33:
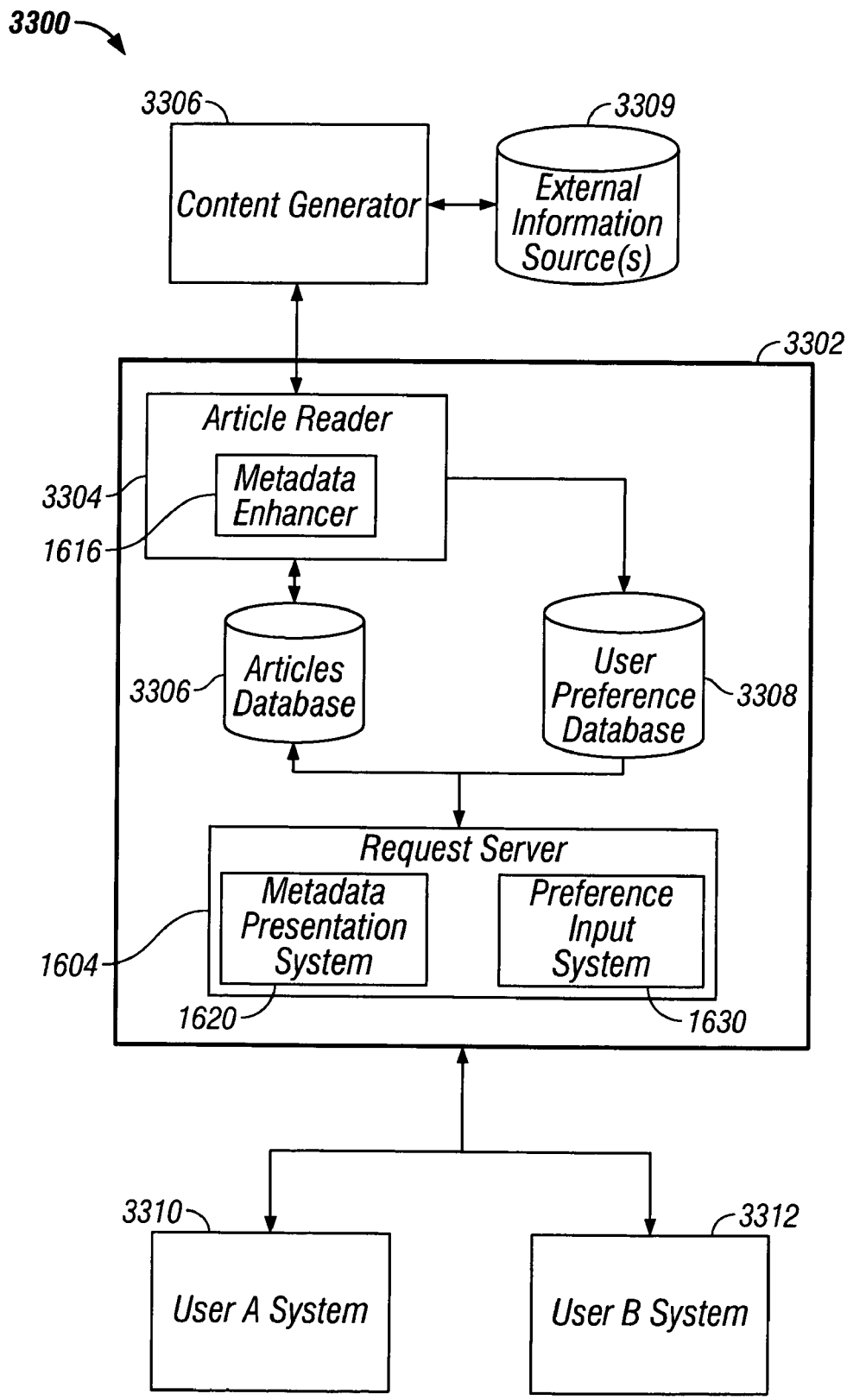
FIG. 33 is a block diagram of a reverse-query portal system.

FIG. 33 is a block diagram 3300 of a reverse-query portal system 3302, similar in some ways to the system 100 of FIG. 1. In the system 3302, an article reader 3304 contains media assets from a content generator 3306, which in turn obtains content from external information sources 3308. The article reader 3304 may provide metadata enhancement to the content using the metadata enhancer 1616, similar to the metadata enhancer 1616 of FIG. 16. By so doing, the article reader 3304 may accumulate a database of media assets 3310.

The reverse-query portal system also contains a user preference database 3312. Thus, the system 3302 may collect a pool of articles associated with each of a plurality of users represented by a first user 3314 and a second user 3316. In this way, the system 3302 may provide articles of interest to a plurality of users.

It should be understood with respect to the system 3302 that articles are collected and sorted (for example, with respect to each user) before any particular request(s) are made by a user, based simply on information in the user preference database 3312. Thus, the articles are obtained and/or generated prior to a direct query being entered by the user 3314 or 3316. This is in contrast to portal systems, such as the portal system 2802, in which articles are often obtained for delivery to a particular user, or allocated or assigned to the particular user, only in response to a request from the particular user.

The user preference information for user preference database 3312 may be initially collected, for example, using a preference selection page. The user 3314 or 3316 may express preferences about particular articles or categories of articles using the preference collection techniques discussed above with respect to particular discussion objects.

Although the information system 1602 of FIG. 16 has primarily been discussed above with respect to portal systems, reverse-query portal systems, and search engines, the information system 1602 also may be used in various other settings. For example, the system 1602 may be used in an email system, in which each email is considered a media asset, so that discussion objects may be highlighted inside emails. Similarly, discussion objects could be highlighted while viewing lists of emails, as in an email inbox. In this way, a user may prioritize emails regarding particular topics of interest, or from/to particular senders/recipients. As in the other implementations, such an implementation would reduce the time, effort, and number of screens accessed by the user to enter preference information, and would allow the user to enter the preference information, for example, while viewing the content about which preference information is being entered, or while viewing the discussion objects in some other context.

Figure 34:
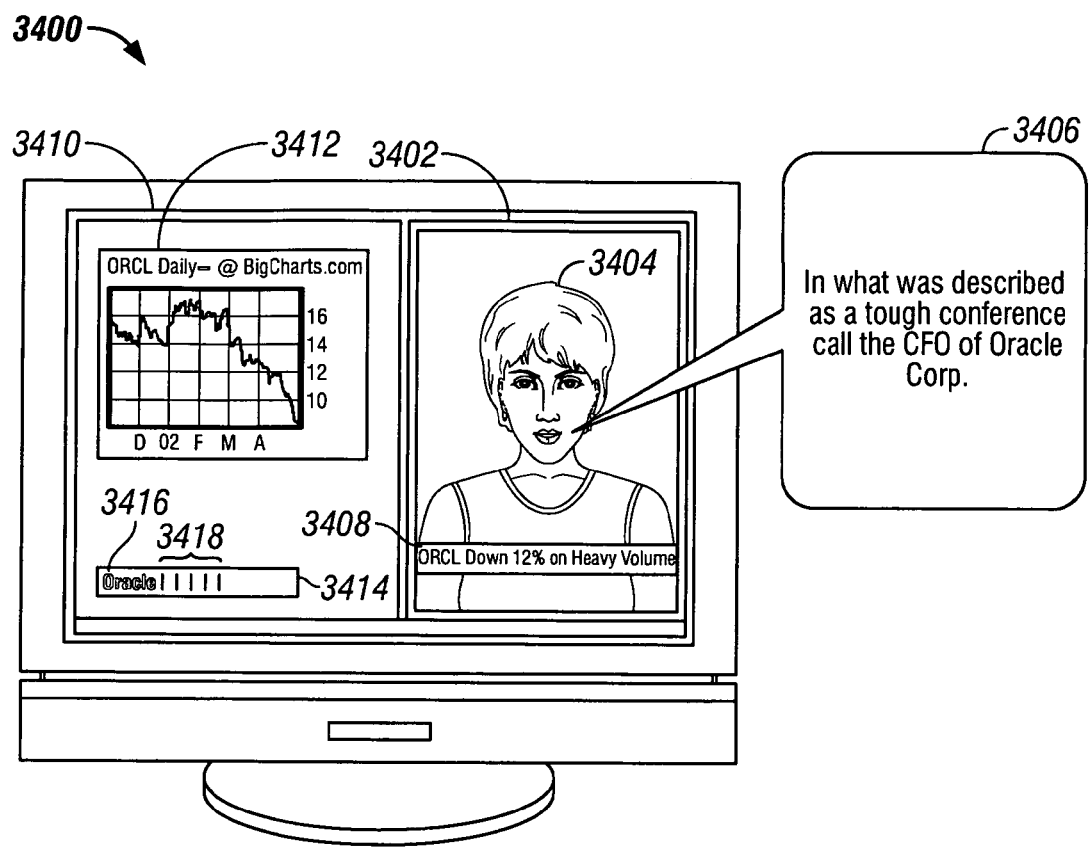
FIG. 34 is a first screenshot of a video presentation using the information system of FIG. 16.

FIG. 34 is a screenshot 3400 of a video presentation using the information system 1602 of FIG. 16. Screenshot 3400 may be, for example, an audio-video media asset that may be shown, for example, on a television or other video player (for example, a Moving Picture Experts Group ("MPEG") player).

Screenshot 3400 includes a first section 3402 displaying a narrator 3404 reading an article, as represented by a word balloon 3406. A title of the article being read by the narrator 3404 is included in the section 3402 as a text bar 3408. The text bar 3408, or another text bar (which may be static or scrolling, for example), could be used to display current headlines of the day, which may not be related to the article being read by the narrator 3404.

The screenshot 3400 also includes a second section 3410. The section 3410 includes in a chart 3412 supplemental and/or contextual information about the article being read by the narrator 3404. In this case, the chart 3412 provides stock market information about the company Oracle Corp.

Information to be included in the chart 3412 may be provided manually; for example, a person may be listening to the article being read (or may have read the article beforehand), and determining what, if any, information, should be included in the chart 3412. Alternatively, information for the chart 3412 may be provided using the automated techniques disclosed in U.S. patent application Ser. No. 10/259,785, titled "METHODS AND SYSTEMS FOR PROVIDING SUPPLEMENTAL CONTEXTUAL CONTENT," and filed on Sep. 30, 2002, or in U.S. patent application Ser. No. 10/259,787, titled "ENRICHING INFORMATION STREAMS WITH CONTEXTUAL CONTENT," and filed on Sep. 30, 2002, both of which are hereby incorporated by reference.

Finally in the section 3410, a discussion object section 3414 is included. In the discussion object section 3414, a discussion object (or objects) 3416 is (are) included. In this case, the discussion object 3416 "Oracle" is included in the section 3414. Additionally, a section 3418 within the section 3414 displays preference information about the currently displayed discussion object 3416. In this case, the preference information is conveyed as a number of bars (using an appearance similar to that of techniques used for adjusting a volume of a television), but other techniques for indicating preference, such as those discussed above, also may be used.

The discussion object 3416 may be displayed automatically, concurrently with its occurrence within the article being read by the narrator 3404. In other words, as the narrator 3404 reads the word, in this case, "Oracle," during the reading of an article, then that word appears within the section 3414. The words within an article that are designated as discussion objects can be selected/determined using the various techniques discussed above, and may be displayed in other ways that are not specifically illustrated. For example, a closed-captioning rendering of the article being read may be streamed along a bottom of the display 3400, and the discussion object(s) 3416 "Oracle" may be highlighted, underlined, colored differently, or otherwise identified from within the closed-captioning text.

Even when an entire closed-captioning rendering of the article is not provided, as in screenshot 3400, text from within the closed-captioning text may be used to identify and extract words as the discussion object(s) 3416 "Oracle" for display in section 3414. Similarly, other audio sub-channels (for example, a secondary audio programming ("SAP") channel) may be designed and/or used to broadcast the discussion object 3416 "Oracle."

As the narrator 3404 continues to narrate a particular article, discussion objects may correspondingly appear within the section 3414. For example, in FIG. 35, a screenshot 3500 displays an example in which the narrator 3404 has continued reading the same article being read in screenshot 3400, and has now spoken the words "Larry Ellison," as shown in a word balloon 3502. Accordingly, the words "Larry Ellison" appear as a discussion object 3504 within the section 3414. The discussion object 3504 "Larry Ellison" may appear before, during, or after the reading of the words "Larry Ellison." As in screenshot 3400, the discussion object 3504 "Larry Ellison" is displayed along with a current preference indication, that is, a set of bars 3506, associated with that discussion object 3504. In screenshot 3500, the set of bars 3506 includes four bars, indicating a certain extent of preference based on a scale maximum of, for example, seven bars. FIG. 36 is a screenshot 3600, in which a set of bars 3602 within the section 3414 has been raised to a maximum of seven bars by a user, where the user has used a remote control 3604 to select the discussion object 3504 "Larry Ellison" for voting, and then to actually vote by raising the number of bars associated with the discussion object 3504 "Larry Ellison," as shown.

Figure 35:
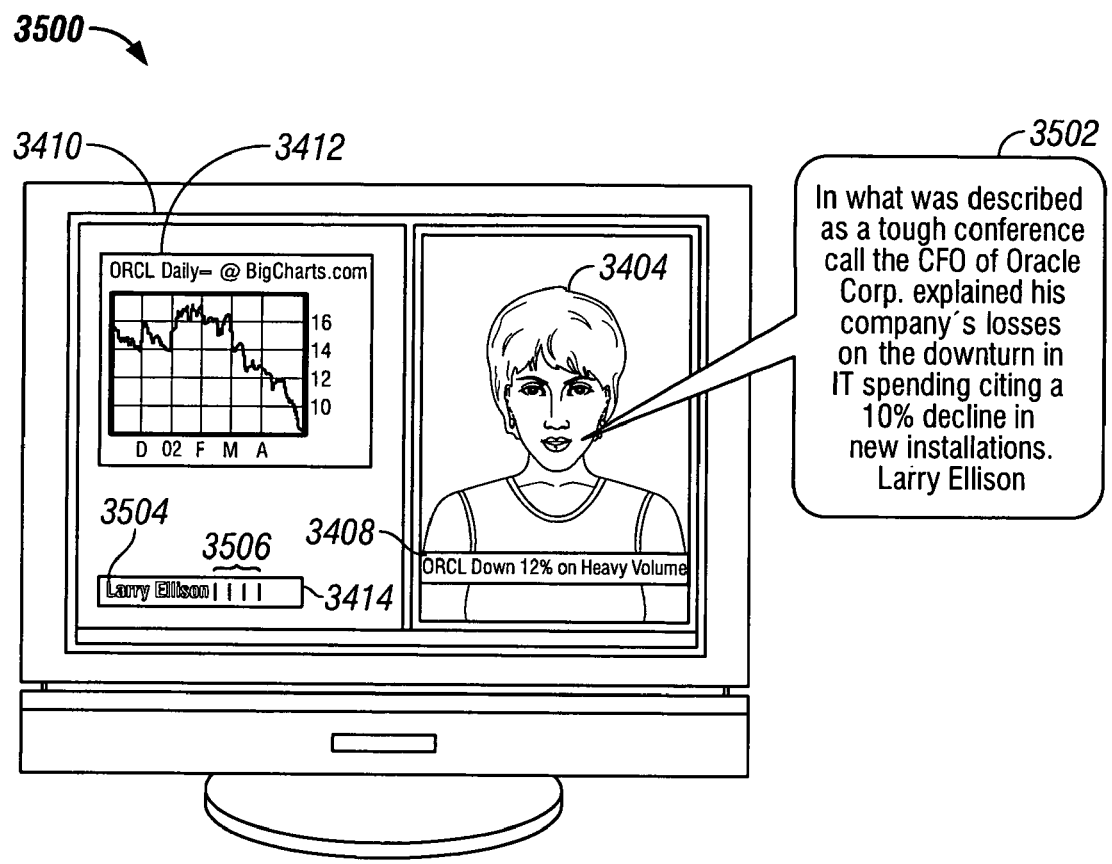
FIG. 35 is a second screenshot of a video presentation using the information system of FIG. 16.
Figure 36:
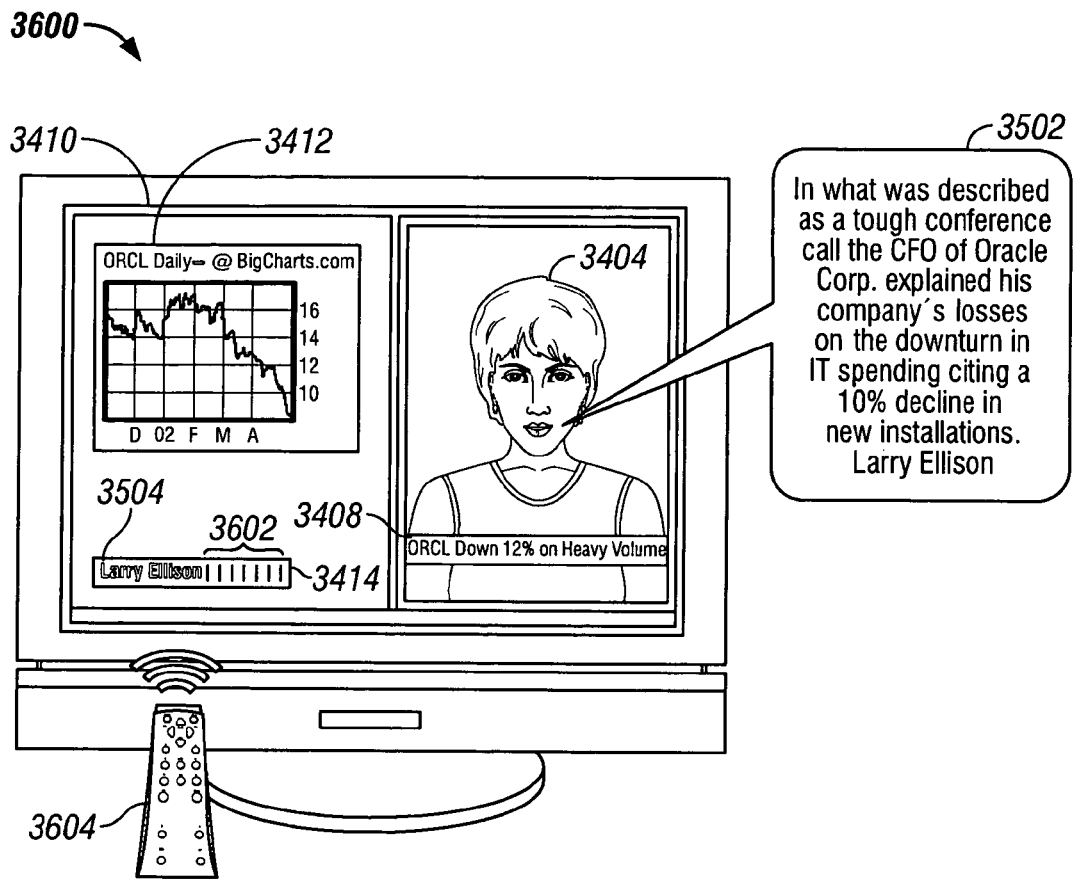
FIG. 36 is a third screenshot of a video presentation using the information system of FIG. 16.

Although not shown in the screenshots of FIGS. 34-36, a user may select an option in which multiple discussion objects appear simultaneously. If the user decides to vote on (that is, indicate a preference about) a discussion object such as the discussion object 3416 or 3504, then additional discussion objects spoken by the narrator 3404 while the user is voting on a current discussion object may be skipped, saved for later viewing (voting), or displayed in a different portion of the display. Alternatively, the video of the narrator 3404 may be paused during a voting process.

In other implementations, the user may use the remote control 3604 to select all discussion objects associated with the article currently being read for simultaneous display, perhaps on a separate screen, whereupon the user may change his or her preference information associated with any one of the discussion objects. As in the implementations above, the narrator 3404 may be paused during this operation, or may simply continue speaking while the user votes.

The information system 1602, or variations thereof, may be used to implement the screenshots of FIGS. 34-36. For example, on the client side in FIG. 16, the media asset 1622 would be an audio-visual media asset, such as the article being read by the narrator 3404. The discussion objects 1624 and 1626 would be the spoken versions of the discussion objects 3416 and 3504, while the discussion objects 1624a and 1626a would represent the textual versions of the discussion objects 3416 and 3504. The preference information 1628 would represent the section 3414 and associated information, or merely the section 3418 and associated information (bars). On the side of the request server 1630, the metadata presentation system 1620 may, as referred to above, interact with a closed-captioning system, or other secondary-audio programming channel, to provide discussion objects 3416 and 3504 within the section 3414, perhaps using the metadata enhancer(s) 1616 and 1612 to determine discussion objects for presentation. Such a system may be used, for example, to transmit MPEG video over the network 1606.

In other implementations, the audio-visual media asset may be broadcast over a television channel, which may be a public television channel, or a closed-circuit television channel, such as, for example, a company-wide television channel or a channel displayed on a television in a public or semi-public waiting area. Also, although not specifically illustrated, some subset of the discussion objects associated with an audio-visual media asset may be selected and presented within a portion of the screenshots of FIGS. 34-36, to serve as a visual summary of the media asset, in the manner described above with respect to FIGS. 18-21.

To implement the screenshots of FIGS. 34-36, a device (not shown) for obtaining and storing set-up and/or preference information from the user may be kept at either a broadcasting site (for example, server side), and/or at the client (for example, user) side. For example, a receiver such as a cable or satellite receiver, and/or a personal video recorder, could be used to input, record, and transmit the user's preference information.

As a result of inputting the user's preference information, an information system such as the information system 1602 may select future programming for the user accordingly, and similarly to the way other media assets were promoted, demoted, excluded, or included in the various examples above.

Although the examples of FIGS. 34-36 are discussed in terms of an audio-visual media asset, an audio media asset(s) also could be provided to the user, as part of an audio presentation device. For example, a user practicing the system 1300 of FIG. 13, in which a personalized audio presentation is delivered to the user, may listen to an audio media asset over a cell phone or car radio. Discussion objects could be distinguished to the user by way of a pre-determined sound, such as a "ping," after every discussion object. Alternatively, the discussion objects could be listed together, at a beginning or end of a particular media asset, or in conjunction with a title of a media asset. By inputting voice commands, the system 1300 (or other audio-content presentation system) may input preferences of the user.

In the above examples, various techniques were discussed for inputting preference information from a user, where the preference information is specific to content elements within a media asset, and the preference information is collected while the user is accessing a display of the media asset. These techniques allow a user to change his or her preference information quickly, easily, and efficiently, and to improve the use of, for example, a search engine, a portal page, a reverse-query portal page, or a video (for example, television) display. For example, the user may update/modify a search being performed by a search engine while viewing one of the media assets discovered during the search, without having to return to a search engine home page or search results page.

A number of implementations have been described. Nevertheless, it will be understood that various modifications may be made. Accordingly, other implementations are within the scope of the following claims.

What is claimed is:

1. A computer-implemented method comprising:
generating discrete media assets from received information at a content generator, each media asset including content, the content including a plurality of discussion objects;
generating content metadata for each media asset at an article reader, based upon the content;
comparing the content metadata to a filtering database at a content-based router;
filtering the media assets at the content-based router based upon comparing the content metadata to the filtering database;
comparing the filtered media assets to a user preference database storing media asset preference information for a user, at a personalized article processor;
individually prioritizing the filtered media assets for the user into prioritized media assets at the personalized article processor based upon comparing the content metadata of the filtered media assets to the user preference database;
outputting the prioritized media assets including a first discussion object to a rendering medium;
receiving a user feedback selection including at least the first discussion object and postponement preference data associated with at least the first discussion object, the postponement preference data indicating a specified period of time to postpone outputting media assets including the first discussion object, and the user feedback selection being received from a context menu;
re-prioritizing the prioritized media assets based upon the user feedback selection at the personalized article processor; and
outputting the re-prioritized media assets including the first discussion object to the rendering medium.

2. The method of claim 1, further comprising outputting the context menu, the context menu illustrating time periods that may be selected as the specified period of time to postpone.

3. The method of claim 2, wherein the postponement preference data includes one of the time periods.

4. The method of claim 2, wherein the time periods include a next day and a day after the next day.

5. The method of claim 2, wherein the time periods refer to a next week and a week after the next week.

6. The method of claim 1, further comprising:
gathering the information using an agent; and
transmitting the information from the agent to the content generator.

7. The method of claim 1, wherein the received information is generated into discrete media assets that each further include content metadata associated with the content.

8. The method of claim 1, wherein the content metadata includes the author of the content, the general subject heading of the content, content metadata, attribute information, or portions of the content.

9. The method of claim 1, wherein the media asset includes text, video, audio and/or hypertext markup language ("HTML") code.

10. The method of claim 1, wherein a portion of the content is included in the media asset in multiple formats.

11. The method of claim 1, wherein the content further comprises a web page, an electronic mail message, contact information, weather information, or a stock quote.

12. The method of claim 1, wherein the enterprise object model describes how the content metadata should be interpreted.

13. The method of claim 1, wherein the enterprise object model is a customer enterprise object model, a supplier object model, or a standardized object model.

14. The method of claim 1, wherein the information referencing the media assets includes links to the media assets or the content metadata for each media asset.

15. The method of claim 1, wherein the filtering database is an access control database storing security clearance information for each user.

16. The method of claim 1, wherein the filtering database is the user preference database.

17. The method of claim 1, further comprising populating the user preference database based upon receiving user preferences via a preference form.

18. The method of claim 1, further comprising populating the user preference database over time based upon receiving user feedback.

19. The method of claim 1, wherein the rendering medium is an audio or video device.

20. The method of claim 1, further comprising accessing the capacity of the rendering medium stored in the user preference database.

21. The method of claim 1, further comprising receiving the information at the content generator.

22. The method of claim 1, further comprising accessing the media assets at the article reader, from the content generator.

23. The method of claim 1, further comprising storing the media assets in an article database.

24. The method of claim 1, further comprising receiving information referencing the media assets at a content-based router.

25. The method of claim 1, further comprising receiving the filtered media assets at the personalized article processor from the content-based router.

26. The method of claim 1, wherein outputting the formatted media assets further comprises outputting a media asset with the highest priority in a most prominent location of the rendering medium.

27. The method of claim 1, wherein outputting the formatted media asset further comprises:
outputting a portion of a media asset with less than the highest priority,
outputting a media asset with the highest priority after outputting the portion of the media asset with less than the highest priority, and
outputting a reminder of the media asset with less than the highest priority after outputting the media asset with the highest priority.

28. The method of claim 1, wherein the formatted media assets are output using extensible markup language ("XML").

29. The method of claim 1, wherein the discussion objects are categorized by discussion class.

30. The method of claim 1, further comprising filtering the prioritized media assets based upon the capacity of the rendering medium.

31. The method of claim 1, further comprising:
determining a capacity of the rendering medium for the user, at a pagination engine; and formatting the prioritized media assets for the user based upon the capacity of the rendering medium, at the pagination engine,
wherein outputting the prioritized media assets to the rendering medium further comprises outputting the formatted media assets to the rendering medium.

32. The method of claim 1, further comprising collecting the received information using a software agent.

33. The method of claim 1, wherein the received information includes information generated within the content generator.

34. The method of claim 1 further comprising storing the postponement preference data in the user preference database.

35. A device comprising:
a content generator configured to generate discrete media assets from received information, each media asset including content, the content including a plurality of discussion objects;
an article reader configured to generate content metadata for each media asset, based upon the content;
a content-based router configured to:
compare the content metadata to a filtering database, and
filter the media assets based upon comparing the content metadata to the filtering database; and
a personalized article processor configured to:
compare the filtered media assets to a user preference database storing media asset preference information for a user,
individually prioritize the filtered media assets for the user into prioritized media assets based upon comparing the content metadata of the filtered media assets to the user preference database,
output the prioritized media assets to a rendering medium,
receive a user feedback selection including at least a first discussion object and postponement preference data associated with at least the first discussion object, the postponement preference data indicating a specified period of time to postpone outputting media assets including the first discussion object, and the user feedback selection being received from a context menu.

re-prioritize the prioritized media assets based upon the user feedback selection, and output the re-prioritized media assets including the first discussion object to the rendering medium.

36. An apparatus comprising a storage medium, wherein the storage medium stores instructions that, when executed, cause a data processing apparatus to:

generate discrete media assets from received information at a content generator, each media asset including content, the content including a plurality of discussion objects;

generate content metadata for each media asset at an article reader, based upon the content;

compare the content metadata to a filtering database at a content-based router;

filter the media assets at the content-based router based upon comparing the content metadata to the filtering database;

compare the filtered media assets to a user preference database storing media asset preference information for a user, at a personalized article processor;

individually prioritize the filtered media assets for the user into prioritized media assets at the personalized article processor based upon comparing the content metadata of the filtered media assets to the user preference database;

output the prioritized media assets to a rendering medium;

receive a user feedback selection including at least a first discussion object and postponement preference data associated with at least the first discussion object, the postponement preference data indicating a specified period of time to postpone outputting media assets including the first discussion object, and the user feedback selection being received from a context menu;

re-prioritize the prioritized media assets based upon the user feedback selection at the personalized article processor; and output the re-prioritized media assets including the first discussion object to the rendering medium.

37. A computer-implemented method comprising:

generating discrete media assets from received information at a content generator, each media asset including content, the content including a plurality of discussion objects;

generating content metadata for each media asset at an article reader, based upon the content;

comparing the content metadata to a filtering database at a content-based router;

filtering the media assets at the content-based router based upon comparing the content metadata to the filtering database;

comparing the filtered media assets to a user preference database storing media asset preference information for a user, at a personalized article processor;

individually prioritizing the filtered media assets for the user into prioritized media assets at the personalized article processor based upon comparing the content metadata of the filtered media assets to the user preference database;

outputting a portal page to a rendering medium, the portal page including a section configured to display the prioritized media assets such that the prioritized media assets are included in an iView;

receiving a user feedback selection including at least a first discussion object and postponement preference data associated with at least the first discussion object, the postponement preference data indicating a specified period of time to postpone outputting media assets including the first discussion object, and the user feedback selection being received from a context menu;

re-prioritizing the prioritized media assets based upon the user feedback selection at the personalized article processor; and outputting the re-prioritized media assets including the first discussion object to the rendering medium.

38. The method of claim 1 wherein:

the prioritized media assets include a second discussion object included in the plurality of discussion objects, and the user feedback selection including at least the first discussion object and the postponement preference data associated with at least the first discussion object is received concurrently with displaying the first discussion object and the second discussion object.

39. The method of claim 2 wherein the user feedback selection is received by selecting one of the time periods.

40. The method of claim 1 wherein the re-prioritized media assets including the first discussion object comprises outputting the re-prioritized media assets including the first discussion object one time only and at a time defined by the postponement preference data.

* * * * *